United States Patent [19]

Kume et al.

[11] Patent Number: 4,835,964
[45] Date of Patent: Jun. 6, 1989

[54] DIESEL PARTICULATE OXIDIZER REGENERATION SYSTEM

[75] Inventors: Satoru Kume, Otsu; Michiyasu Yoshida, Kyoto; Tateo Kume, Kyoto; Hiroki Oshima, Kyoto; Mitsuhiro Kawagoe, Kyoto; Kazuo Koga, Otokuni, all of Japan

[73] Assignee: Mitsubishi Jidosha Kogyo Kabushiki Kaisha, Tokyo, Japan

[21] Appl. No.: 145,772

[22] Filed: Jan. 19, 1988

Related U.S. Application Data

[62] Division of Ser. No. 717,848, Mar. 29, 1985, Pat. No. 4,719,751.

[30] Foreign Application Priority Data

| Mar. 31, 1984 | [JP] | Japan | 59-64144 |
| Mar. 31, 1984 | [JP] | Japan | 59-64145 |
| Apr. 9, 1984 | [JP] | Japan | 59-70521 |
| Apr. 25, 1984 | [JP] | Japan | 59-82434 |

[51] Int. Cl.⁴ ............................................. F01N 3/18
[52] U.S. Cl. ................................................... 60/285
[58] Field of Search .................................. 60/285, 274

[56] References Cited

U.S. PATENT DOCUMENTS

4,509,327  4/1985  Enga .................. 60/274

Primary Examiner—Douglas Hart
Attorney, Agent, or Firm—Robert E. Burns; Emmanuel J. Lobato

[57] ABSTRACT

Flammable fine particles (particulates) consisting principally of carbon and hydrocarbons are discharged from a diesel engine to its exhaust system. A diesel particulate oxidizer (DPO) is disposed in the exhaust passage for collecting and burning the particulates without allowing the particulates to be discharged directly to the atmosphere. This DPO comprises a ceramic foam with catalyst. When the quantity of particulates collected is above a predetermined value, the DPO will undergo clogging. To prevent this, a high temperature gas containing oxygen is fed to the DPO to burn (regenerate) the collected particulates. In order to accelerate the normal regeneration of the DPO, there are provided a regeneration means for making a retard control of the fuel injection timing in the diesel engine, and a regeneration timing control means for controlling the operation of the regeneration means. Further, there is provided a regeneration timing detection means for detecting the regeneration timing of the DPO.

1 Claim, 49 Drawing Sheets

F I G. 24
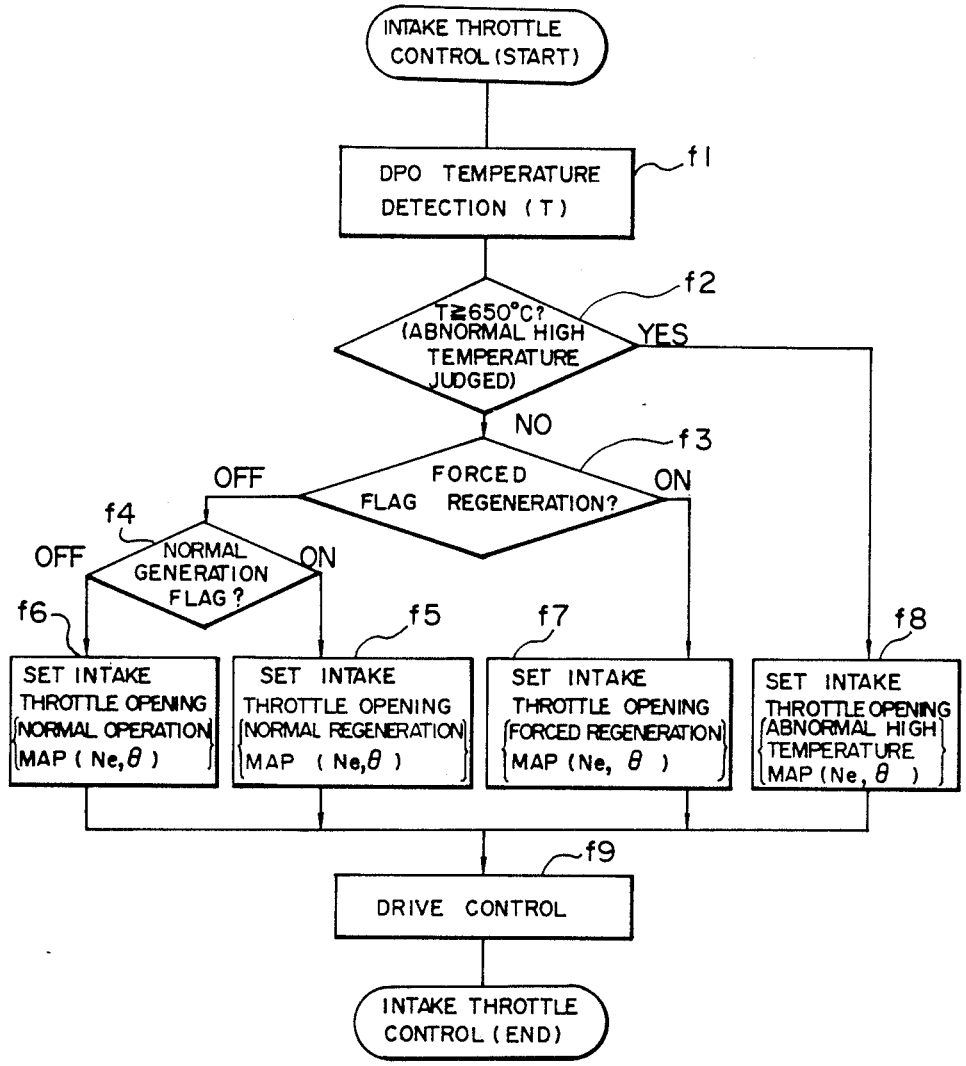

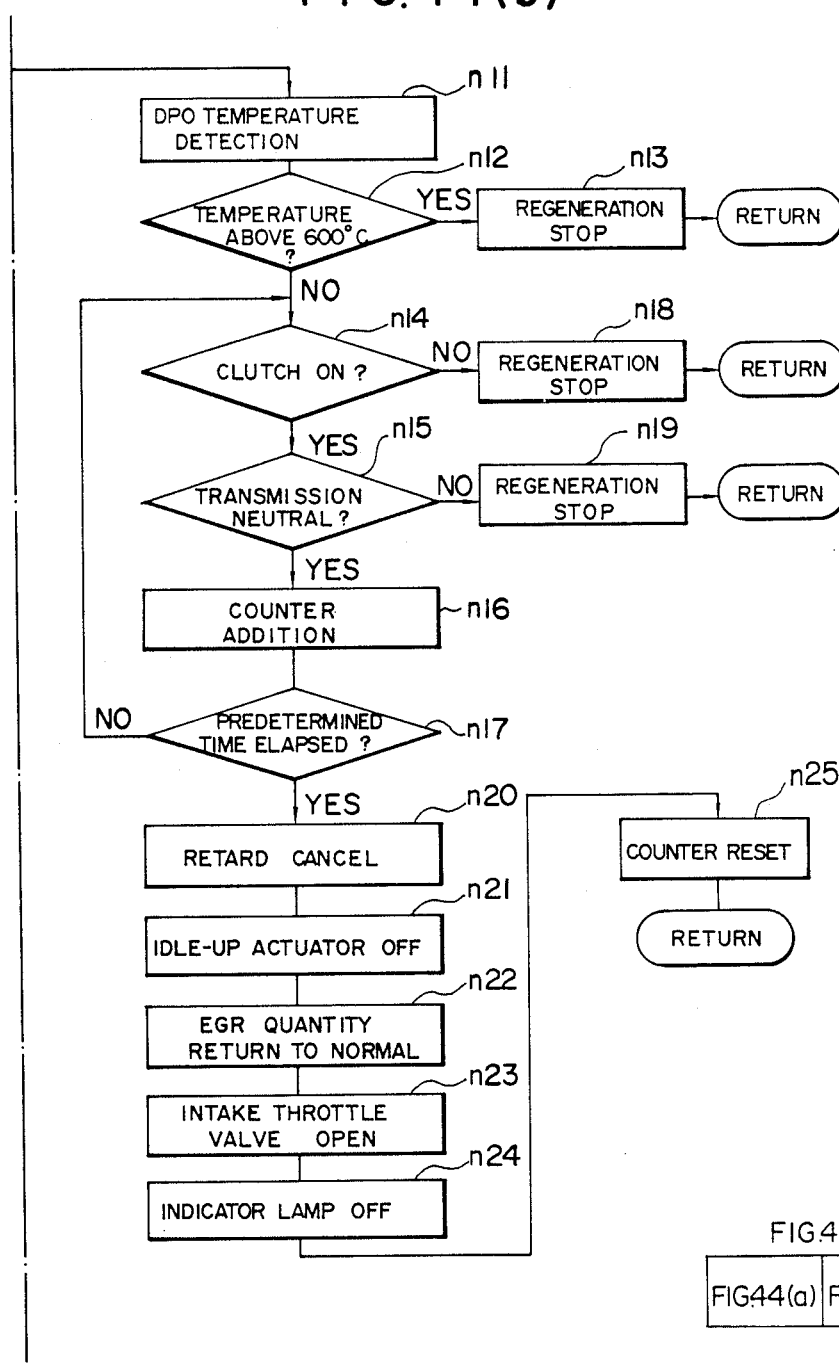

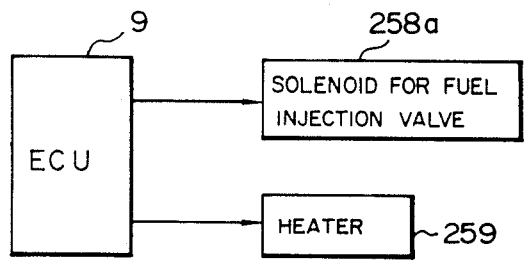
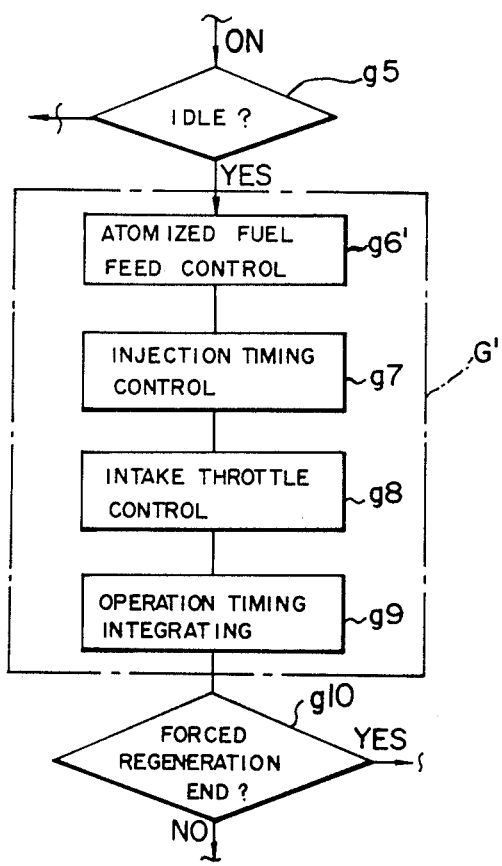

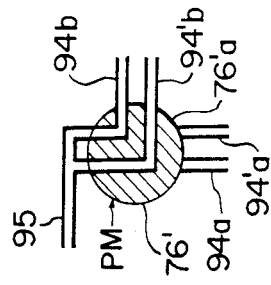
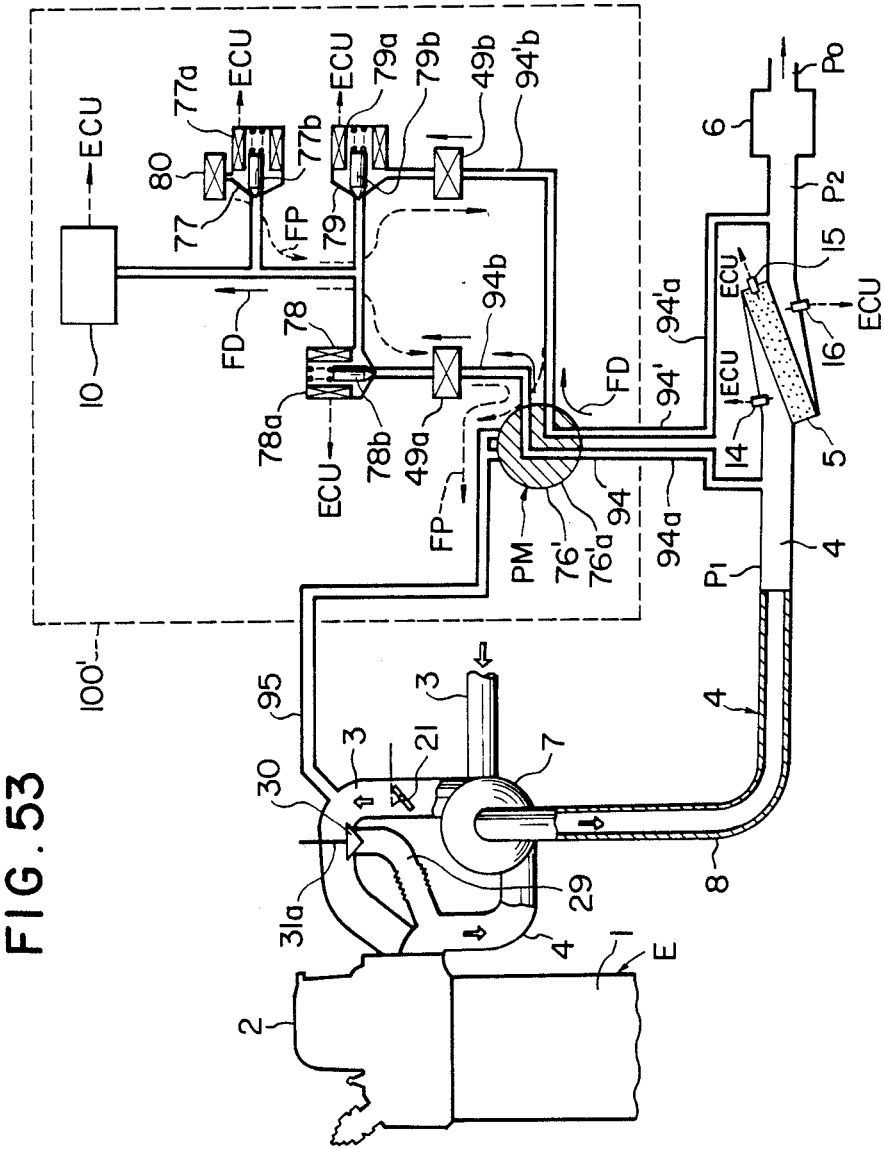
FIG. 54
FIG. 53

DIESEL PARTICULATE OXIDIZER REGENERATION SYSTEM

This is a divisional of application Ser. No. 717,848, filed Mar. 29, 1985, now U.S. Pat. No. 4,719,751.

BACKGROUND OF THE INVENTION

1. Field of the Invention

The present invention relates to a diesel particulate oxidizer disposed in an exhaust system of a diesel engine and a control system for its regeneration.

2. Description of the Prior Art

In the exhaust gas of a diesel engine are contained particulates which are a flammable carbide compound of fine particles and which are the main cause of coverting the exhaust gas into a black smoke.

The particulates referred to herein indicate flammable fine particles consisting principally of carbon and hydrocarbons, having an average diameter of about 0.3 $\mu$m and undergoing self-ignition and burning (hereinafter referred to as "self-burning") at a temperature not lower than about 500° C. (not lower than 350° C. in the presence of an oxidation catalyst).

The particulates undergo self-buring at high speed and high load of a vehicle at which the exhaust gas temperature rises above 500°. But, during normal operation or idling (which occupies more than 90% of vehicular operation) in which the exhaust gas temperature does not reach 500° C., the particulates are discharged to the atmosphere directly.

However, since the particulates may be harmful to the human body, various studies have recently been made about mounting a diesel particulate oxidizer for collecting the particulates in the exhaust gas in the exhaust passage of a vehicular diesel engine.

As a trap carrier of a diesel particulate oxidizer there is used a trap carrier provided with a depth collection type heat-resistant ceramic foam with catalyst containing platinum, palladium or rhodium (which foam comprises two plates having an oval, elliptic or rectangular section). This diesel particulate collecting member will be hereinafter referred to simply as "DPO".

By using the DPO, the particulates are collected and deposited, tending to block the exhaust passage. For regeneration of the DPO to avoid such inconvenience, various studies have been made about the mechanism of accelerating the recombustion of the particulates.

As an example of such regeneration assisting mechanism, the fuel injection timing is retarded, an intake throttling is made, or the quantity of the exhaust gas recirculated is increased. But, it is desirable to inhibit the acceleration of regeneration of the DPO according to the status of the engine.

More particularly, if regeneration of the DPO is performed at a high engine load (in the vicinity of full open of the accelerator), the accelerating performance of the engine (that of the vehicle carrying the engine thereon) is deteriorated. And if regeneration of the DPO is conducted in a low revolution region of an engine, the drivability of the vehicle which carries the engine thereon cannot be ensured. Moreover, even if the regeneration assisting mechanism is retarded in a low speed and low load region, the particulates cannot undergo self-burning, thus resulting in unnecessary control being made.

Further, if promotion of the DPO regeneration is made in a cold state of an engine, the exhaust gas temperature does not fully rise, thus resulting in the formation of a blue smoke or the regeneration efficiency becoming very poor.

In a conventional DPO regeneration system, for starting or stopping the operation of a regeneration assisting mechanism, the use of a pressure sensor may be effective which detects an exhaust gas pressure in an exhaust passage upstream of the DPO.

In such diesel engine exhaust pressure detecting means, however, the steam, soot and SOx contained in exhaust gas are deposited in an exhaust pressure detecting pipe or in a water trap disposed therein, thus resulting in water freezing at a cold place. Further, the detection pipe may be clogged with soot, thus causing deterioration of the pressure sensor performance; for example, it becomes impossible to effect the exhaust pressure detection, impossible to make an exact detection, and a delay of transfer occurs. Reduction of durability also results.

As the foregoing regeneration means, it has been proposed to retard the fuel injection timing, make intake throttling and increase the quantity of exhaust gas recirculated. Even with such proposal, since there is an engine operation region in which the exhaust gas temperature does not fully rise, the particulates collected by the DPO do not burn long, causing an overloading condition and decrease of the output by clogging of the DPO.

If the particulates deposited in a large volume are burnt forcibly, the DPO will melt and damage because of combustion of the particulates in a large quantity.

In conventional DPO regeneration systems, moreover, if it is tried to regenerate DPO in a certain specific operation condition (e.g. several days' idling), the temperature of the exhaust gas from an engine will not rise sufficiently and so the particulates adhered to the DPO are not burnt. Consequently, the DPO may be clogged.

In conventional DPO regeneration systems, therefore, it is considered to use a diesel particulate burning device which brings engine into a high idling condition (e.g. 3,000 rpm) forcibly during stop of a vehicle. However, if such high idling condition is created, the engine noise will become louder, and so the driver may feel uneasy. Moreover, a retard would cause a temporary production of aldehyde, etc. and offensive odor in the exhaust gas. Thus, there are problems in point of commercial value.

SUMMARY OF THE INVENTION

It is an object of the present invention to provide a DPO regeneration system capable of inhibiting the promotion of regeneration of the DPO according to engine status.

It is another object of the present invention to provide a DPO regeneration system having an exhaust deposit purging device capable of purging to an exhaust passage exhaust deposits in an exhaust pressure detecting pipe which connects the exhaust passage with an exhaust pressure sensor.

It is a further object of the present invention to provide a DPO regeneration system in which the occurrence of clogging of DPO is indicated to the driver and in which the DPO can be forcibly regenerated automatically under a predetermined engine operating condition or when the driver desires it in accordance with the indication, separately from the case where the DPO is regenerated normally (this regeneration is called "normal regeneration" hereinafter.)

It is a still further object of the present invention to provide a DPO regeneration system in which the regeneration of DPO can be effected according to a variety of engine operating conditions by raising the temperature of exhaust gas fed to the DPO.

In order to achieve the above-mentioned objects, the diesel particulate oxidizer regeneration system of the present invention is characterized by including, in a diesel engine having a fuel injection pump and a fuel control means for controlling the injection volume or injection timing of said fuel injection pump:

a diesel particulate oxidizer disposed in an exhaust system of the diesel engine and having a trap carrier for collecting unburnt fine particles contained in exhaust gas, said trap carrier supporting an oxidation catalyst;

a regeneration means for burning the unburnt fine particles collected in said diesel particulate oxidizer;

a regeneration timing control means for detecting the quantity of the unburnt fine particles deposited in said diesel particulate oxidizer and providing a signal to said regeneration means for operating the latter when the detected value is above a predetermined value; and a regeneration end control means for detecting that the quantity of the unburnt fine particles collected and deposited in the diesel particulate oxidizer has become less than the predetermined value after combustion, and producing a signal for stopping the operation of said regeneration means.

The diesel particulate oxidizer regeneration system of the present invention is also characterized by including, in a diesel engine having a fuel injection pump and a fuel control means for controlling the injection volume or injection timing of said fuel injection pump:

a diesel particulate oxidizer disposed in an exhaust system of the diesel engine and having a trap carrier for collecting unburnt fine particles contained in exhaust gas, said trap carrier supporting an oxidation catalyst;

a regeneration means for burning the unburnt fine particles collected in said diesel particulate oxidizer; and a regeneration timing control means for detecting the quantity of the unburnt fine particles deposited in said diesel particulate oxidizer and providing a signal to said regeneration means for operating the latter when the detected value is above a predetermined value;

said regeneration means being constituted as a fuel injection timing adjusting means capable of adjusting the timing of fuel supply to a fuel injector, said regeneration timing control means being constructed to produce a retard control signal for controlling the injection timing of said fuel injection timing adjusting means to a retard timing during regeneration acceleration in accordance with its regeneration timing detection signal, said diesel particulate oxidizer regeneration system further including an engine status sensor for detecting the status of said diesel engine, and a retard inhibition means for inhbibiting the supply of a retard control signal from said regeneration timing control means to said fuel injection timing adjusting means in accordance with a detected signal from said engine status sensor.

Moreover, the diesel particulate oxidizer regeneration system of the present invention is characterized by including, in a diesel engine having a fuel injection pump with a retard device and in idle up actuator:

a diesel particulate oxidizer disposed in an exhaust passage of the diesel engine for collecting particulates from a combustion chamber of the diesel engine;

a collection quantity detecting means for detecting the quantity of particulates collected in said diesel particulate oxidizer;

an operation status detecting means for detecting the status of operation of the diesel engine;

an indicator means for indicating the regeneration timing of said diesel particulate oxidizer;

a first control means which receives a signal from said collection quantity detecting means and provides to said indicator means a signal for indication that the diesel particulate oxidizer should be regenerated, when the quantity of particulates collected in the diesel particulate oxidizer exceeds a predetermined value; and a second control means which receives signals from said collection quantity detecting means and said operation status detecting means and provides a fuel injection timing retard signal to said retard device and a high speed idling signal to said actuator when the quantity of particules collected in the diesel particulate oxidizer is above a predetermined value and when the diesel engine is in a predetermined operating condition.

Further, the diesel particulate oxidizer regeneration system of the present invention is characterized by including, in a diesel engine having a fuel injection pump with a retard device and an idle up actuator:

a diesel particulate oxidizer disposed in an exhaust passage of the diesl engine for collecting particulates from a combustion chamber of the diesel engine;

a collection quantity detecting means for detecting the quantity of particulates collected in the diesel particulate oxidizer;

an operation status detecting means for detecting the status of operation of the diesel engine;

an indicator means for indicating a regeneration timing of said diesel particulate oxidizer;

a manual switch for producing a signal indicative of desire for regeneration of the diesel particulate oxidizer;

a first control mens which receives a signal from said collection quantity detecting means and provides to said indicator means a signal for indication that the diesel particulate oxidizer should be regenerated, when the quantity of particulates collected in the diesel particulate oxidizer exceeds a predetermined quantity; and a second control means which receives signals from said operation status detecting means and said manual switch and provides a fuel injection timing retard signal to said retard device and a high speed idling signal to said actuator when said diesel engine is in a predetermined operating condition and when there is input of said diesel particulate oxidizer regeneration desire signal.

Additionally, the diesel particulate oxidizer regeneration system of the present invention is characterized by including, in a diesel engine having a fuel injection pump and a fuel control means for controlling the injection volume or injection timing of said fuel injection pump:

a diesel particulate oxidizer disposed in an exhaust system of the diesel engine and having a trap carrier for collecting unburnt fine particles contained in exhaust gas, said trap carrier supporting an oxidation catalyst;

a regeneration means for burning the unburnt fine particles collected in said diesel particulate oxidizer;

a regeneration timing control means for controlling the operation of said regeneration means;

an idle up actuator capable of controlling the idel state of the diesel engine; a temperature detection means for detecting the temperature of said diesel particulate oxidizer; and a particulate combustion suppressing means which receive a signal from said temperature detection means and provides to said idle up actuator a control signal for increasing the idling revolution of the diesel engine when the temperature of the diesel particulate oxidizer is above a predetermined value.

According to the DPO regeneration system of the present invention, the following effects or advantages can be obtained.

(1) The promotion and inhibition of regeneration of the DPO can be effected at an appropriate timing according to the status of an engine, and it is possible to ensure a high engine output, an good drivability and economical regenerating operations and improve the regeneration efficiency.

(2) In a retard control of a distribution type injection pump, the amount of retard control in regeneration can be determined appropriately according to an engine operating condition, thereby permitting a smooth regeneration control.

(3) The promotion of regeneration of the DPO can be effected more certainly by making an exhaust recirculation quantity control, an intake negative pressure control and/or an idel up control simultaneously with a retard control.

(4) The detection accuracy of regeneration timing detection means by exhaust pressure detection can be improved.

(5) Damage of the DPO, etc. can be prevented certainly.

(6) The exhaust gas temperature can be raised during regeneration, whereby the quantity of aldehyde, etc. discharged at the time of retard is reduced to weaken the offensive odor.

BRIEF DESCRIPTION OF THE DRAWINGS

FIGS. 1 to 28 illustrate a DPO regeneration system according a first embodiment of the present invention, of which:

FIG. 1 is an entire schematic illustration therof;

FIG. 2 is a schematic illustration showing a regeneration timing detection means with purge mechanism in the DPO regeneration system;

FIG. 4 is a hydraulic system diagram;

FIG. 5 is a sectional view of a principal portion of a check valve built-in type solenoid timer which constitutes a fuel injection retard means as a regeneration means;

FIG. 7 is a sectional view showing a servo valve type timer piston;

FIGS. 8 and 9 are a schematic block diagram of a fuel increment mechanism and a construction diagram of a principal portion thereof, respectively;

FIG. 10 is a sectional view as seen in the direction of arrows X—X in FIG. 9;

FIG. 11 is a plan view of DPO before assembly;

FIG. 12 is a sectional view as seen in the direction of arrows XII—XII in FIG. 11;

FIG. 13 is a sectional view as seen in the direction of arrows XIII—XIII in FIG. 12;

FIG. 14 is a block diagram showing sensors and actuators connected to an electronic control unit which serves also as a fuel control means, a regeneration timing control means, a regeneration end control means and a retard inhibition means;

FIG. 15 is a general flowchart for control of the entire system;

FIG. 16 is a flowchart of processing for regeneration timing detection;

FIG. 17 is a graph showing the relation between the quantity of particulates deposited in DPO and a pressure loss of main muffler and that of DPO;

FIG. 18 is a flowchart showing how to detect the regeneration end;

FIG. 19 is a graph showing temperature characteristics of DPO;

FIG. 20 is a flowchart showing how to control the injection timing of a fuel injection pump;

FIG. 22 is a graph for explaining the correlation between operation zones of a diesel engine and the operation of a regeneration assisting mechanism;

FIG. 23 is a flowchart showing how to control EGR valve;

FIG. 24 is a flowchart showing how to control an intake throttle valve;

FIG. 25 is a flowchart showing how to perform a forced regeneration control;

FIG. 26 is a graph showing the relation between DPO upstream exhaust temperature and addition coefficient;

FIG. 27 is a graph showing the relation between elapsed time and DPO upstream exhaust temperature.

FIGS. 29 to 31 illustrate a regeneration timing detection control of a DPO regeneration system according to a second embodiment of the present invention, of which:

FIG. 29 is a flowchart for detecting DPO inlet exhaust gas temperature;

FIG. 30 is a flowchart for detecting DPO internal temperature; and

FIG. 31 is a flowchart for detecting DPO inlet exhaust gas temperature and DPO internal temperature or DPO outlet exhaust gas temperature.

FIGS. 34 to 39 illustrate a timer device in a DPO regeneration system according to a fourth embodiment of the present invention, of which:

FIG. 34 is a sectional view of a VE pump whose injection timing is controlled electronically;

FIG. 35 is a flowchart showing how to effect the control; and

FIGS. 36 to 39 are graphs for explaining operations of the VE pump.

FIGS. 45 to 47 are a construction diagram of a principal portion showing an exhaust passage with a rare metal oxidation catalyst, a block diagram of a principal portion thereof and a partial flowchart, respectively, in a DPO regeneration system according to a seventh embodiment of the present invention.

FIGS. 53 and 54 are a construction diagram showing a regeneration timing detection means with purge mechanism and an explanatory view of a principal portion thereof, respectively, in a DPO regeneration system according to a ninth embodiment of the present invention.

FIGS. 57 to 60 illustrate DPO in a DPO regeneration system according to an eleventh embodiment of the present invention, of which:

FIG. 57 is a exploded perspective view of a principal portion thereof;

FIG. 58 is a transverse sectional view thereof;

FIG. 59 is a sectional view as seen in the direction of arrows LIX—LIX in FIG. 58.

FIGS. 61 to 63 illustrate modifications of DPO in the DPO regeneration system of the eleventh embodiment of the present invention, of which:

FIG. 61 is an exploded perspective view of a principal portion thereof;

FIG. 62 is a transverse sectional view; and

FIG. 63 is a sectional view as seen in the direction of arrows LXIII—LXIII in FIG. 62.

DETAILED DESCRIPTION OF THE PREFERRED EMBODIMENTS

A first embodiment of the present invention will be described hereinunder with reference to FIGS. 1 to 28.

Figure 1:
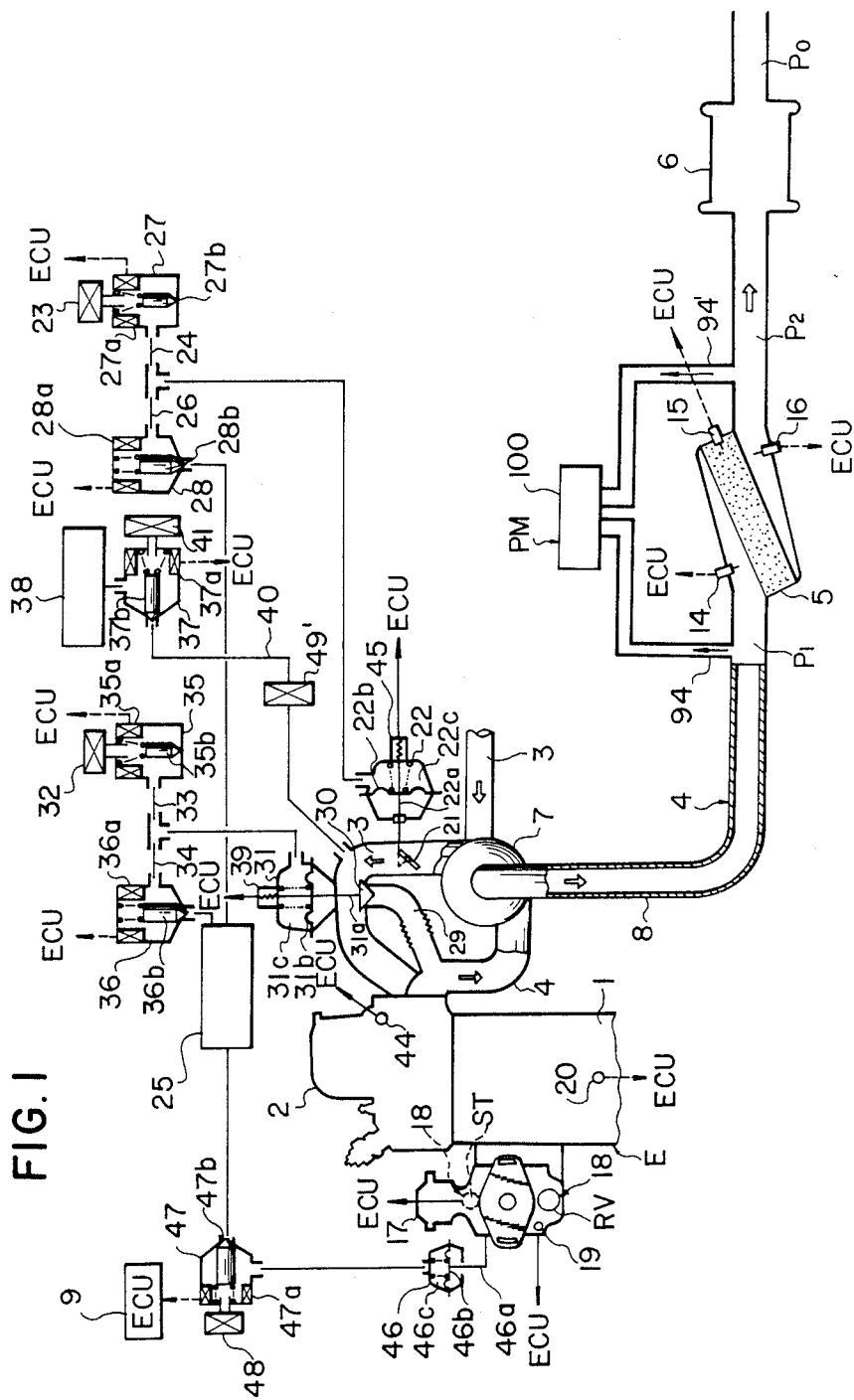

In this embodiment, as shown in FIG. 1, an intake passage 3 and an exhaust passage 4 are connected to a diesel engine E. In the exhaust passage 4 is mounted a DPO for collecting particulates contained in exhaust gas. The DPO 5, which communicates with the atmosphere through a muffler 6, is normally adapted to receive the exhaust gas from the engine E through a turbo-charger 7 and a heat retaining pipe 8.

Figure 2:
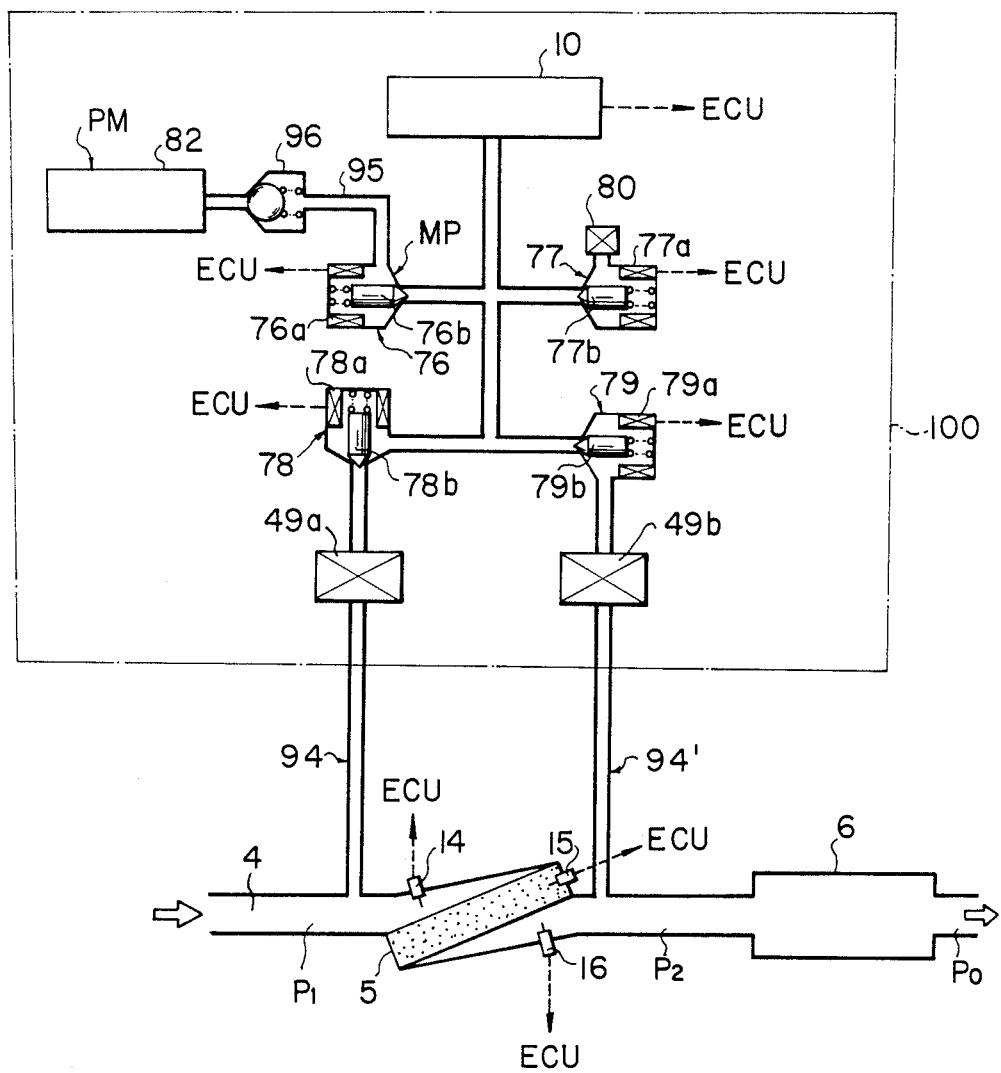

To the exhaust passage 4 is connected a regeneration timing detecting means 100 having a purge mechanism PM on inlet and outlet sides of the DPO 5. A detailed structure of the regeneration timing detecting means 100 is shown in FIG. 2.

Moreover, a temperature sensor (thermocouple) 14 for detecting an exhaust gas temperature $T_{in}$ at the inlet of DPO 5 is attached to the exhaust passage 4 in a position adjacent to an inlet portion (upstream) of the DPO 5. A detected signal from the temperature sensor 14 is fed to an ECU 9 which is a controlled unit for the entirety of this system.

Further, a temperature sensor (thermocouple) 15 for detecting an internal temperature (especially a filter bed temperature) $T_f$ of the DPO 5 is mounted in the DPO 5, and a temperature sensor (thermocouple) 16 for detecting a DPO outlet exhaust gas temperature $T_o$ is attached the exhaust passage 4 in a position adjacent to an outlet portion (downstream) of the DPO 5. Detected signals from the temperature sensors 15 and 16 are fed to the ECU 9.

Attached to the engine E is a fuel injection pump 17 which serves as a regeneration assisting means of DPO 5. The fuel injection timing is adjusted by a fuel injection timing control means 18 which receives a control signal from ECU 9. More specifically, the exhaust gas temperature is raised by retarding the fuel injection timing, and the particulates collected by DPO 5 are burnt off. To the fuel injection pump 17 is attached an injection pump lever opening sensor 19 as a load sensor which outputs to ECU 9 a signal indicative of an injection pump lever opening.

Also provided is an engine speed sensor 20 as an engine condition sensor for detecting the number of revolutions $N_e$ of the engine E.

In the intake passage 3 formed by an intake manifold fixed to the engine E and an intake pipe connected to the intake manifold, there are disposed an air cleaner, a compressor of the turbo-charger 7 and an intake throttle valve 21 as an intake negative pressure changing means, successively from an upstream side (atmosphere side).

The intake throttle valve 21 is adapted to be opened and closed by a diaphragm type pressure responsive device 22. The pressure responsive device 22 has a pressure chamber 22c defined by a diaphragm 22b connected to a rod 22a which drives the intake throttle valve 21. To the pressure chamber 22c are connected an atmosphere passage 24 for introduction of an atmospheric pressure $V_{at}$ through an air filter 23 and a vaccum passage 26 for introduction of a vacuum pressure $V_{vac}$ from a vacuum pump 25. In the passages 24 and 26 are mounted magnet valves 27 and 28, respectively.

The magnet valves 27 and 28 are constructed so that valve portions 27b and 28b are each attracted when a duty control signal is applied from ECU 9 to solenoids 27a and 28a of the magnet valves 27 and 28, respectively, whereby a negative pressure fed to the pressure chamber 22c of the pressure responsive device 22 is adjusted and the rod 22a is drawn in to control the opening of the intake throttle valve 21.

In a portion of the intake passage 3 downstream of the intake throttle valve 21 is open one end of a passage 29 for exhaust gas recirculation (hereinafter referred to as "EGR"). The other end of the EGR passage 29 is open to a downstream side of an exhaust manifold of the exhaust passage 4.

In the intake passage-side opening of the EGR passage 29 is mounted an EGR valve 30 which constitutes an exhaust gas recirculation quantity changing means. The EGR valve 30 is adapted to be opened and closed by a diaphragm type pressure responsive device 31. The pressure responsive device 31 has a pressure chamber 31c defined by a diaphragm 31b connected to a rod 31a which drives the EGR valve 30. To the pressure chamber 31c are connected an atmosphere passage 33 for introduction of an atmospheric pressure $V_{at}$ through an air filter 32 and a vacuum passage 34 for introduction of a vacuum pressure $V_{vac}$ from the vacuum pump 25. In the passages 33 and 34 are mounted magnet valve 35 and 36, respectively.

The magnet valves 35 and 36 are constructed so that valve portions 35b and 36b are each attracted when a duty control signal is applied from ECU 9 to solenoids 35a and 36a of the magnet valves 35 and 36, respectively, whereby a negative pressure fed to the pressure chamber 31c of the pressure responsive device 31 is adjusted and the rod 31a is drawn in to control the opening of the EGR valve 30.

The opening of the intake throttle valve 21 is detected by a feedback signal applied to the ECU 9 from an intake throttle valve opening sensor 45 attached to the rod 22a, while the opening of the EGR valve 30 is detected by a feedback signal applied to the ECU 9 from a position sensor 39 which detects the movement of the rod 31a of the pressure responsive device 31.

Moreover, when a control signal is fed from ECU 9 to a solenoid 37a of a magnet valve 37, a valve portion 37b is attracted, whereby an intake pressure downstream of the intake throttle valve 21 is fed to a pressure sensor 38 through a passage 40 and a water trap 49', while when the valve portion 37b of the magnet valve 37 projects, the atmospheric pressure from an air filter 41 is fed to the pressure sensor 38.

Further, to the injection pump 17 is connected a diaphragm type pressure responsive device 46 as an idle-up actuator which constitutes an idle-up mechanism. The pressure responsive device 46 has a diaphragm 46b connected to a rod 46a which drives an idle-up control portion in the injection pump 17. To a pressure chamber 46c defined by the diaphragm 46b is connected a magnet valve 47 which functions to bring the pressure chamber 46c into communication with the vacuum pump 25 or an air filter 48. Normally, the air filter 48 and the pressure chamber 46c are in communication.

When a duty control signal is applied from ECU 9 to an idle-up actuator controlling solenoid 47a of the magnet valve 47, a valve member 47b is attracted, whereby the pressure (negative pressure fed to the pressure chamber 46c of the pressure responsive device 46 is adjusted and the rod 46a is attracted to control the idle-up condition (high speed idling condition).

The regeneration timing detecting means 100 attached to the exhaust passage 4 on inlet and outlet sides of the DPO 5 is provided with an exhaust gas pressure sensor 10 which detects an exhaust gas pressure in each position and outputs detected signals to ECU 9 as will be described later, the sensor 10 being mounted through valves 78 and 79, as shown in FIG. 2.

The magnet valves 79 and 78 receive at the respective solenoids 78a and 79a control signals provided from the electronic control unit (ECU) 9 constituted by a computer, etc. and serving also as a regeneration assisting mechanism control means, an opening/closing valve control means, a computing section, an operation end detection portion and a purge mechanism control section, whereby the valve portions 78b and 79b are attracted. In an attracted (open) condition of the valve portion 79b and projected (closed) condition of the valve portion 78b, there is detected an exhaust gas pressure $P_2$ at a downstream (outlet) side of DPO 5, while when the valve portions 78b and 79b are in attracted (open) and projected (closed) conditions, respectively, there is detected an exhaust gas pressure $P_1$ at an upstream (inlet) side of DPO 5.

Further provided is a magnet valve 77 whose valve portion 77b is attracted when a control signal is applied to a solenoid 77a from ECU 9, whereby in an attracted (open) condition of the valve portion 77b, there is detected an atmospheric pressure (i.e. a pressure equal to a downstream side pressure of the muffler 6) through an air filter 80.

Downstream (outlet) or upstream (inlet) side exhaust gases are fed to the magnet valves 78 and 79 through filter devices 49a and 49b for the exhaust gas pressure sensor which are mounted in exhaust gas pressure detecting pipes 94 and 94'.

Figure 3A:
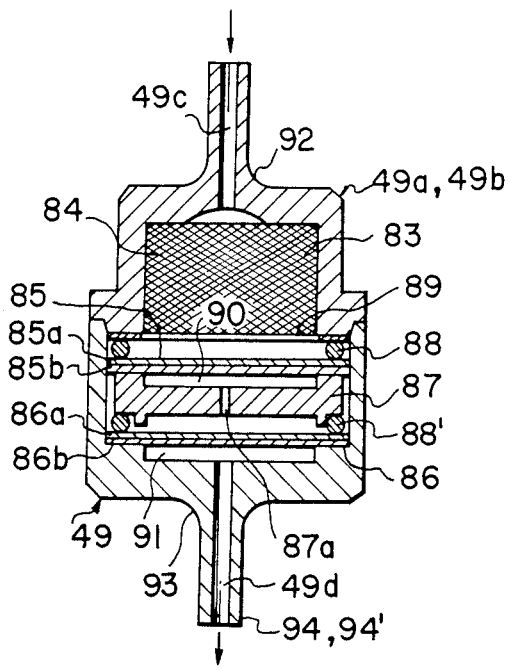
FIGS. 3(a) and (b) are a sectional view and a schematic illustration, respectively, showing a filter device.
Figure 3B:
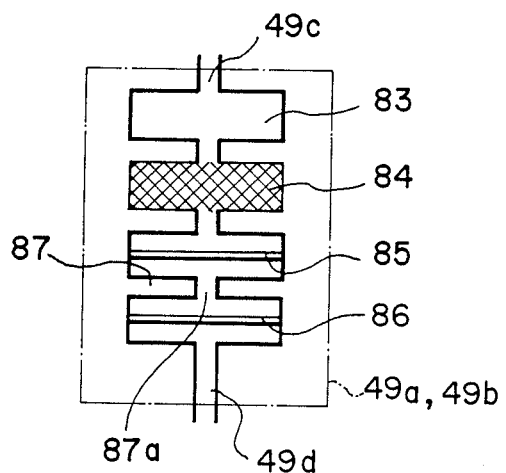

The filter devices 49a and 49b each have a casing 49 which comprises two housings 92 and 93. Within the casing 49 are disposed, successively from an exhaust passage side inlet 49c to an exhaust pressure sensor side outlet 49d, an exhaust pulsation damping volume 83 which contains a wire mesh 84, a first-stage filter 85, a spacer 87 and a second-stage filter 86, as shown in FIGS. 3(a) and 3(b).

Since the casing 49 is disposed away from the exhaust passage 4, the wire mesh 84 serves as a water trap (gas-water separator). More particularly, it functions to cool and condense steam contained in the exhaust gas to prevent water from entering the sensor diaphragm portion of the exhaust gas pressure sensor 10.

The wire mesh 84 is disposed in the space within the casing 49 which forms the exhaust pulsation damping volume 83. The damping volume 83 supplies the exhaust gas after pulsation damping to the filters 85 and 86.

The filter 85 comprises a filter portion 85a made of PVF and a filter portion 85b made of AC-26, while the filter 86 comprises a filter portion 86a made of PVF and a filter portion 86B made of AC-26. The first-stage filter 85 is disposed between a plate 89 made of SUS as well as an O-ring 88 made of FRM and the spacer 87 made of PBTB, while the second-stage filter 86 is disposed between the spacer 87 as well as an O-ring 88' made of FRM and the casing 49. The spacer 87 is centrally formed with a hole 87a.

Exhaust gas pressure sensor 10-side volumes 90 and 91 of the filters 85 and 86 respectively are set to minimum levels for reducing the amount of gas passing through the filters 85 and 86. The volume 91 is in communication with the exhaust gas pressure sensor 10 through exhaust gas pressure detecting pipes 94 and 94'.

That the exhaust gas pressure sensor 10-side volumes 90 and 91 of the filters 85 and 86 are set small is for the following reason.

The among of gas flowing through the filters 85 and 86 depends on the pulsation of exhaust gas, and when the exhaust gas pressure fed to the filters 85 and 86 changes from $(P - \Delta P/2)$ to $(P + \Delta P/2)$, the mass of gas passing through the filters 85 and 86 becomes as follows:

$$\Delta G = G_+ - G_- = (\Delta P \cdot V)/RT$$

At this time, the volume $\Delta V$ (pressure P, gas temperature T) becomes as follows:

$$\Delta V = \Delta GRT/P = (\Delta P \cdot V)/P$$

Thus, the flow rate of gas dependent on the exhaust pulsation is proportional to the product of a pulsation amplitude ΔP and a filter upstream volume (volume from the filters 85 and 86 up to the sensor diaphragm portion) V (ignoring the dead volume of the sensor).

Further, a purge mechanism PM is provided as shown in FIG. 2, and compressed air, which is fed from a compressed air supply means (the compressor of the turbo-charger 7 is here used) through a compressed air supply pipe 95 via a check valve 96, is switched over by a magnet valve 76 which serves as a compressed air supply control means MP. The magnet valve 76 is adapted to open and close a valve portion 76b when a control signal is applied to its solenoid 76a from ECU 9. During operation of the purge mechanism PM, the magnet valves 76 and 78 are open, so that soot and moisture are purged to the exhaust passage 4 from the filter 85 and wire mesh 84 of the filter device 49a.

Further, by supplying an oxygen gas-containing high temperature gas for particulate combustion from the diesel engine E to DPO 5, the particulates which have been collected by the DPO 5 are allowed to burn to regenerate the DPO 5. The fuel injection timing control means 18 comprises a retarding device for retarding the fuel injection timing of the injection pump 17.

Since the injection pump 17 is constituted as a distribution type injection pump, the fuel injection timing control means 18 employs a hydraulic type automatic timer (internal timer) in which a timer piston is driven by an oil pressure (fuel pressure) provided from the hydraulic pump to move the position of a cam plate relative to a roller.

Figure 4:
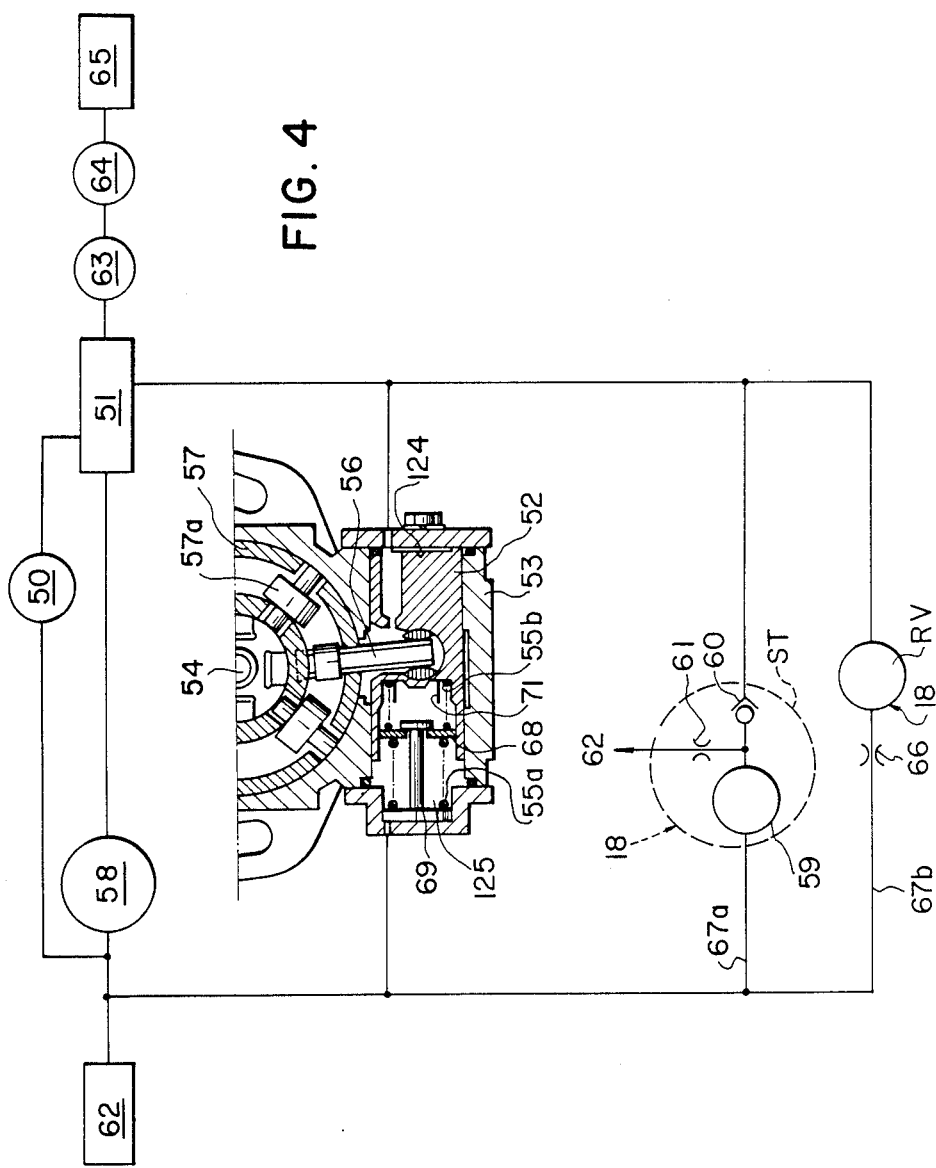

The above hydraulic type automatic timer constitutes a VE type timer having a load sensing timer mechanism, as shown in FIGS. 4 to 7. It is operated by a fuel pressure in a pump chamber 51 controlled by a regulating valve 50, as shown in FIG. 4. A timer piston 52 is disposed within a pump housing 53 perpendicularly to a pump drive shaft 54 and is adapted to slide within the housing 53 under balance between changes of the feed oil pressure and the biasing forces of timer springs 55a and 55b, whereby the movement of the timer piston 52 is converted to a motion for rotating a cylindrical roller ring 57 through a slide pin 56.

The timer springs 55a and 55b urge the timer piston 52 in an injection retarding direction, and with increase of the engine speed, the fuel pressure in the pump chamber 51 is increased by the action of a feed pump 58, so that the timer piston 52 is pushed against the timer spring force. With this movement of the timer piston 52, the roller ring 57 is rotated in a direction opposite to the rotational direction of the drive shaft to advance the injection timing. The pressure of the oil fed from the pump chamber 51 becomes high in a plunger 63 and is fed to a fuel injection nozzle 65 through a delivery valve 64.

Further, as shown in FIG. 4, there are provided hydraulic passages 67a and 67b which permit communication between high and low pressure chambers 124 and 125 of the timer piston 52. In the hydraulic passage 67a are mounted a high advance characteristic/middle advance characteristic change-over port 59 for a solenoid timer (opening/closing valve) ST and a check valve 60 for accelerating the rise of oil pressure at the time of start-up of the engine. The portion of the hydraulic passage 67a located between the check valve 60 and the change-over port 59 is in communication with an oil tank 62 through an overflow orifice 61. Oil is fed from the oil tank 62 to the pump chamber 51 by means of the feed pump 58.

Figure 5:
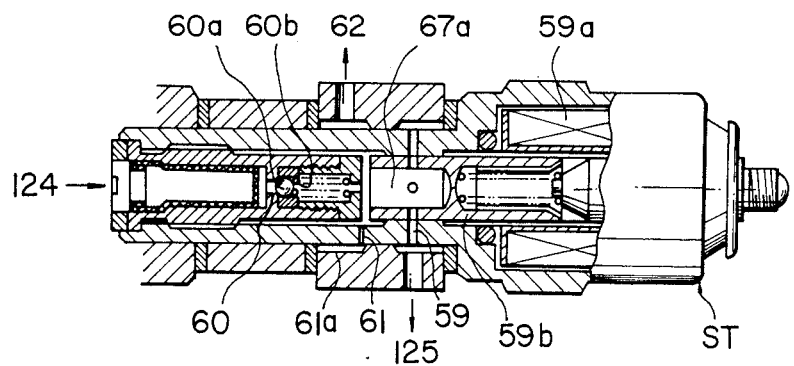

In the body of the solenoid timer ST are incorporated the check valve 60 and the overflow orifice 61, as shown in FIG. 5. Further, the hydraulic oil fed from the high pressure chamber 124 of the timer piston 52 causes a valve portion 60a to open against the biasing force of a spring 60b and is fed to the change-over port 59, so that the high and low pressure chambers 124 and 125 of the timer piston come into communication with each other.

When there is not control signal applied to a solenoid 59a of the solenoid timer ST (during OFF), the change-over port 59 is open as shown in FIG. 5, so the pressure of the high pressure chamber 124 affects the low pressure chamber 125, thus making small the difference in pressure between both chambers. Consequently, the injection timing is retarded as a whole, affording a middle advance (M) characteristic at partial retard as shown in FIG. 6(a).

Figure 6A:
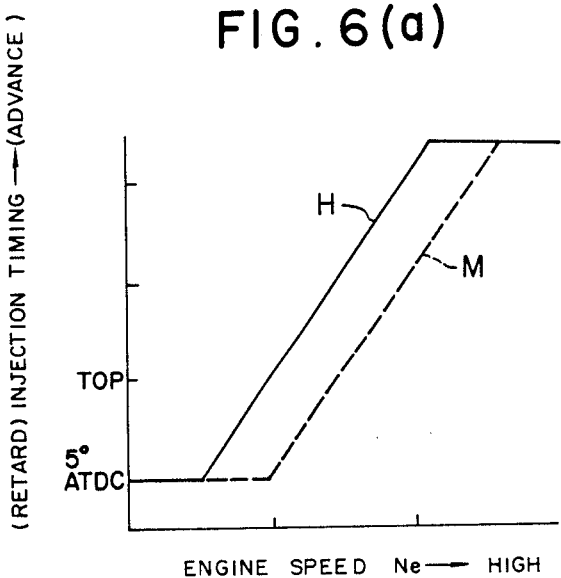
FIGS. 6(a) and (b) are graphs for exaplanation of required advance characteristics (required fuel injection timing characteristics)

On the other hand, when a control signal is fed to the solenoid 59a (during ON), a valve portion 59b moves to the right in FIG. 5 and the change-over port 59 becomes closed to completely cut off the communication between the high and low pressure chambers 124 and 125 of the timer piston 52, so that the injection timing advances as a whole in comparison with the time when the solenoid timer ST is off, thus affording a high advance (H) characteristic as shown in FIG. 6(a).

Figure 6B:
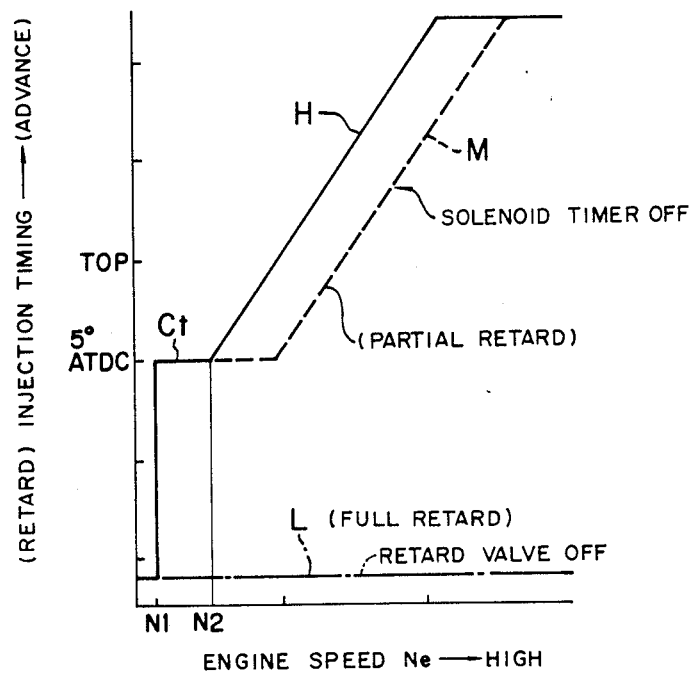

The overflow orifice 61 is connected to a ring-like passage 61a. In the hydraulic passage 67b are mounted an orifice 66 and a retard valve RV as an opening/closing valve. The retard valve RV opens or closes the hydraulic passage 67b in accordance with a control signal provided from ECU 9. Therefore, when the retard valve RV is off (open), there is little difference in pressure between the high and low pressure chambers 124 and 125 of the timer piston 52, so that the timer piston 52 moves to te right in FIG. 4 and the injection timing assumes a full retard (L) state as shown in FIG. 6(b). On the other hand, when the retard valve RV is on (closed), the hydraulic passage 67b is intercepted completely, so that the characteristics induced by the solenoid timer ST disposed in the hydraulic passage 67a are obtained (FIG. 6(a)).

Figure 7:
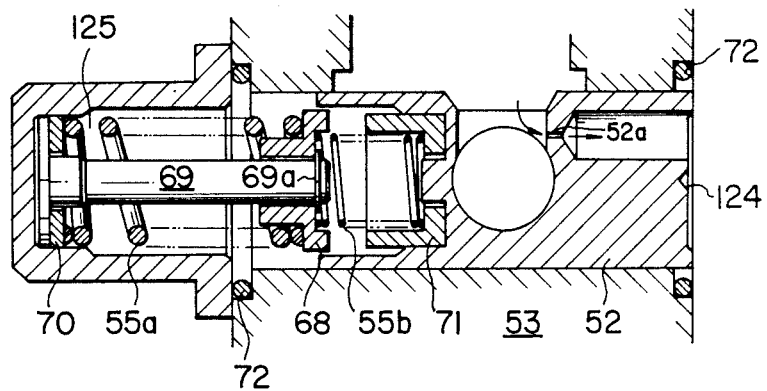

The hydraulic oil from the pump chamber 51 is received in the high pressure chamber 124 through an oil passage 52a, and the position of the timer piston 52 is adjusted by this oil pressure and also by the biasing forces of the two springs 55a and 55b disposed on the side of the low pressure chamber 125, whereby the roller ring 57 is rotated to adjust the fuel injection timing, as shown in FIG. 7.

More specifically, the second timer spring 55b, which is soft, is disposed between a stopper 71 fixed to the timer piston 52 and a retainer 68, and when the oil pressure which has been increased with starting of the engine E is fed to the high pressure chamber 124, the timer piston 52 moves until the stopper 71 and the retainer 68 come into contact with each other, and the fuel injection timing become 5° ATDC (After Top Dead Center) as shown in FIG. 6(b).

Then, as the oil pressure is increased by the load sensing timer mechanism in accordance with the number of revolutions of the engine E, the first timer spring 55a is compressed and the timer piston 52 moves to the left in FIG. 7.

More specifically, the retainer 68 is slidably fitted on a rod 69, and the first timer spring 55a is held in a precompressed state between the retainer 68 which is retained by a snap ring 69a and a shim 70. Therefore, it is possible to obtain a constant injection timing characteristic in the range from N1 to N2 (>N1) of the engine speed as indicated by the reference mark $C_t$ in FIG. 6(b). Thus, the high advance (H), middle advance (M) and low advance (L) characteristics can be changed over from one another as shown in FIG. 6(b) by the action of the solenoid timer ST, retard valve RV and timer piston 52.

When the fuel injection timing is retarded, an increment $\Delta Q$ of the fuel injection quantity per stroke of the fuel injection pump 17 for obtaining the same output does not appear as an increase of an average effective pressure as an effective work of the engine E but is released as heat loss by greatly decreasing the thermal efficiency of the engine E by setting a retard quantity $\alpha$.

More specifically, a heat quantity corresponding to a total fuel quantity Q per stroke corresponds to the sum of work done and heat loss. A quantity of fuel corresponding to the fuel increment $\Delta Q$ is all released as heat loss by setting a retard quantity $\alpha$ to suppress increase and decrease of the work done itself. Such heat loss causes increase of the exhaust gas temperature, and at the same time the product of incomplete combustion is oxidized by the catalyst on the DPO 5 to generate combustion heat, thus resulting in increase of the exhaust gas temperature.

Thus, by retarding the injection timing as above, the exhaust gas temperature at the same output point becones high enough to burn the particulates on the DPO 5, whereby the DPO 5 can be regenerated.

At the end of regeneration of the DPO 5, a signal for closing the solenoid timer ST is provided from ECU 9. At this instant, a signal for setting the opening of the intake throttle valve 21 to a predetermined value is also provided from ECU 9.

When the injection timing is retarded for regeneration of DPO 5 as described above, the output drops even at a constant opening of an accelerator pedal, so if there is used a mechanism for preventing such drop of output by increasing the fuel injection quantity, it becomes possible to prevent the deterioration of drivability caused by the regeneration of DPO 5.

Figure 8:
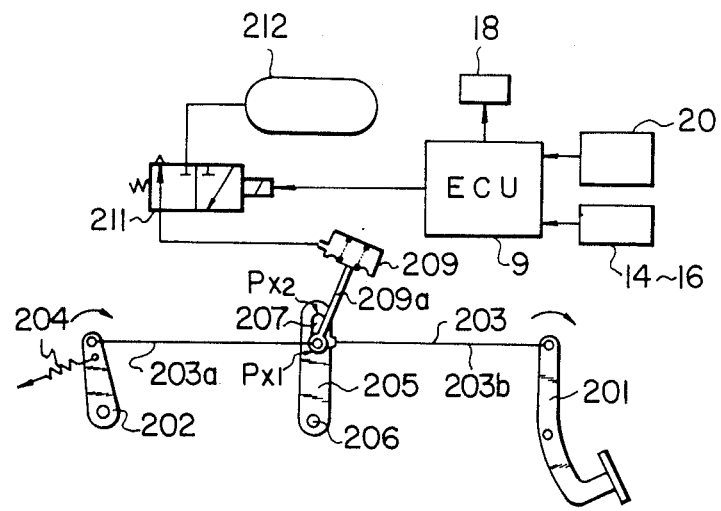
Figure 9:
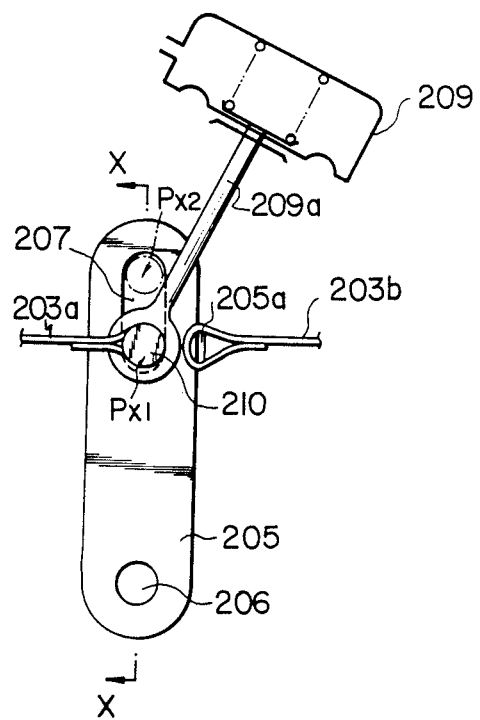
Figure 10:
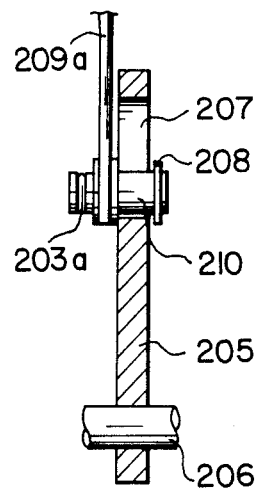

As shown in FIG. 8, an accelerator pedal 201 and a fuel injection quantity control lever (hereinafter referred to simply as the "pump lever") of the fuel injection pump are interconnected through a wire 203 to constitute a link mechanism. To the pump lever 202 is fixed a return spring 204 for urgin the pump lever 202 to the fuel decrement side. The wire 203 which interconnects the accelerator pedal 201 and the pump lever 202 extends through an intermediate lever 205. As shown in FIGS. 9 and 10, the inermediate lever 205 has a long hole 207 on the side opposite to a pivot shaft 206. Fitted slidably in the long hole 207 is a pin 210 one end of which is prevented from coming off the hole by means of a stopper ring 208 and the other end of which is pivoted to an actuating rod 209a of a vacuum motor 209. One end of a wire 203a on the side of the pump lever 202 is connected to the pin 210, while one end of a wire 203b on the side of the accelerator pedal 201 is connected to a lug 205a of the intermediate lever 205. The vacuum motor 209 is connected to a vacuum tank 212 through a three-way magnet valve 211, as shown in FIG. 8. The magnet valve 211 is controlled by the ECU 9 which is a control section of the DPO regeneration system.

In a normal condition in which the magnet valve 211 is off, the vacuum motor 209 communicates with the atmosphere and the actuating rod 209a therefore is in its extended position, so the pin 210 is positioned at the lowest end $P_{x1}$ of the long hole 207. In this state, the wires 203a and 203b which interconnect the accelerator pedal 201 and the pump lever 202 extend straight, and the opening of the acceleraor pedal 201 and that of the pump lever 202 are almost equal to each other.

When the ECU 9 judges that the regeneration timing for the DPO 5 has come on the basis of signals indicative of the engine speed, accelerator pedal opening, exhaust gas pressure upstream of DPO 5, it produces a retard signal to retard the injection timing of the injection pump, and at the same time it produces a signal for turning on the magnet valve 211, whereby the vacuum motor 209 is brought into communication with the vacuum tank 212. As a result, the actuating rod 209a is attracted, so the pin 210 moves to a top position $P_{x2}$ of the long hole 207, thus becoming longer in distance from the pivot shaft 206 of the intermediate lever 205 and causing increase in the lever ratio relative to the pump lever 202. Consequently, the pump lever 202 pivots so much to the fuel increment side, thus permitting fuel to be injected in an extra quantity even at the same accelerator pedal opening.

Figure 11:
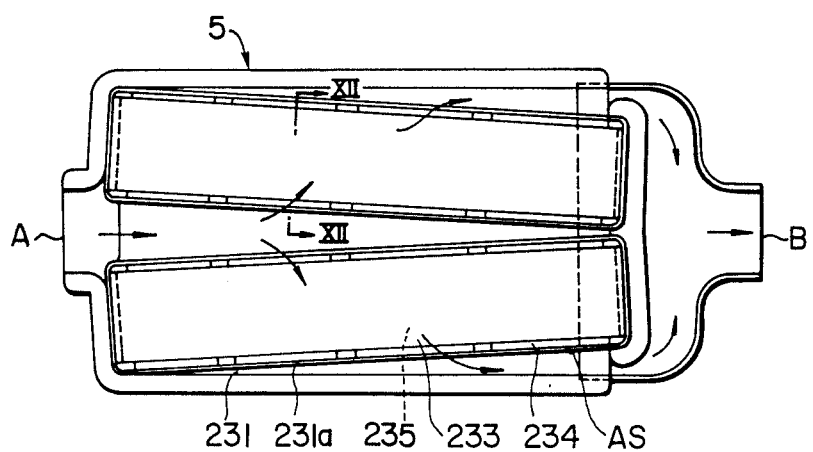
Figure 12:
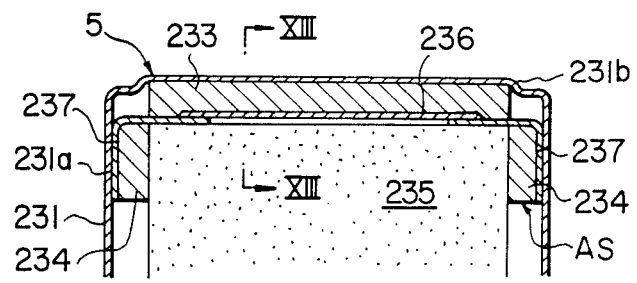
Figure 13:
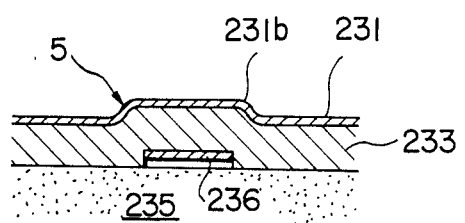

The mounting structure and shape of a ceramic foam 235 serving as a trap carrier of DPO 5 will be explained below with reference to FIGS. 11 to 13.

In the exhaust system of the engine E is mounted a clamshell casing 231 which is divided into upper and lower portions. The casing is hermetically sealed by engaging peripheral edges of its upper and lower portions. Within the clamshell casing 231 is mounted the foam 235 with catalyst for collecting particulates contained in the exhaust gas. The ceramic foam 235 is in the form of an elliptic cylinder, with its bottom opposed to the flow of exhaust gas from an upstream side A to a downstream side B as indicated by arrows in FIG. 11.

The clamshell casing 231 is formed with an recess 231a for receiving therein the outer peripheral portion of the ceramic foam 235. On the other hand, in the ceramic foam are disposed elliptic ring-like axial support members 234 which engage both axial end faces (bottom faces) at the outer peripheral portion of DPO 5. The axial support members 234, which are disposed on both end faces of the ceramic foam, are covered at plural portions thereof with plural metallic end members 237. The metallic end members 237 cover the axial support member 234 from the exterior and they bend and extend so that the extending portions engage the peripheral surface of the ceramic foam 235.

Opposed ones of the metallic end members 237 are interconnected through a bridge member 236. The axial support members 234 are pressed against both end faces of the ceramic foam 235 by means of bridge members 236 through te metallic end members 237 to prevent them from coming off the ceramic foam 235. The thickness of the ceramic foam 235, including the metallic end members 237 and axial support members 234, are fitted in the recess 231a of the clamshell casing 231.

A radial support member 233 is would round the outer peripheriy of the ceramic foam 235 with the metallic end members 237 and bridge members 236 mounted thereon. The outer periphery of the radial support member 233 is formed so as to engage the bottom faces of the clamshell casing 231. Further, the clamshell casing 231 is formed with a bulge 231b in the positions corresponding to the bridge members 236 so as to permit swelling of the radial support member 233 caused by the bridge members 236.

The axial support member 234 is formed of wire mesh or the like, while the radial support member 233 is formed of a thermally foamable ceramic fiber or the like.

The thus-formed ceramic foam 235, axial support members 234, metallic end members 237, bridge members 236 and radial support member 233 are assembled integrally to constitute an asssembly AS. The assembly AS is then fitted in the recess 231a of the clamshell casing 231, and thus the diesel particulate filter device is completed.

In assembling the diesel particulate filter device thus constituted according to the first embodiment of the present invention, first the axial support members 234 are attached to both end faces of the outer peripheral portion of the ceramic foam 235, then the metallic end members 237 are fitted over the axial support members 234 and then interconnected through the bridge member 236. In this case, the distance between outside end faces of the metallic end members 237 is adjusted so that both outside faces of the metallic end members 237 are fitted in the recess 231a of the clampshell casing 231. Then, the radial support member 233 is wound round the outer periphery of the ceramic foam 235 with the bridge members 236 and metallic end members 237 thus mounted thereon. In this way there is obtained the asssembly AS which comprises ceramic foam 235, axial support members 234, metallic end members 236 and radial support member 233.

The assembly AS is then fitted in the recess 231a of either the upper or lower portion of the clamshell casing 231 and then in the recess of the other portion. Now the diesel particulate filter device is completed.

Figure 14:
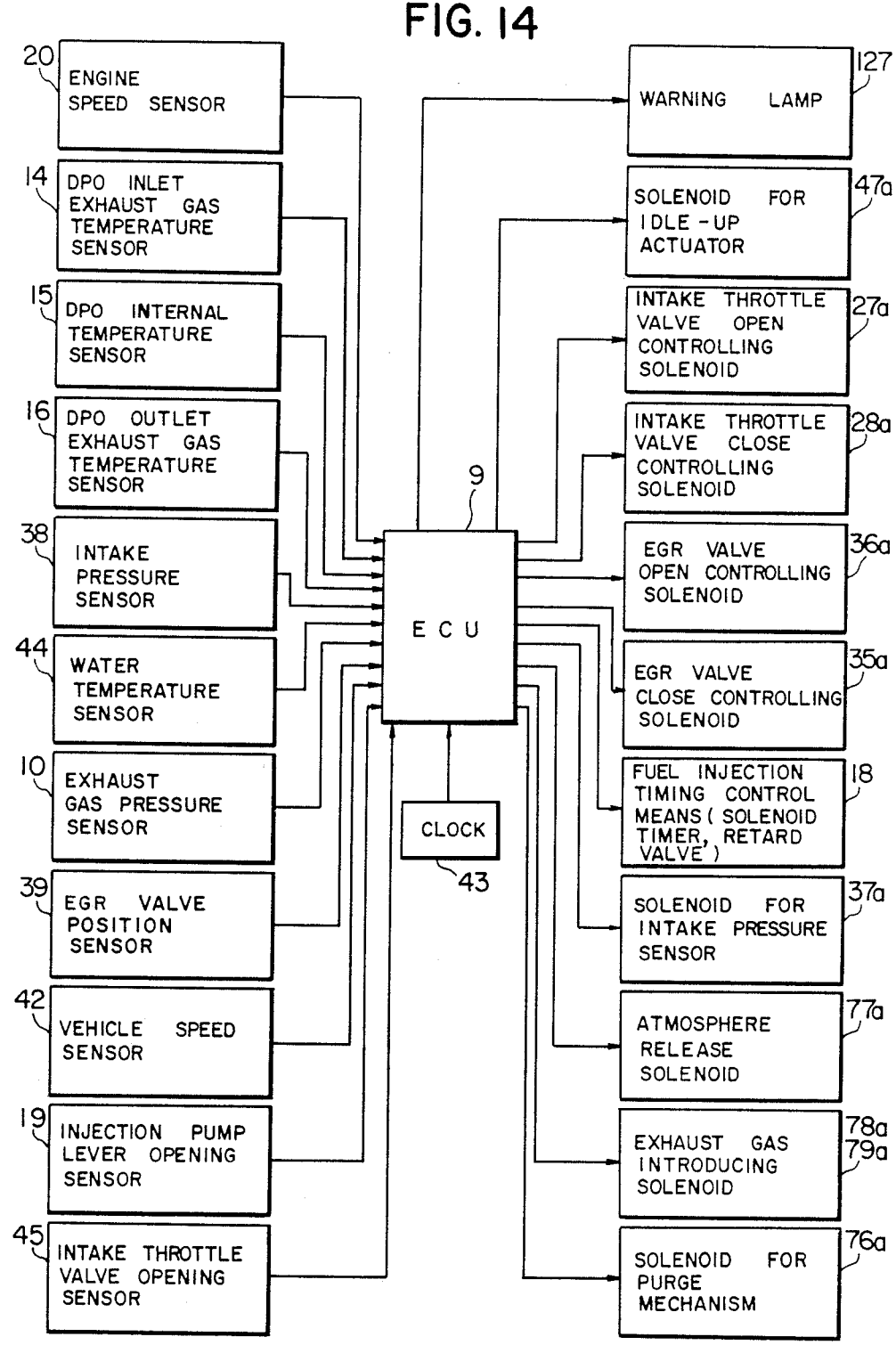

The reference numerals 1, 2 and 44 in FIG. 1 denote a cylinder block, a cylinder head and a temperature sensor as an engine status sensor for detecting the engine temperature (here the cooling water temperature), respectively, while the numerals 42, 43 and 127 in FIG. 14 denote a vehicle speed sensor, a clock and a warning lamp, respectively.

Figure 15:
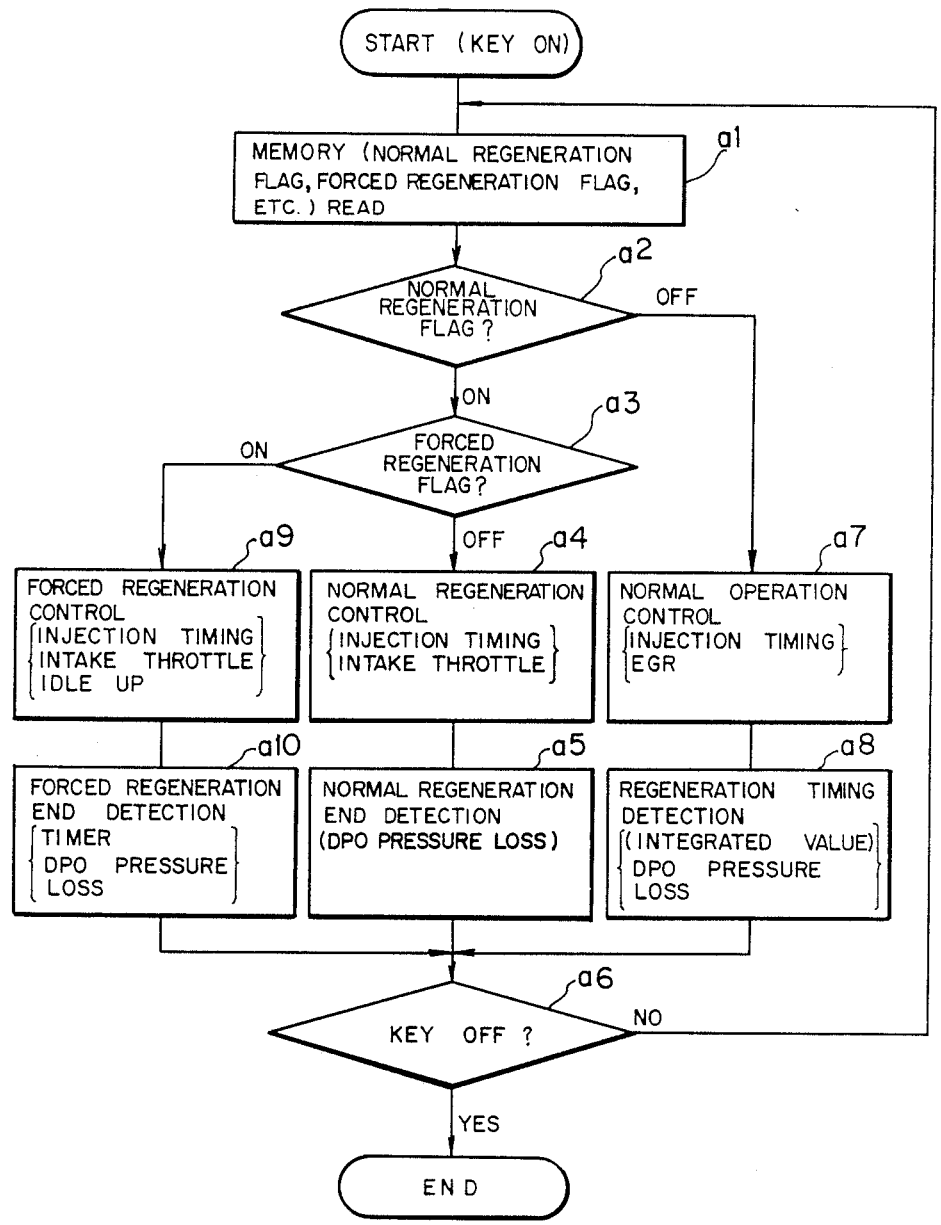

In the diesel particulate oxidizer regeneration system constructed as above according to the first embodiment of the present invention, the control flow for the entire system is as shown in FIG. 15.

The regeneratiion system of the present application consists of the system of normal regeneration and the system of forced regeneration.

First, when the key switch is turned on (for example, to the accessory position), the system starts operating and Normal Regeneration Flag, Forced Regeneration Flag, etc. are read (Step a1) to read out in what conditions the key was turned off in the operating state preceding by one.

As will be described later, Normal Regeneration Flag is formed so that it turns ON when the quantity of particulates deposited in DPO 5 exceeds a preset value (corresponding to 70 g. in this embodiment) and turns OFF at a deposit quantity not larger than a preset value (corresponding to 20 g. in this embodiment). Forced Regeneration Flag is formed so that it turns ON when the quantity of particulates deposited in the filter exceeds a larger preset vsluse (corresponding to 80 g. in this embodiment) and turns OFF after the lapse of a predetermined time after turning ON of Forced Regeneration Flag.

In the above control flow of the entire system, if Normal Regeneration Flag is ON and Forced Regeneration Flag is OFF (Steps a2 and a3), there is performed a normal regeneration control by control of the injection timing and the intake throttle quantity (Step a4), and whether the normal regeneration has been completed or not is detected on the basis of a pressure loss of DPO 5 (Step a5).

In the case where both Normal Regeneration Flag and Forced Regeneratiion Flag are ON, there is performed a forced regeneration control by controlling the injection timing and the intake throttle quantity and be effecting idle-up (Step a9), and whether the forced regeneration has been completed or not is detected on the basis of the status of the timer and that of pressure loss of DPO 5 (Step a10).

Further, when Normal Regeneration Flag is OFF, there are performed normal injection timing control and EGR control (Step a7), and the detection of regeneration timing is made on the basis of an integrated value of diesel particulates and pressure loss DPO 5 (Step a8).

In the case where the termination of the normal regeneration control or forced regeneration control has been detected, or after judgment of the proper regeneration timing, a judgment is made as to whether the key is OFF or not (Step a6), and if the key is ON, processing is started again from Step a1. That is, during a non-regeneration period, the processing flow (Step a1→a2-→a7→a8→a6) is executed, waiting for the time when Normal Regeneration Flag or Forced Regeneration Flag turns ON.

Figure 16:
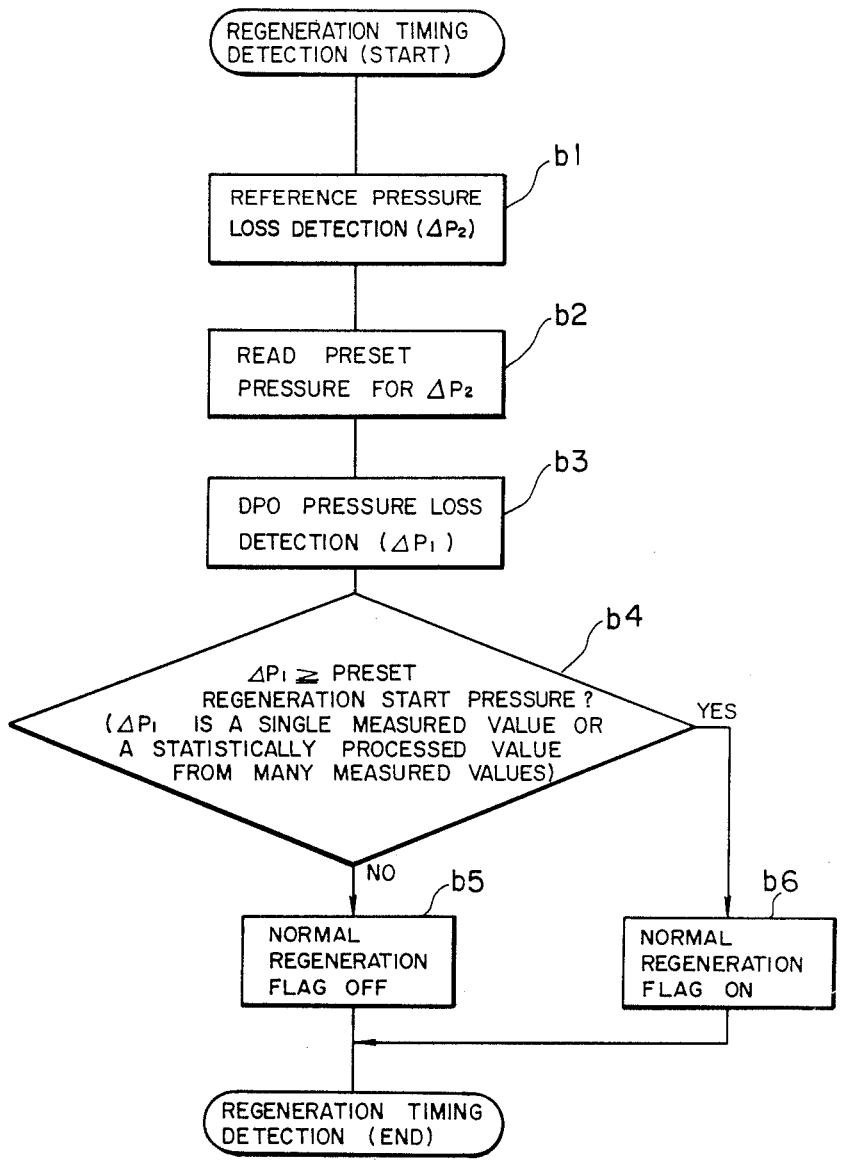

The processing flow for detecting the regeneration timing is as shown in FIG. 16, in which Normal Regeneration Flag is turned ON upon detection of the regeneration timing. First, with the valve portions 76b and 77b in FIG. 2 closed, a control signal is fed to the solenoid 79a to open the valve portion 79b, while the valve portion 78b is closed, and the pressure $P_2$ at the downstream side of DPO 5 is detected by the exhaust gas pressure sensor 10 (Step b1). To detect the pressure $P_1$ at the upstream side of DPO 5 by the exhaust gas pressure sensor 10, the valve portion 78b is opened and the valve portion 79b closed (Step b3), and to detect the atmospheric pressure $P_0$ by the exhaust gas pressure sensor 10, the valve portions 78b, 79b and 76b are closed and the valve portion 77b opened.

Figure 17:
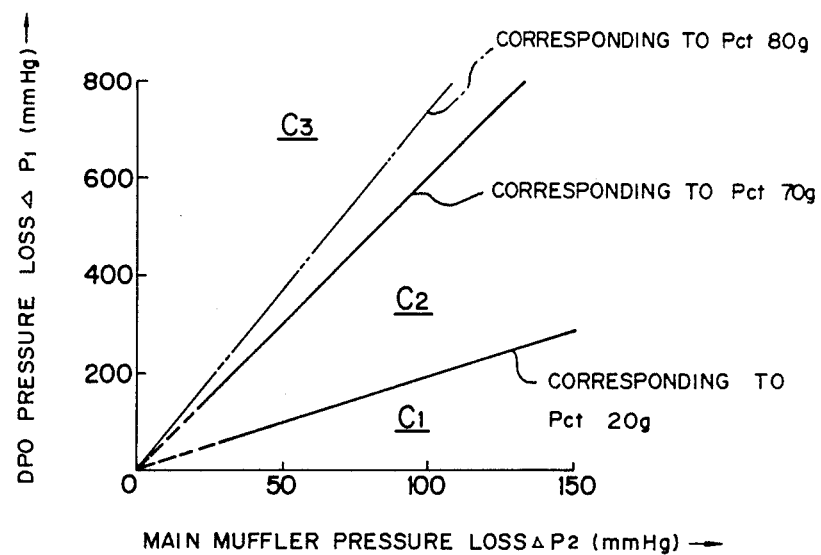

From the values thus detected, a main muffler pressure loss ($P_2-P_0$) and DPO pressure loss ($P_1-P_2$) are determined (Steps b2 and b3). When the main muffler pressure loss and DPO pressure loss shift from region $C_2$ to region $C_3$ relative to a boundary line which corresponds to a particulate ($P_{ct}$) loading quantity of say 70 g. as shown in FIG. 17, YES is judged in Step b4 and Normal Regeneration Flag turns ON (Step b6). Further, at the time of shift from a region of a smaller loading quantity to a region of a larger loading quantity with respect to a boundary line which corresponds to a particulate loading quantity of 80 g., Forced Regeneration Flag turns ON.

In other cases than the judgment of YES, Normal Regeneration Flag turns OFF (Step b5). Once regeneration is started, flow does not cut in the processing flow for regeneration timing detection, so when the main muffler pressure loss and DPO pressure loss are present in the region $C_2$ shown in FIG. 17, the present status of Normal Regeneration is maintained (Step b5).

In Step b4, judgment may be made as to whether the DPO pressure loss $\Delta P_1$ is above a present regeneration start pressure or not, without judging the Pct loading quantity according to the foregoing map. In this case, as the DPO pressure loss $\Delta P_1$ there may be used a single measured value, or a mean value in a number of measurements or a value based on another statistical processing to eliminate variations in measured values.

Figure 18:
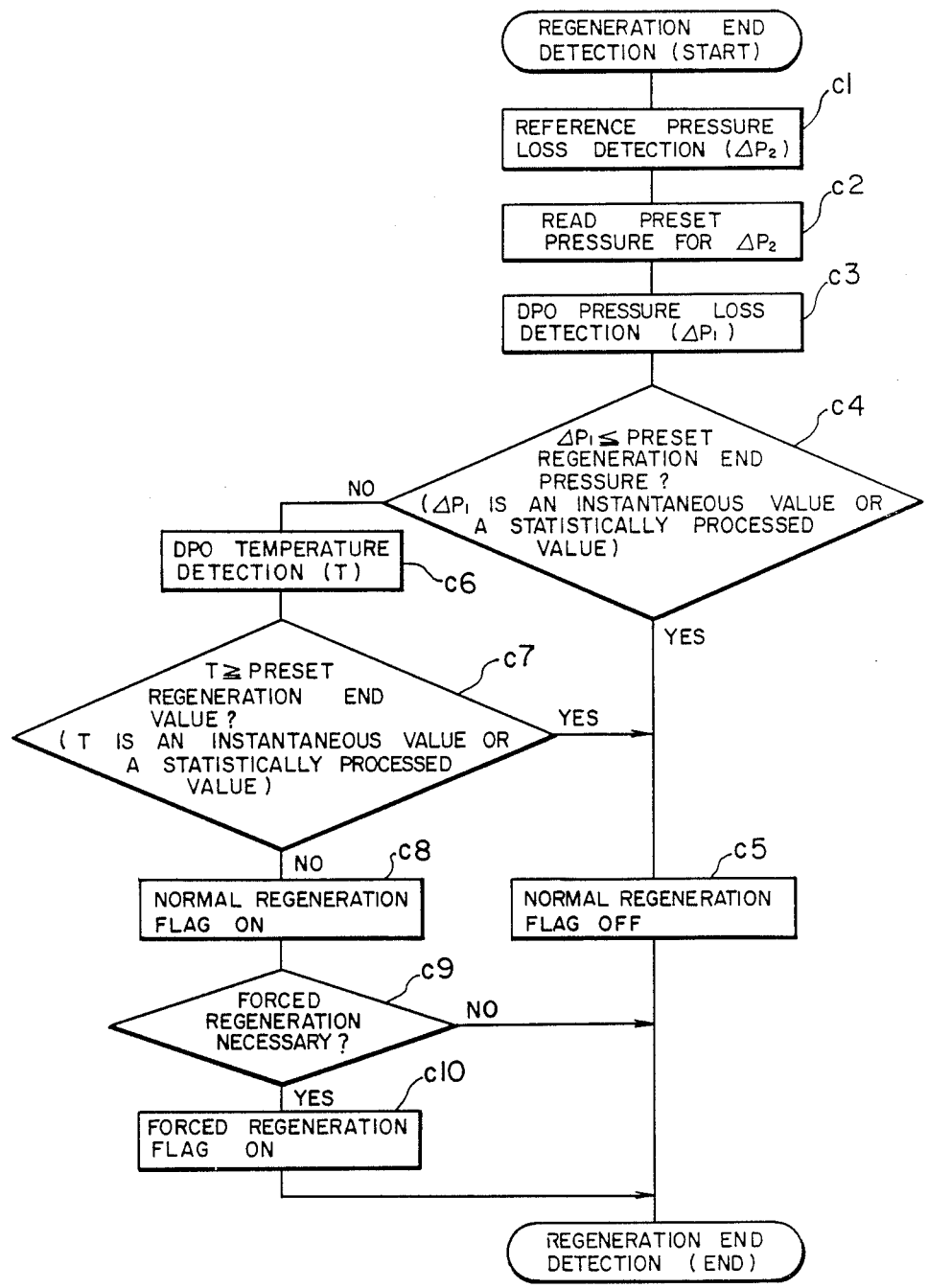

Referring now to FIG. 18, there is shown a processing flow for detecting the end of regeneration timing, in which main muffler pressure loss $\Delta P_2(P_2-P_0)$ and DPO pressure loss $\Delta P_1(P_1-P_2)$ are determined (Steps c1 to c3) in the same way as in Steps b1 to b3 of the regeneration timing detection flow. When the main muffler pressure loss and DPO pressure loss shift from region $C_2$ to $C_1$ with respect to a boundary line which corresponds to a particulate ($P_{ct}$) loading quantity of say 20 g. as shown in FIG. 17, YES is judged in Step c4 and Normal Regeneration Flag turns OFF (Step c5).

In other cases than the judgment YES, first detected signals on the temperature of DPO 5 are received from the temperature sensos 14–16 (Step c6), and when the DPO 5 temperature T is not lower than a preset regeneration end value (step c7), Normal Regeneration Flag is turned OFF (Step c5).

On the other hand, when the DPO temperature T is lower than the preset regeneration end value, Normal Regeneration Flag is turned ON (Step c8), and if a forced regeneration is necessary (Step c9), Forced Regeneration Flag turns ON (Step c10).

Steps c6 and c7, which are used for detecting the regeneration end considering temperature may be omitted.

In addition to Normal Regeneration Flag, there may be used Anticipation Flag anticipating that regeneration will be performed and self-burning completed when the DPO temperature exceeds a predetermined level. In this case, once this Regeneration End Anticipation Flag turns ON, the operation of the regeneration assisting mechanism is prohibited.

Figure 19:
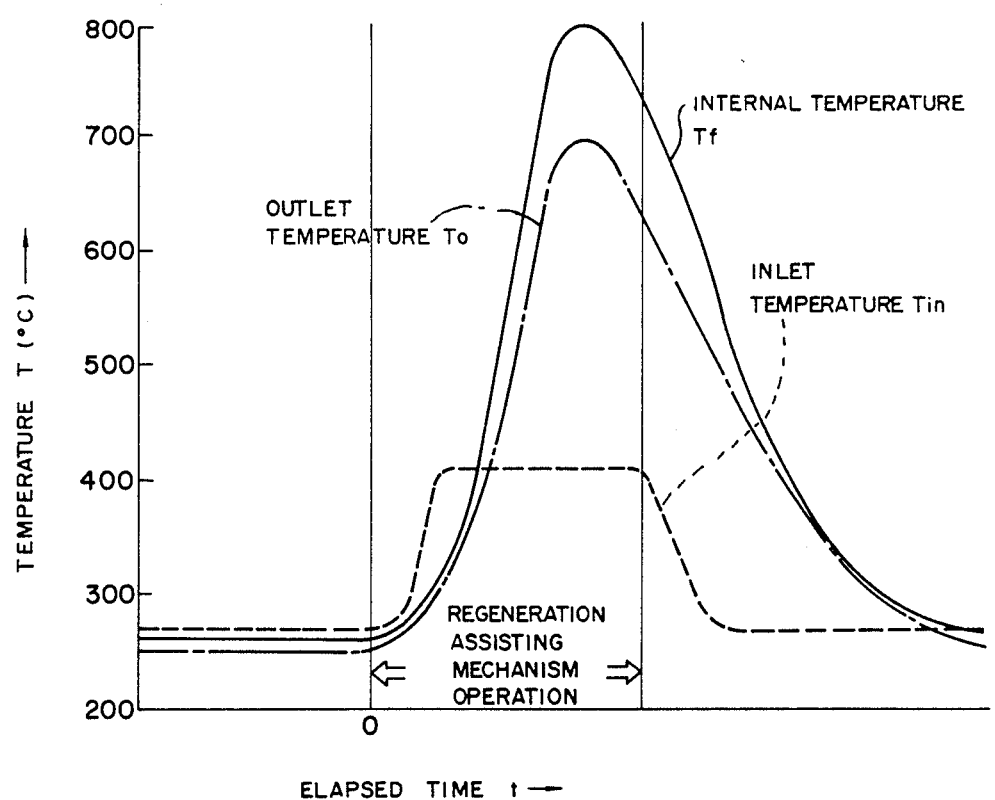
Figure 20:
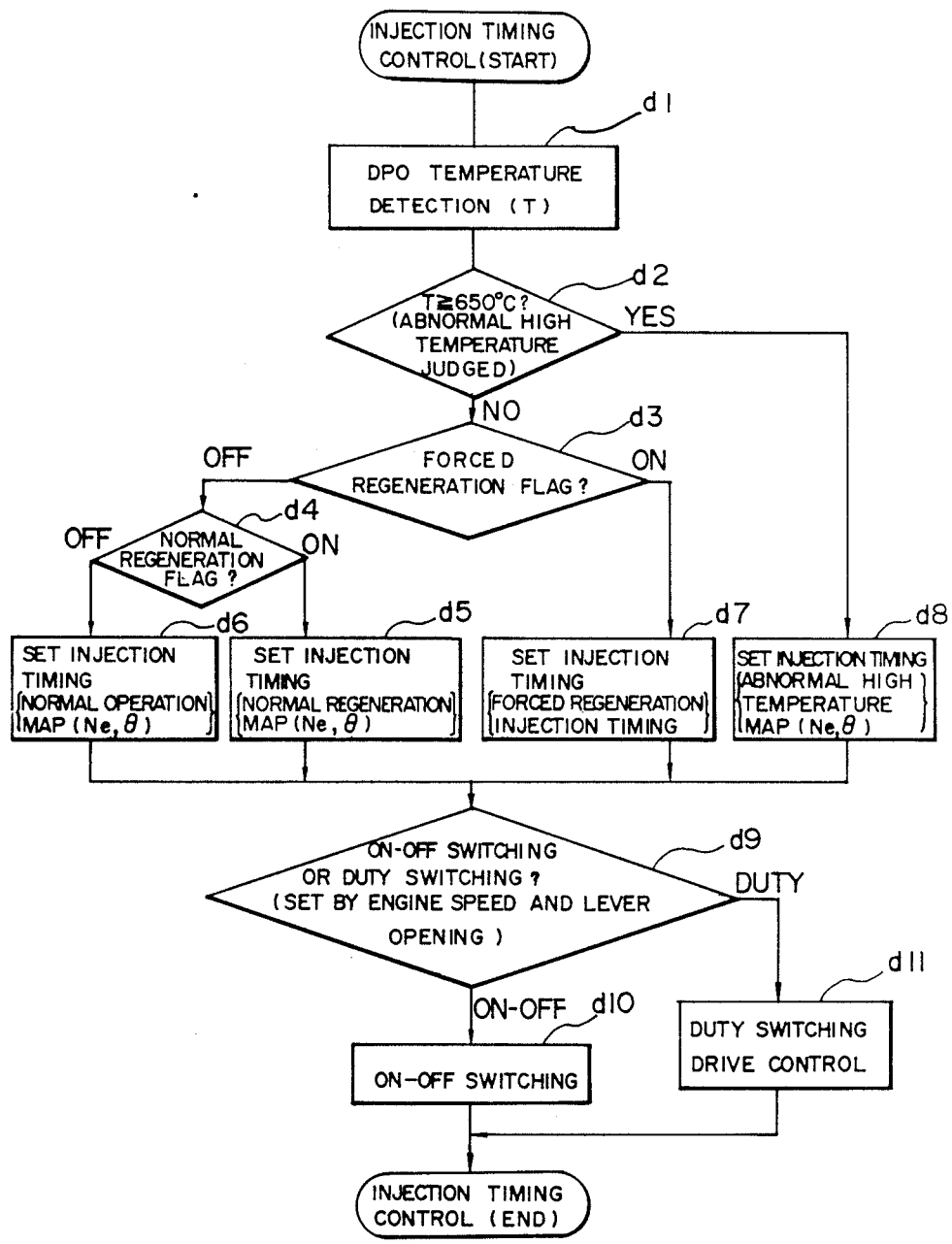

Referring now to FIGS. 19 and 20, there is shown a processing flow for injection timing control, in which the DPO 5 temperature T, i.e., DPO inlet temperature Tin, DPO internal temperature Tf or DPO outlet temperature To, is detected (Step d1), and if this temperature T is not lower than 650° C., it is judged that the temperature is abnormally high (Step d2), then the processing advances through YES route and the injection timing is set to one which is determined by the engine speed Ne and the pump lever opening $\theta$ in accordance with an abnormal high temperature map (Ne, $\theta$) (Step d8). In the abnormal high temperature map, in comparison with a normal operation map, an advanced fuel injection timing is set in its interior.

If the temperature T is lower than 650° C., then when Forced Regeneration Flag is OFF and Normal Regeneration Flag is OFF (Steps d3 and d4), the injection timing is set to one which is determined by the engine speed Ne and the pump lever opening $\theta$ in accordance with the normal operation map (Ne, $\theta$) (Step d6). On the other hand, when Forced Regeneration Flag is OFF and Normal Regeneration Flag is ON, the injection timing is set to one which is determined by the engine speed Ne and the pump lever opening $\theta$ in accordance with a regeneration map (Ne, $\theta$) (Step d5).

If Forced Regeneration Flag is ON, the injection timing is set to a preset forced regeneration injection timing (Step d7).

Figure 21A:
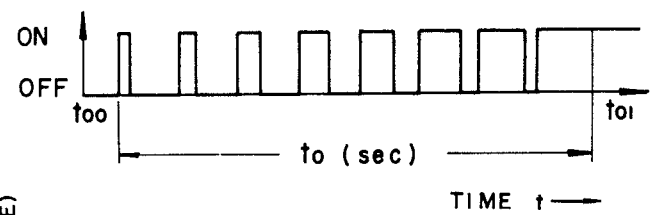
FIGS. 21(a) and (b) are graphs showing retard valve duty control and fuel injection timing, respectively.
Figure 21B:
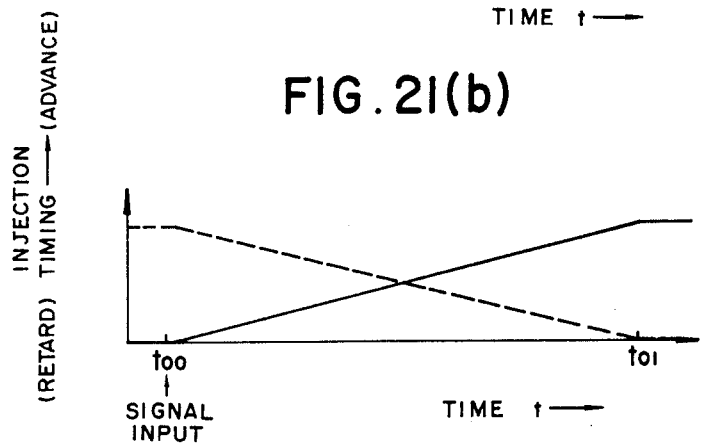

In order to attain these set fuel injection timings, the solenoid ST is switched on and off to obtain the high advance or middle advance characteristic, and the retard valve RV is switched to Slow by duty control to obtain the high advance or full retard characteristic, as shown in FIGS. 21(a) and (b).

The valve control of the solenoid timer ST for full retard involves a variation width of 11 to 28 deg, so a rapid switching would cause a shock of acceleration or deceleration. In order to reduce this switching shock, the solenoid timer ST effect switching over a sufficiently long time t (e.g. 2 to 3 seconds) under duty control. This switching of the solenoid timer ST by duty control is varied as shown in Table 1 in the zone $D_1$ to $D_5$ shown in FIG. 22 (Step d9).

TABLE 1

| Zone before switching (Injection Timing) | | Zone after switching | | | | |
|---|---|---|---|---|---|---|
| | | $D_1$ | $D_2$ | $D_3$ | $D_4$ | $D_5$ |
| $D_3$ | $D_1$ | | — | — | S | — |
| | $D_2$ | — | | — | S | — |
| | (Advance) | — | — | | S | — |
| | (Retard) | Q | S | | — | S(H) |
| $D_5$ | $D_4$ | Q | S | S(H) | | S(H) |
| | (Advance) | — | — | — | S | |
| | (Retard) | Q | S | S(H) | — | |

In the above table, the mark "S" indicates switching by duty control; "S(H)" indicates switching by duty control having hysteresis of time; "Q" indicates on-off switching; and "-" indicates no switching.

In this way, the switching control is varied in accordance with the zones $D_1$ to $D_5$ classified according to the engine speed and the lever opening. For example, in "$D_3$ (retard)→$D_1$", the switching is made quickly by on-off control to stabilize idling (Step d10), and in "$D_3$ (retard)→$D_2$", the switching is performed slowly by duty control to lighten shock (Step d11). The switching time $t_0$ by duty control may be used as a function of the engine speed.

Figure 23:
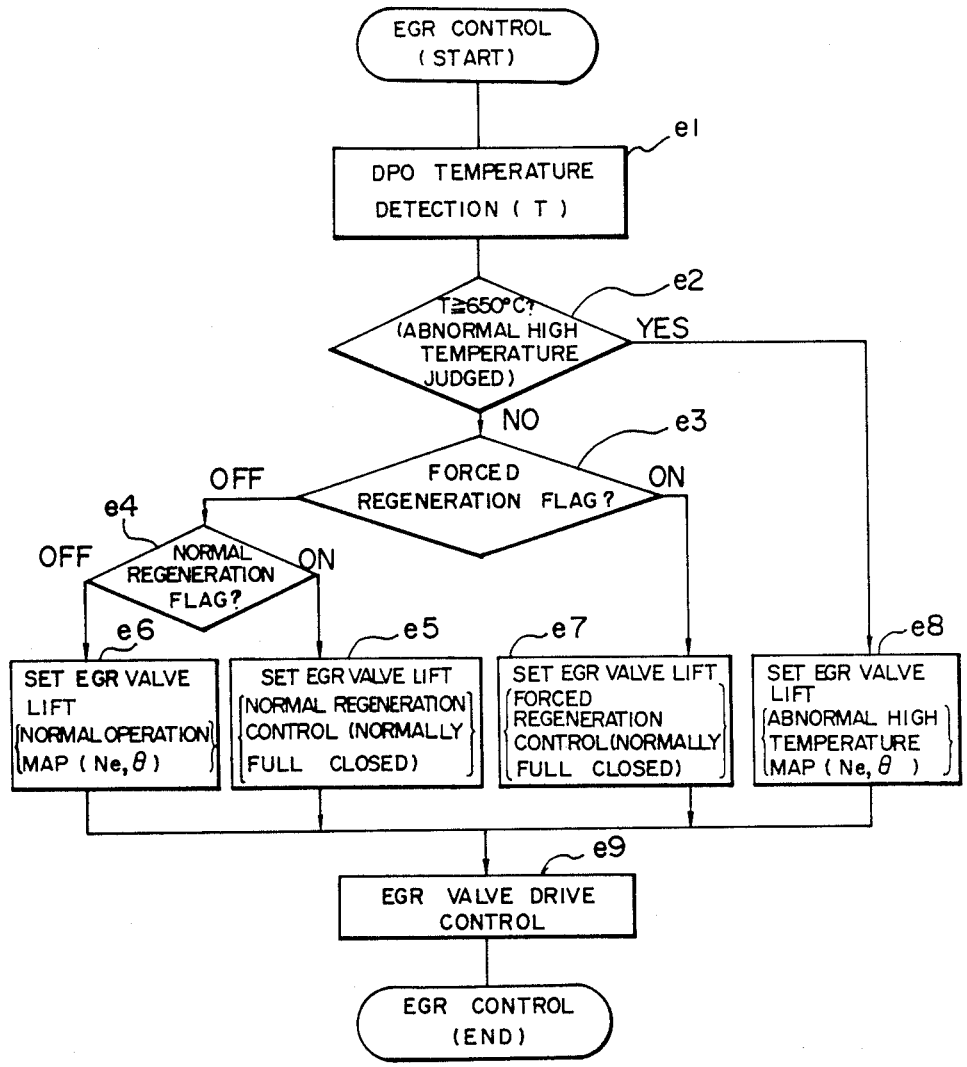

In EGR control processing flow (a control flow using an exhaust gas recirculation quantity changing means), as shown in FIGS. 19 and 23, the DPO 5 temperature, i.e., DPO inlet temperature Tin, DPO internal temperature Tf or DPO outlet temperature To, is detected (Step e1), and if this temperature T is not lower than 650° C., it is judged that the temperature is abnormally high (Step e2), then the processing advances through YES route and the lift is set to a lift quantity (corresponding to the EGR quantity) of the EGR valve 30 which is determined by the engine speed Ne and the pump lever opening $\theta$ in accordance with the abnormal high temperature map (Ne, $\theta$) (Step e8).

Thus, in the event the DPO temperature rises to an abnormal extent during operation of the regeneration assisting mechanism or during normal running, the EGR quantity is increased to decrease the concentration or absolute quantity of oxygen in the exhaust gas fed to DPO 5, thereby slowing the combustion of Pct.

If the temperature T is lower than 650° C., then when Forced Regeneration Flag is OFF and Normal Regeneration Flag is ON (Steps e3 and e4), the lift is set to a lift quantity of the EGR valve 30 which is determined by the engine speed Ne and the pump lever opening $\theta$ in accordance with the normal operation map (Ne, $\theta$)

(Step e6), whereby a decrease of NOx can be attained during normal operation.

When Forced Regeneration Flag is OFF and Normal Regeneration Flag is ON and when Forced Regeneration Flag is ON, the EGR valve 30 becomes fully closed (Steps e5 and e7) to prevent an overrise of the DPO temperature to minimize the deterioration of the driving feeling during operation of the regeneration assisting mechanism.

Control is made to drive the EGR valve 30 so as to attain the lift quantity of the EGR valve 30 which has been set in the above manner (Step e9).

In a processing flow for intake throttle control (a control processing fluid using an intake negative pressure changing means), as shown in FIGS. 19 and 24, the DPO 5 temperature, i.e., DPO inlet temperature Tin, DPO internal temperature Tf or DPO outlet temperature To, is detected (Step f1), and if this temperature T is not lower than 650° C.), it is judged that the temperature is abnormally high (Step f2), then the processing advances through YES route and the valve opening is set to an opening of the intake throttle valve 21 which is determined by the engine speed Ne and the pump lever opening $\theta$ in accordance with the abnormal high temperature map (Ne, $\theta$) (Step f8).

By so doing, in the event the DPO temperature T rises to an abnormal extent during operation of the regeneration assisting mechanism, the intake throttle valve 21 is fully closed to increase the intake throttle quantity, thereby stopping a fresh intake to suppress the combustion of Pct.

If the temperature T is lower than 650° C., then when Forced Regeneration Flag is ON and Normal Regeneration Flag is OFF (Steps f3 and f4), the intake throttle valve 21 is fully opened in principle to decrease the intake throttle quantity during normal operation (Step f6), thereby permitting a fresh intake to each cylinder of the engine E.

When Forced Regeneration Flag is OFF and Normal Regeneration Flag is ON, the valve opening is set to an opening of the intake throttle valve 21 which is determined by the engine speed Ne and the pump lever opening $\theta$ in accordance with the regeneration map (Ne, $\theta$) (Step f5).

As intake throttling effects, there are mentioned a change in the quantity of oxygen present in a fresh intake mixture and the cooling of the engine E exerted by the quantity of heat of the fresh intake. During shift from the state of non-regeneration to the state of regeneration, the exhaust gas temperature is raised by throttling the intake.

Conversely, during regeneration of DPO 5, the intake throttle quantity is controlled, for example, in a divided fashion into former and latter stages of the DPO 5 regeneration, the intake throttle quantity in the former stage being small and that in the latter stage large, whereby it is possible to control combustion by changes of the oxygen content during regeneration of DPO 5.

If Forced Regeneration Flag is ON, the valve opening is set to an opening of the intake throttle valve 21 which is determined by the engine speed Ne and the pump lever opening $\theta$ in a;ccordance with the forced regeneration map (Me, $\theta$) (Step f17).

Control is made to drive the intake throttle valve 21 so as to attain the opening of the intake throttle valve 21 which has been set as above (Step f9).

Figure 25:
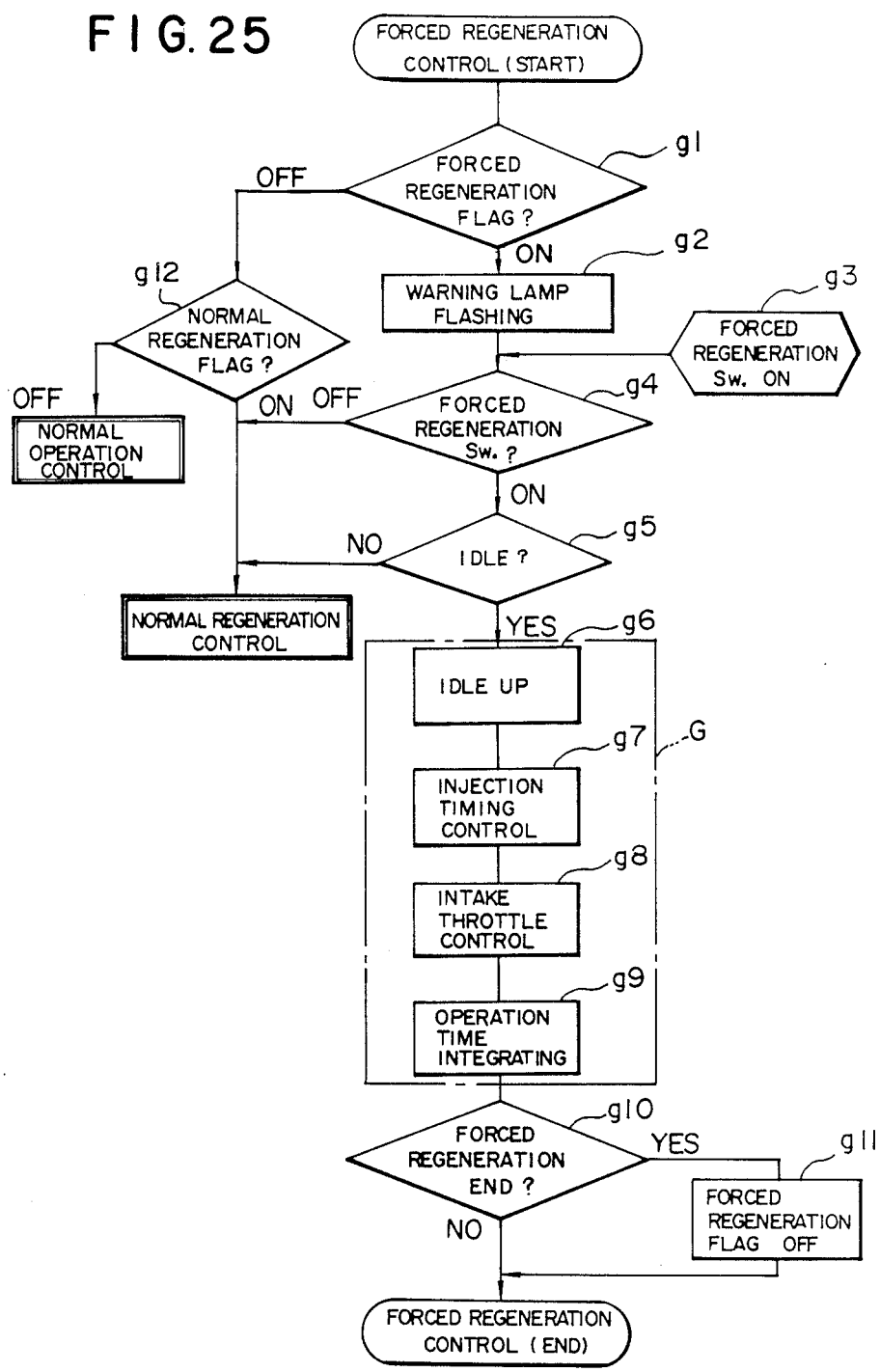

Referring now to FIG. 25, there is shown a processing flow for forced regeneration control, in which when Forced Regeneration Flag turns ON (when the particulate loading quantity exceeds 80 g.) (Step g1), the warning lamp 127 is turned on and off (Step g2), and if the engine is in an idle condition, for example, during stop of the vehicle, (Step g5), there is performed a forced regeneration processing (block G).

Also when a forced regeneration switch (Sw) is turned ON (Steps g3 and g4), the processing from block G is started if the engine is in an idle condition.

In block G, the idle-up actuator 46 is operated in accordance with a control signal fed from ECU 9 to the slenoid 47a to increase the idling speed of the engine E (Step g6). Then, the foregoing fuel injection timing control and intake throttle control are performed (Steps g7 and g8), and the integrating of regeneration time is conducted (Step g9).

Figure 26:
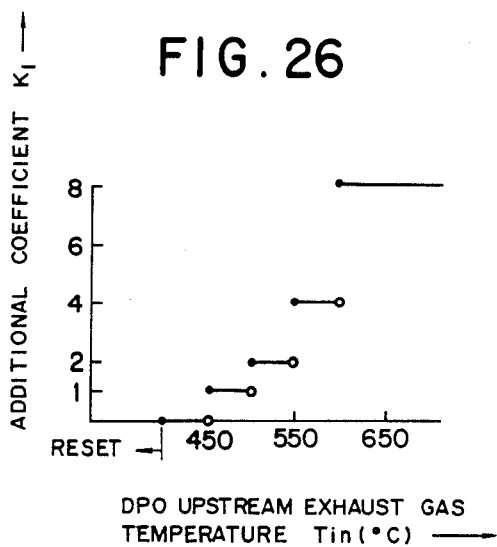
Figure 27:
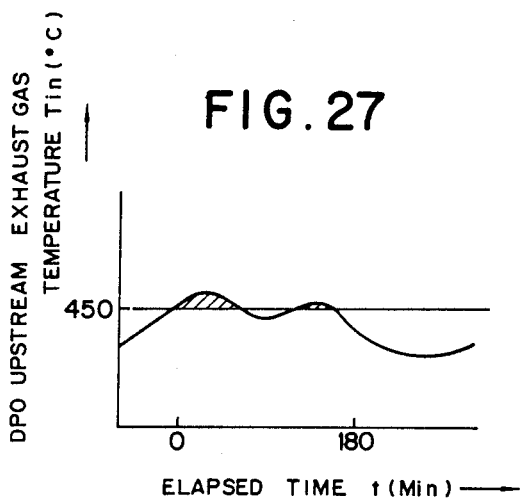

The integrating of operation time is performed as shown in FIGS. 26 and 27. First, the DPO inlet temperature (DPO upstream exhaust gas temperature) Tin from the temperature sensor 14 is detected and an addition coefficient $k_1$ is obtained according to the map shown in FIG. 26. Then, the product $(k_1 \cdot \Delta t)$ of the addition coefficient $k_1$ and the time $\Delta t$ during which the DPO 5 maintains its temperatutre Tin is taken, and a cumulative value $(\Sigma k_1 \cdot \Delta t)$ of such product, namely, an integrated value of operation time, is obtained. In the case where such cumulative value exceeds, say, 30 seconds, it is judged that the forced regeneration is over (Step g10), and Forced Regeneration Flag is turned OFF (Step g11). As a result, the operation of the regeneration assisting mechanism is stopped by control of another processing flow.

FIG. 27 shows another method of integrating the operation time, in which a cumulative value $(\Sigma \Delta t)$ of time corresponding to the duration of Tin$\geq$450° C. during the period of 180 seconds after the DPO inlet temperature Tin exceeds 450° C., namely, an integrated value of operation time, is obtained. And when this cumulative value exceeds 60 seconds, it is judged that the forced regeneration is over.

In obtaining the above integrated values, calculation may be performed on the basis of the DPO internal temperature Tf from the temperature sensor 15 and the DPO outlet temperature To from the temperature sensor 16.

In the case where the forced regeneration switch is OFF (Step g4) or the engine is not in an idle condition, the processing shifts to the processing flow for normal regeneration control, and if Forced Regeneration Flag and Normal Regeneration Flag are OFF (Step g12), there is performed a normal running control.

Figure 22:
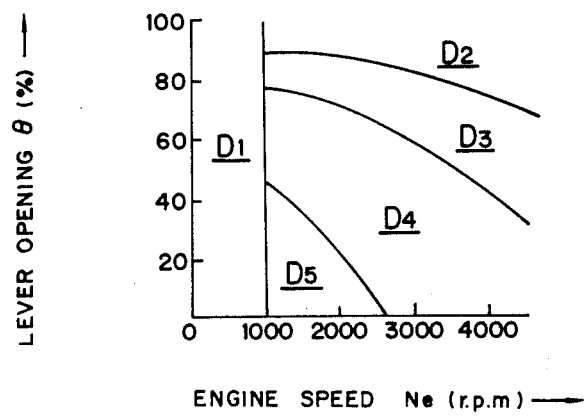

The ECU 9 serves also as a regeneration assisting mechanism control means, a retard inhibiting means and an opening/closing valve control means, and in its function as a retard inhibiting means, the operation of the regeneration assisting mchanism is inhibited as shown in FIG. 22 according to the pump lever opening $\theta$ from the injection pump lever opening sensor (load sensor) 19, the engine speed Ne from the engine speed sensor 20 and the engine temperature from the water temperature sensor 44.

(1) In zone $D_1$ wherein the engine speed is low, retard is not performed and a high advance characteristic is normally maintained to inhibit the operation of the regeneration assisting mechanism in order to stabilize idling.

(2) In zone $D_2$ of a high load (full open of the accelerator), retard is not performed and a high advance characteristic is normally maintained in order to ensure output.

(3) In zone $D_3$ in the vicinity of full open of the accelerator except a high load (full open of the accelerator), it is possible to effect self-burning of the particulates even without retard, so retard is not performed and a high advance characteristic is normally maintained. After transfer from the state of full retard to this zone $D_3$, full retard is maintained for about 10 seconds.

(4) In zone $D_5$ of low speed and load of the engine, the regeneration assisting mechanism usually is not operated because the self-burning of particulates cannot be effected even with retard. After transfer from the state of full retard to this zone $D_5$, full retard is maintained for about 10 seconds.

The zone indicated by the reference mark $D_4$ in FIG. 22 is a zone in which the DPO 5 can be regenerated by operation of the regeneration assisting mechanism. In this zone $D_4$, a low advance (L) characteristic can be obtained by opening (turning off) the retard valve RV as shown in FIG. 28(b) under the regeneration assisting mechanism controlling function of ECU 9. At this time, the solenoid timer ST is turned ON (closed). As a result, the regeneration assisting mechanism starts operating and the fuel injection timing is retarded, and the DPO inlet temperature Tin rises to accelerate the regeneration of DPO 5 as shown in FIG. 19.

Figure 28A:
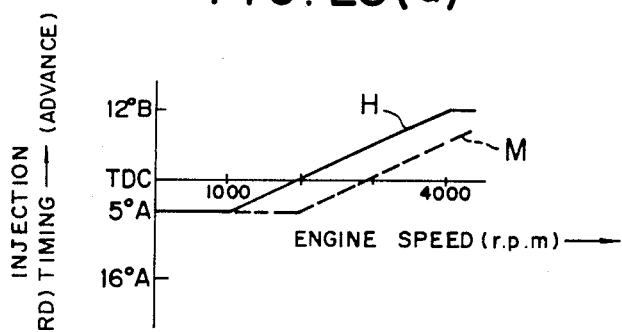
FIGS. 28(a) and (b) are graphs showing required advance characteristics.
Figure 28B:
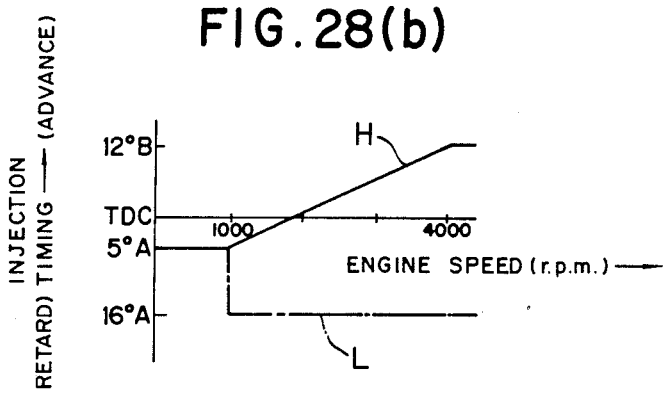

During normal running, the solenoid timer ST is turned on or off according to the state of the engine E to make improvement of the exhaust gas in the partial zone as shown in FIG. 28(a).

In this embodiment, during a continuous low speed operation over a long time, the exhaust gas temperature is maintained lower than the combustion start temperature of DPO 5 to prevent self-burning of the particulates, and even in the case of deposition of the particulates, an overloading state of the particulates is detected by measuring a pressure loss of DPO 5, and a control is made so that the regeneration assisting mechanism is operated to raise the exhaust gas temperature to allow regeneration to take place easily.

More specifically, the particulate loading quantity of DPO 5 is detected in accordance with the processing flow for regeneration timing detection shown in FIG. 16, and whether the regeneration assisting mechanism should be operated or not is thereby determined. Once it is judged that the regeneration assisting mechanism should be operated, the ECU 9 provides an operation command to each actuator of the injection pump 17, EGR valve 30 and intake throttle valve 21. As a result, the injection pump 17 is controlled in accordance with the processing flow for injection timing control shown in FIG. 20, the EGR valve 30 is controlled in accordance with the processing flow for EGR control shown in FIG. 23, and the intake throttle valve 21 is controlled in accordance with the processing flow for intake throttle control shown in FIG. 24.

As set forth hereinabove, the diesel particulate oxidizer regeneration system of this embodiment is advantageous in that the regeneration acceleration of the disel particulate oxidizer can be inhibited according to the state of the engine. For example, the following effects are obtained.

(1) It is possible to prevent DPO regeneration from taking place at a high engine load (in the vicinity of full open of the accelerator), whereby a high engine output can be ensured. In this case, the exhaust gas temperature becomes high enough to permit self-burning of the particulates, so it is not so necessary to operate the regeneration assisting mechanism; in other words, a waste operation of the regeneration assisting mechanism can be prevented.

(2) Regeneration of DPO is prevented from taking place at a low engine speed region or during idle, thereby ensuring drivability, and even with retard at a low engine speed and load region, it is impossible to cause self-burning of the particulates, so as waste operation of the regeneration assisting mechanism can be prevented.

(3) While the engine is cold, the regeneration acceleration is prevented, whereby it is possible to prevent deterioration of the regeneration efficiency caused by an insufficient rise of the exhaust gas temperature.

Moreover, the construction is simple, merely using a hydraulic passage which provides communication between high and low pressure chambers of the timer piston in the injection pump, an opening/closing valve mounted in the hydraulic passage and capable of intercepting the same passage, and an opening/closing valve control means capable of providing an on-off operation signal or duty operation signal to the opening/closing valve selectively according to detected signals provided from the engine status sensors. With such a simple construction, the difference in pressure between the high and low pressure chambers of the timer piston in the distribution type injection pump can be controlled by adjusting the opening of the opening/closing valve, whereby the retard control during operation of the regeneration assisting mechanism can be done smoothly.

Further, there are provided an engine status sensor for detecting the status of the diesel engine, and a retard inhibition means for inhibiting the transmission of a retard control signal from the regeneration assisting mechanism control means to the fuel injection timing adjusting means. Also provided for accelerating the regeneration of the diesel particulate oxidizer are an exhaust gas recirculation quantity changing means capable of recirculating the exhaust gas from the exhaust system to the intake system and changing the quantity of exhaust gas recirculated, and an intake negative pressure changing means capable of changing the intake negative pressure in the intake system of the diesel engine. And wiring is made so that the control signal from the regeneration assisting mechanism control means is fed to the exhaust gas recirculation quantity changing means or the intake negative pressure changing means. With such a simple construction, the EGR quantity or intake pipe negative pressure can be controlled simultaneously with control of the fuel injection timing, whereby the regeneration of DPO can be accelerated more certainly.

Moreover, an idle-up mechanism for the diesel engine is provided for accelerating the regeneration of the diesel particulate oxidizer, and wiring is made so that the control signal from the regeneration assisting mechanism control means is fed to the idle-up mechanism. With such a simple construction, the idling speed can be increased simultaneously with control of the fuel injection timing, thereby permitting a more ensured acceleration of DPO.

Additionally, the fuel injection device disclosed in this embodiment is provided with a link mechanism for connecting the accelerator pedal with the fuel injection quantity control lever of the fuel injection pump, and a lever ratio changing means for changing the lever ration in the link mechanism to the fuel increment side in synchronism with the retard signal provided from the control section of the DPO regeneration system. Therefore, with such a simple construction, the fuel injection quantity can be increased during regeneration of the DPO, and the reduction of the output and drivability can be prevented.

According to the DPO regeneration system provided with the exhaust deposit purge device shown in this embodiment, there can be obtained the following effects.

(1) Water can be collected certainly by means of a water tapping wire mesh, whereby water-free exhaust gas can be fed to the pressure sensor.

(2) The exhaust gas pulsation can be reduced by the exhaust gas pulsation reducing volume, whereby the detection accuracy of the pressure sensor and the durability of the filter and of the pressure sensor are improved.

(3) The soot contained in the exhaust gas and the water which could not be removed by the wire mesh, can be removed by the filter.

(4) The piping freedom of the exhaust gas pressure detection line is increased by the addition of the purge system.

(5) During rotation of the engine, the exhaust gas pressure detection line can be purged using supercharged pressure.

(6) Exhaust deposits such as water and soot in the exhaust gas pressure detection line can be recirculated off to the exhaust passage.

(7) By the above (1) it is made possible to prevent the water collected in a slack portion of the exhaust gas pressure detection line, in the filter device mounted in the said detection line, etc., from freezing and destroying the filter device and the exhaust gas pressure sensor in a cold place. Further, it is possible to prevent pipes from being clogged with ice, etc.

(8) The detection accuracy of the exhaust gas pressure sensor is improved because soot can be removed by the above (1).

(9) It is possible to prevent a back flow of the exhaust gas during purge. Consequently, it is possible to suppress the stain of the filter device and the solenoid valve. Further, since setting of a purgeable region becomes unnecessary except a partial high load and high rotation region, it is possibl to simplify the software in the control section.

Moreover, according to the DPO mounting structure shown in this embodiment:

(1) Since preassembled parts are mounted, the compression allowance of each support member can be adjusted appropriately by adjustment of the parts to be assembled, thus facilitating the control of the compression allowance.

(2) Since the system is completed by mounting the assembling parts into the clamshell casing, there is no longer the necessity of reassembling to correct a bad shape, and thus it becomes possible to effect assembling of the system.

(3) In the case where the axial support member is formed of an elastic material, it becomes possible to absorb not only variations in thickness of the ceramic foam but also warp of the ceramic foam during increase of the exhaust gas pressure.

Thus, various effects are obtained by the above embodiment.

The following description is now provided about a second embodiment in which the operation hysteresis of the diesel engine E is memorized to detect the particulate loading quantity in the DPO 5 in place of using the regeneration timing detection means 100 for the DPO 5.

As the entire system is illustrated in FIGS. 1 and 14, the ECU 9 is provided with a power non-volatile memory, in which stored value is maintained even after turning OFF of the ignition key, as an operation hysteresis memory for storing the operation hysteresis of the diesel engine. Further provided is a central processing unit (CPU) which functions as a discriminator section for judging the operation timing of the fuel injection timing control means (regeneration mechanism) 18 on the basis of the stored value in the operation hysteresis memory. This CPU also functions as a regeneration timing initializing section for setting the stored value of the operation hysteresis memory to the operation hysteresis initial value when the regeneration state of the DPO 5 is detected on the basis of detected signals provided from the temperature sensors 14–16.

As the clock 43 there may be used the clock contained in the ECU 9.

Judgment of the regeneration timing in the ECU 9 will be described below.

The ECU 9 has first to fourth memories for storing the operation hysteresis of the diesel engine E. The first memory stores an integrated value of engine speed from the engine speed sensor 20; the second memory stores a running distance which is calculated by the CPU from a vehicle speed signal provided from the vehicle speed sensor 42 and a clock signal provided from the clock 43; the third memory stores an integrated value of operation time of the diesel engine E calculated on the basis of signals from the clock 43 in a rotating state of the engine E; and the fourth memory stores an estimated value of particulate loading quantity in the DPO 5 obtained by first calculating the quantity of particulates produced according to the particulate map from the lever opening $\theta$ detected by the injection pump lever sensor 19 and the engine speed Ne and then integrating the thus-calculated values.

The CPU as a discriminator section of ECU 9 makes control so that the DPO 5 starts regeneration when the integrated value of the engine speed in the first memory has become 600,000 or more revolutions, when the running distance in the second memory has become 200 miles or more, when the integrated value of operation time in the third memory has become 10 hours or more, or when the particulate loading quantity in the fourth memory has become 30 grams or more. Alternatively, the regeneration start may be controlled by combination of the stored value in each memory and the judged value.

Further, the CPU as a regeneration state detecting section of ECU 9 judges that the state of regeneration has been detected when the detected temperatures from the temperature sensors 14–16 satisfy such judgment conditions as set out in Table 2.

The judgment in the regeneration state detecting section is made on the basis of such characteristic curves in self-burning as shown in FIG. 19, namely, the characteristic curve of upstream exhaust gas temperature of DPO 5 (DPO inlet temperature) Tin, the characteristic curve of internal temperature Tf of DPO 5 and the characteristic curve of downstream exhaust gas temperature) of DPO 5 (DPO outlet temperature) To. The combustion (including self-burning) of the DPO 5 is started when the DPO inlet temperature is above 400° C., and these temperatures are maintained substantially in the relation of Tf≧To≧Tin during combustion of the DPO 5.

In this way the regeneration state detecting section 5 detects regeneration start and regeneration state (under regeneration). Besides, regeneration end can be detected on the basis of a decrease of the filter temperature Tf from the temperature sensor 15, and a non-combustion state can be detected as a matter of course.

If the operation time is shorter than the preset time, there is made detection of the exhaust gas temperature T by the temperature sensor 14, namely, detection of the DPO inlet exhaust gas temperature Tin, (Step h4), and if the exhaust gas temperature T is lower than 400° C. (Step h5), the processing from Step h2 is again executed.

If the exhaust gas temperature T is not lower than 400° C., the operation time is added to the counter (B) as an auxiliary operation hysteresis memory (Step h6),

TABLE 2

| State | Temperature Sensor Position Upstream (Inlet) | Within Filter | Downstream (Outlet) | Detection Item | Detection Contents | Judgment Conditions |
|---|---|---|---|---|---|---|
| I | O | X | X | Inlet exhaust gas temperature | Requirements for combustion | Average exhaust gas temperature for a period of one minute is above 400° C. |
| II | X | O | X | Filter temperature | Combustion | Temperature (or average temperature for a period of one minute) is above 600° C. |
| III | X | X | O | Outlet exhaust gas temperature | Combustion | Temperature (or average temperature for a period of one minute) is above 500° C. |
| IV | O | O | X | Inlet exhaust gas temperature, Filter temperature, and Difference between those temperatures. | Requirements for combustion Combustion | (1) AND condition of state I and state II (2) The intra-filter temperature is higher than the upstream temperature, and the temperature difference is larger than a preset value. (e.g. 150° C.) |
| V | O | X | O | Inlet exhaust gas temperature, Outlet exhaust gas temperature, and Difference between those temperatures. | Requirements for combustion Combustion | Average exhaust gas temperature for a period of one minute is larger downstream than upstream, and the upstream exhaust gas temperature is above 400° C. |

The regeneration state detecting section can also detect the regeneration of DPO 5 effected by the regeneration control unit (ECU) 9.

Upon receipt of a regeneration state detection signal from the regeneration state detecting section, the CPU as a regeneration timing initializing section of the ECU 9 initializes the first to fourth memories as operation hysteresis memories [hereinafter referred to together as "counter (A)"].

Figure 29:
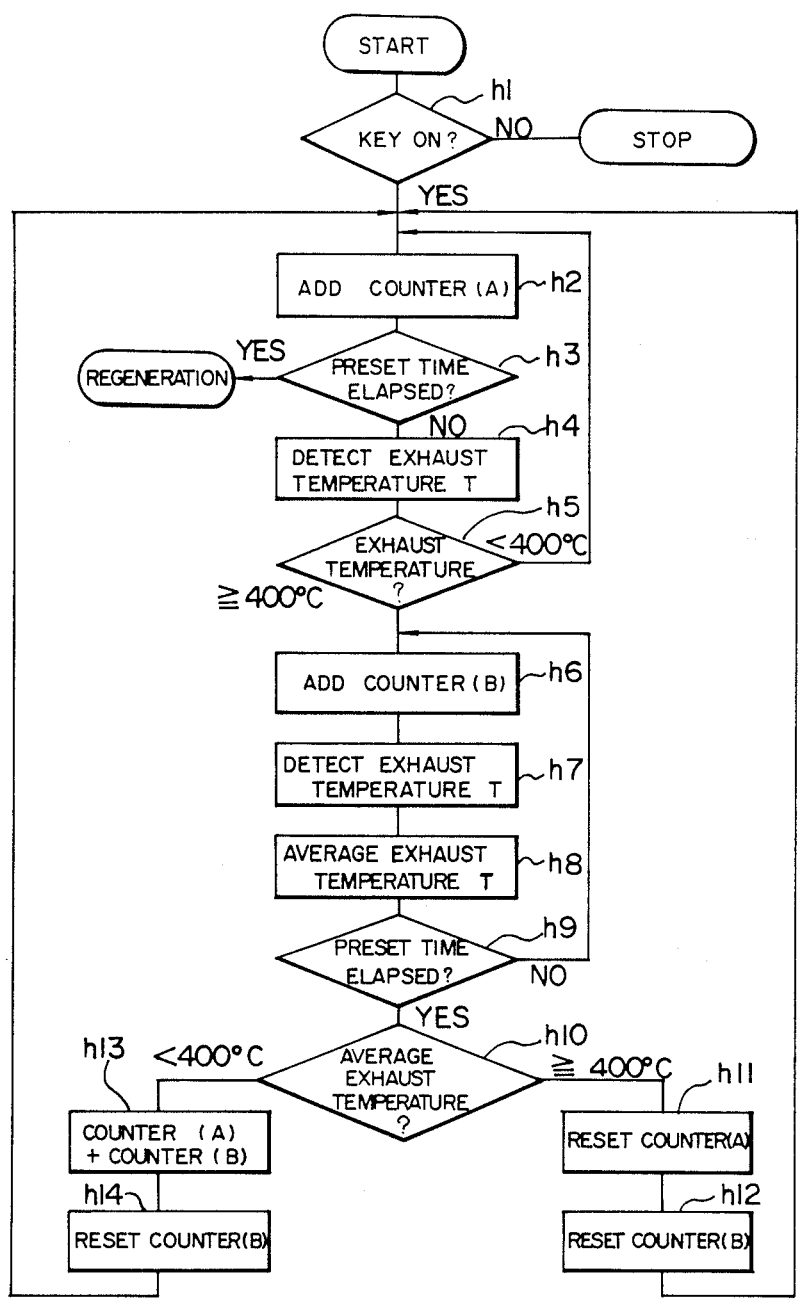

Explanation will be made below with reference to FIG. 29 about the processing flow for initializing the counter (A) as the third memory and for judgment of regeneration timing in the case where the operation hysteresis is the operation time of the diesel engine E and the DPO inlet exhaust gas temperature Tin shown in state I of Table 2 is to be detected.

This processing flow is executed while the ignition key is ON (Step h1). First, the operation time which is an integrated value of operation hysteresis of the diesel engine E is added to the counter (A) (Step h2), and judgment is made as to whether this operation time (stored value) is above a preset time (10 hours here) or not (Step h3).

If the operation time is above the preset time, the fuel injection timing control means 18 which constitutes the regeneration mechanism is operated by control with the regeneration control unit (ECU) 9, to supply the high-temperature exhaust gas to the DPO 5 to regenerate the latter.

then the exhaust gas temperature T is detected (Step h7) and is averaged (Step h8). This calculation is performed until lapse of the preset time (1 minute here) (Step h9) to determine an average value of the DPO inlet exhaust gas temperature Tin within the preset time, and if this average exhaust gas temperature is not lower than 400° C. (Step h10), it is judged that the DPO 5 is under self-burning (namely, regeneration state). In this case, the counter (A) as an operation hysteresis memory is reset (initial value zero) (Step h11), the counter (B) as an auxiliary operation hysteresis memory is reset (Step h12), and the processing from Step h2 is executed again.

If the average exhaust gas temperature is lower than 400° C., the calculation time of the counter (B) is added to the operation time of the counter (A) to set the latter again (Step h13) and the counter (B) is reset (Step h14), then the processing from Step h2 is again executed.

In this way, the detection of regeneration state using the DPO inlet exhaust gas temperature Tin from the temperature sensor 14 shown in state I of Table 2 can be performed on the basis of the operation time of the diesel engine E. Since the calculation is made using an average value of the DPO inlet exhaust gas temperature Tin, it is possible to detected the regeneration state correctly even when a large variation is recognized in detected values (instantaneous values).

In the case where an integrated value of engine speed Ne is used as operation hysteresis, the counter (A) is made the first memory and a comparison is made in Step h3 between the stored value in the counter (A) and the preset number of revolutions (600,000). In the counter (B) is stored an engine speed during determination of an average value of the exhaust gas temperature T, and the lapse of the preset time in Step h9 is judged by a counter (D) which is provided separately. In this case, a comparison between the preset engine speed and the stored value of the counter (B) may be made in Step h9 without providing the counter (D).

In the case of using the running distance as operation hysteresis, the counter (A) is made the second memory and a comparison is made in Step h3 between the stored value of the counter (A) and a preset running distance (200 miles). In the counter (B) is stored a running distance during determination of an average value of the exhaust gas temperature T, and the lapse of the preset time in Step h9 is judged by the separate counter (D). In this case, a comparison between the preset running distance and the stored value of the counter (B) may be made in Step h9.

Figure 30:
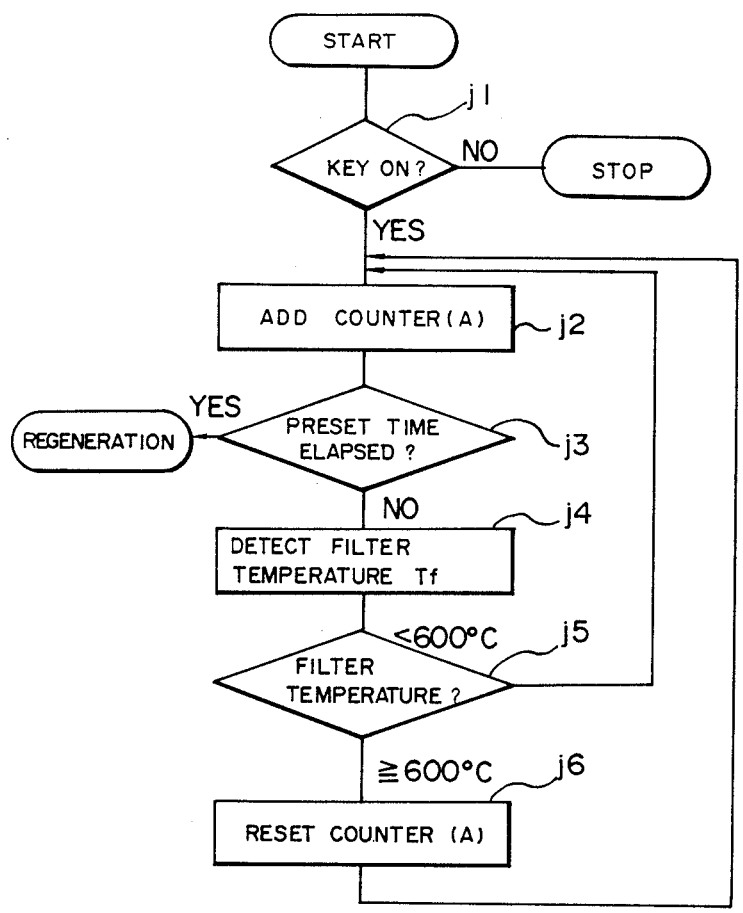

Explanation will be made below about the processing flow for initializing the counter (A) as the third memory and for judgment of regeneration timing in the case where the intra-filter temperature Tf of DPO 5 is to be detected, as shown in FIG. 30.

This processing flow is executed while the ignition key is ON (Step j1). First, the operation time which is an integrated value of operation hysteresis of the diesel engine E is added to the counter (A) (Step j2), and judgment is made as to whether this operation time (stored value) is above a preset time (10 hours here) or not (Step j3). If the answer is affirmative, the fuel injection timing control means 18 which constitutes the regeneration mechanism is operated by control with the regeneration control unit (ECU) 9, to supply the high-temperature exhaust gas to the DPO 5 to regenerate the latter.

If the operation time is shorter than the preset time, there is made detection of the exhaust gas temperature T by the temperature sensor 15, namely, detection of the intra-filter temperature Tf of DPO 5, (Step j4), and if the intra-filter temperature Tf is lower than 600° C. (Step j5), the processing from Step j2 is against executed.

If the intra-filter temperature Tf is not lower than 600° C., it is judged that the DPO 5 is under self-burning (namely, regeneration state). In this case, the counter (A) as an operation hysteresis memory is reset (initial value zero) (Step j6) and the processing from Step j2 is executed again.

In this way, the detection of regeneration state using the intra-filter temperature Tf of DPO 5 from the temperature sensor 15 shown in State II of Table 2 can be performed on the basis of the operation time of the diesel engine E.

As the operation hysteresis, there may be used as above an integrated value of the engine speed Ne as well as the running distance.

Figure 31:
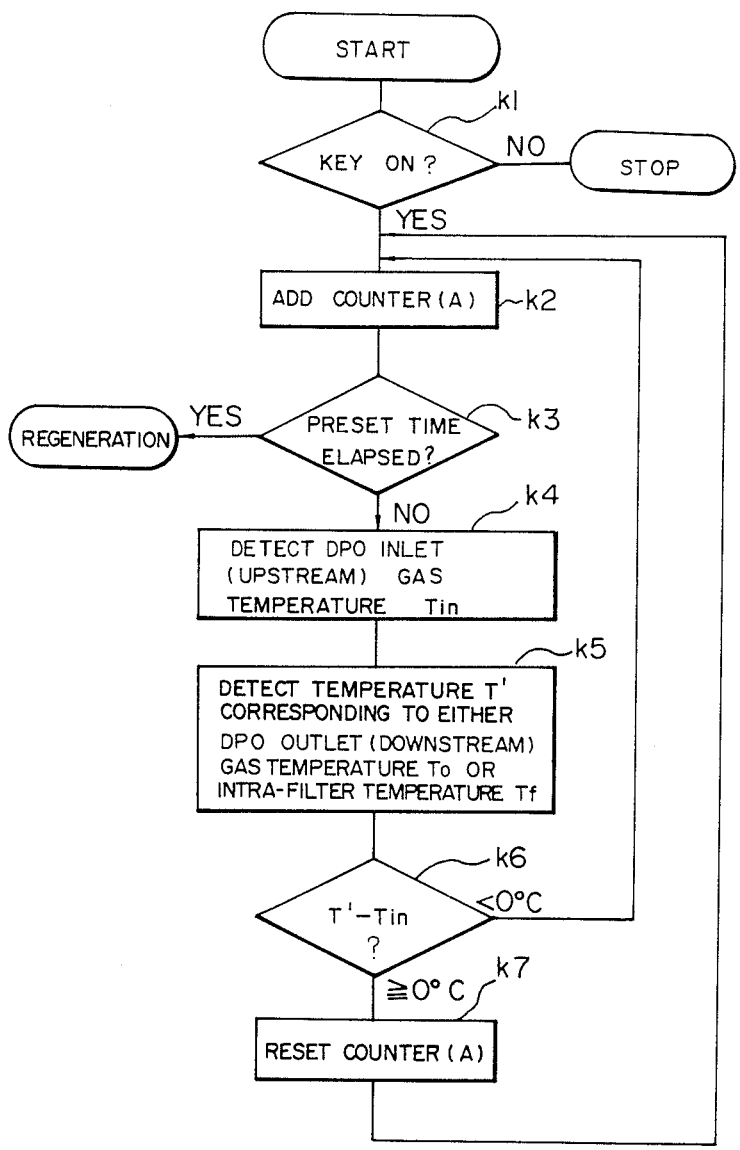

Further, explanation will be made below about the processing flow for initializing the counter (A) as the third memory and for judgment of regeneration timing in the case where, as shown in FIG. 31, the operation hysteresis is the operation time of the engine E and the inlet (upstream) exhaust gas temperature Tin of DPO 5 and the intra-filter temperature Tf or the outlet (downstream) exhaust gas temperature To of DPO 5 shown in states IV and V of Table 2 are to be detected.

This processing flow is executed while the ignition key is ON (Step k1). First, the operation time which is an integrated value of operation hysteresis of the diesel engine E is added to the counter (A) (Step k2), and judgment is made as to whether this operation time (stored value) is above a preset time (10 hours here) or not (Step k3). If the answer is affirmative, the fuel injection timing control means 18 which constitutes the regeneration mechanism is operated by control with the regeneration control unit (ECU) 9, to supply the high-temperature exhaust gas to the DPO 5 to regenerate the latter.

If the operation time is shorter than the preset time, there is made detection of the exhaust gas temperature T by the temperature sensor 14, namely, detection of the DPO inlet exhaust gas temperature Tin, (Step k4). Then, temperature T' corresponding to either the intra-filter temperature Tf from the temperature sensor 15 or the DPO outlet exhaust gas temperature To from the temperature sensor 16 is detected (Step k5), and if the temperature difference (T'−Tin) is less than 0° C. (Step k6), the processing from Step k2 is executed again.

On the other hand, if the temperature difference is not less than 0° C., it is judged that the DPO 5 is under self-burning (i.e. regeneration state). In this case, the counter (A) as an operation hysteresis memory is reset (initial value zero) (Step k7) and the processing from Step k2 is executed again.

In this way, the detection of regeneration state using the inlet exhaust gas temperature Tin of DPO 5 from the temperature sensor 14 shown in the states IV and V of Table 2 and the temperature T' corresponding to either the intra-filter temperature Tf of DPO 5 from the temperature sensor 15 or the outlet exhaust gas temperature To of DPO 5 from the temperature sensor 16, can be performed on the basis of the operation time of the diesel engine E.

As the operation hysteresis, there may be used as above an integrated value of the engine speed Ne as well as the running distance.

Further, in the case where the particulate loading quantity is used as operation hysteresis, the counter (A) is made the fourth memory, and a comparison is made in Step k3 between the stored value of the counter (A) and a preset loading quantity (30 g).

Resetting of the counter (A) in step k7 is effected by subtraction of an estimated self-burning quantity of particulates from the present loading quantity. The self-burning quantity of diesel particulates is obtained as follows.

First, a calorific value Q' of diesel particulates is given by the following equation:

$$Q' = \rho[W_a \times C \times \Delta T \times \Delta t / K]$$

wherein Q' is a calorific value of diesel particulates (J), Wa is a flow rate (kg/sec) of exhaust gas per unit time, C is a specific heat of exhaust gas constant: J/(kg.deg), ΔT is an exhaust gas temperature difference (deg before and after the DPO, t is time (sec) and K is a ratio (constant) used for increasing the exhaust gas temperature of diesel particulates.

Then, the quantity of self-burnt particulates (Pct) is given by the following equation:

$$W_p = Q'/q$$

where Wp is a self-burnt particulate quantity (kg) and q is a calorific value per unit mass (constant; J/kg).

The self-burning quantity of diesel particulates thus obtained is subtracted from the diesel particulate loading quantity corresponding to an integrated value based on the engine operation hysteresis, and the present diesel particulate loading quantity is newly set to the counter (A).

The concrete value of temperature and time used in the above embodiments are examples.

According to the regeneration timing detection means of this second embodiment, the following effects or advantages can be obtained.

(1) The particulate loading quantity in the diesel particula filter can be estimated exactly according to the operation hysteresis of the diesel engine E.

(2) The particulate regeneration timing can be detected exactly by the above (1).

(3) Since the regeneration timing is no longer retarded, there is no overheat during particulate combustion, and therefore the DPO is prevented from melting or cracking.

(4) Since the regeneration timing is no longer quickened, a highly efficient regeneration is performed.

(5) A low cost system can be implemented.

A third embodiment which is a modification of the timer device disclosed in the first embodiment will be described below with reference to FIGS. 32 and 33. Substantially same portions as in the first embodiment are indicated by the same reference numerals and detailed explanations thereon will be omitted.

Figure 32:
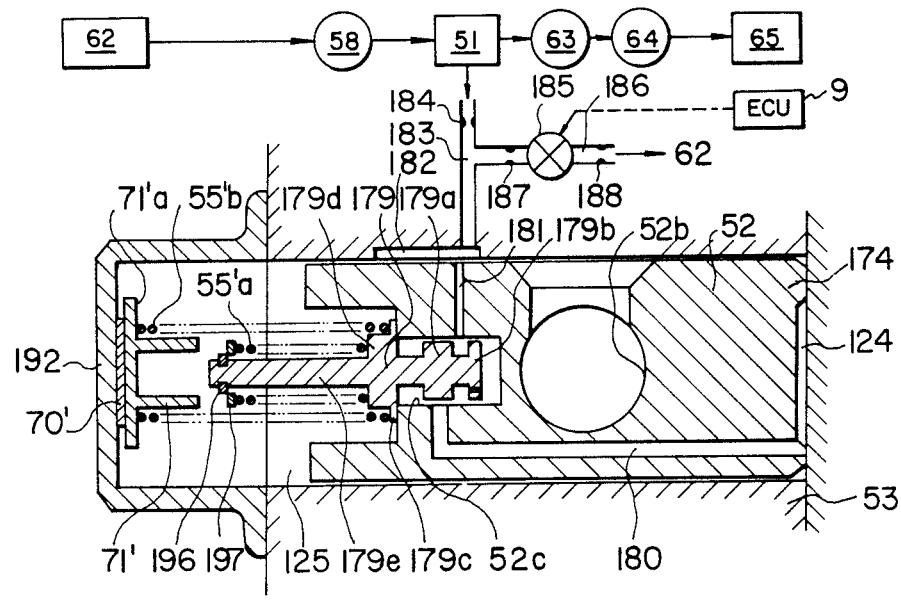
FIGS. 32 and 33 are a sectional view showing typically a timer device and a sectional view of a principal portion of a modification thereof, respectively, in a DPO regeneration system according to a third embodiment of the present invention.

In the third embodiment, as shown in FIG. 32, a servo valve timer 174 has a timer piston 52 adapted to slide in a direction normal to a pump drive shaft 54 within a pump housing 53 and rotate a fuel injection timing controlling roller ring 57.

The roller ring 57 is connected through a slide pin 56 to a recess 52b formed in the timer piston 52.

Within the pump housing 53 (especially the portion of the timer housing) are formed a timer piston high pressure chamber (hereinafter referred to simply as "high pressure chamber") whose one wall surface comprises one end face of the timer piston 52, and a timer piston low pressure chamber (hereinafter referred to simply as "low pressure chamber") whose one wall surface comprises the other end face of the timer piston 52.

In the other end face of the timer piston 52 is formed a recess 52c in which is fitted a servo valve 179. The servo valve 179 has two land portions 179a and 179b and functions to switch a passage 180 which communicates with the high pressure chamber 124, to either a passage 181 which communicates with a pump chamber 51, or the low pressure chamber 125, according to the pressure of fuel fed from the passage 181 which pressure is correlated with the engine speed and increases with increase of the engine speed and decreases with decrease of the engine speed. The passages 180 and 181 are formed within the timer piston 52. Further, the passage 181 is in communication with a passage 183 with a throttle 184 which communicates with the pump chamber 51 through a connection passage 182.

To the side downstream of the throttle 184 of the passage 183 is connected one end of a passage 186 with a magnet valve (hereinafter referred to as "solenoid valve") 185. The other end of the passage 186 is in communication with a reservoir (low pressure) side. On up- and downstream sides of the solenoid valve 185 are provided throttles 187 and 188, respectively.

Therefore, when the solenoid valve 185 is closed, the fuel pressure from the pump chamber 51 is fed to the passage 181 without pressure reduction, while when the solenoid valve 185 is opened, the fuel from the pump chamber 51 passes through the passage 186 and is returned to the reservoir side. No fuel pressure acts on the passage 181, or a fuel pressure which has been reduced by a desired value by adjusting the throttle quantity of the throttle quantity of the throttles 184, 187 and 188 acts on the passage 181.

A hydraulic system including the passages 183, 186 and a fuel supply system is a system which excludes the retard valve, orifice and passage from FIG. 32.

Moreover, as shown in FIG. 32, a first soft spring 55'b is disposed between a first spring bearing portion 179c of the servo valve 179 and a spring bearing portion 71'a of a stopper member 71' which is mounted to a cover 192 through a shim 70'. The first spring 55'b is for moving the timer piston 52 to an advance side (to the left in FIG. 32) until the engine speed reaches a first preset value N1 [see FIG. 6(b)] in cooperation with fuel when the fuel acts on the passage 181.

The servo valve 179 is formed with a guide portion 179e which extends toward the stopper member 71'. A second spring 55'a which is harder and smaller in diameter than the first spring 55'b is disposed between a floating spring bearing member 197 fitted in the guide portion 179e so as to contactable with and separable from a ring member 196 which is fixed to the fore end of the guide portion 179e, and a second spring bearing portion 179d of the servo valve 179.

Thus, the first and second springs 55'b and 55'a are doubly disposed. The second spring 55'a cooperates with the fuel to maintain the timer piston 52 in the state in which the engine speed is at the first preset value N1, until the engine speed reaches a second preset value N2 [see FIG. 6(b)] which is larger than the first preset value N1, when the fuel pressure acts on the passage 181. And it moves the timer piston 52 to the advance side to a further extent when the engine speed exceeds the second preset value N2.

The floating spring bearing member 197 is adapted to engage the stopper member 71' as the timer piston 52 moves to the advance side by a predetermined amount.

In the fuel injection pump 17 provided with such servo valve timer, the fuel pressure is reduced through the passage 186 when the solenoid 185 turns OFF (open), so that the fuel pressure exerted on the passage 181 and the internal pressure of the high pressure chamber 124 decrease independently of the engine speed value. consequently, the timer piston 52 is pushed to the right in FIG. 32 by the first spring 55'b and thereby assumes a low advance (full retard) position. In this state, the internal pressure of the passage 181 does not increase even if the engine speed increases, so the full retard state is maintained independently of the engine speed. That is, such low advance characteristics as indicated by the reference mark L in FIG. 6(b) can be set.

Thus, by retarding the injection timing, the exhaust gas temperature becomes higher as described in the first embodiment, thereby permitting combustion of the particulates collected in DPO 5 and hence regeneration of the DPO 5. When the regeneration of the DPO 5 is over, a signal for closing the solenoid valve 185 is provided from the ECU 9.

Once the solenoid valve 185 closes, a fuel pressure according to the engine speed acts on the passage 181. With increase of the engine speed, the timer piston 52 moves as follows. As the engine speed increases, the pressure in the passage 181 increases and acts on the high pressure chamber 124 through the servo valve 179, so that the timer piston 52 moves to the left (advance side) in FIG. 32 while contracting the first spring 55'b. Consequently, the fuel injection timing advances.

When the engine speed reaches the first preset value N1, the floating spring bearing member 197 abuts the stopper member 71', so that the biasing force of the second spring 55'a is also exerted and therefore the timer piston 52 maintains the state in which the engine speed is at the first preset value N1. That is, the timer piston 52 does not move and maintains a certain retard state for a while.

Further, when the engine speed increases and reaches the second preset value N2, the timer piston 52 moves to the left (advance side) in FIG. 32 while compressing both springs 55'a and 55'b. With further increase of the engine speed, the fore end of the guide portion 179e of the servo valve 179 comes into abutment with the stopper member 71', so that the movement of the timer piston 52 again stops. Even with further increase of the engine speed, the timer piston 52 does not move.

In this way, such high advance characteristic as indicated by II in FIG. 6(b) can be set. In the case where the engine speed decreases, the route reverse to the above is followed.

Thus, even with a mechanical construction of main portions, at least two kinds of fuel injection timing characteristics L and H can be set by opening and closing the solenoid valve 185.

Figure 33:
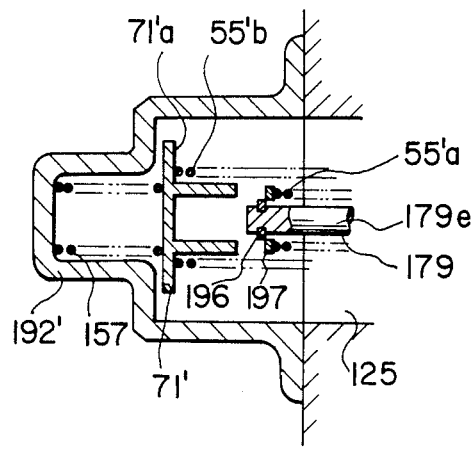

As shown in FIG. 33, a spring 157 which supports the stopper member 71' resiliently may be mounted within the cover 192'. By so doing, the timer spring 52 can be urged by the spring 157 even when the timer piston 52 is in a full retard state. As a result, the operation in a full retard condition can be stabilized.

Thus, the thrid embodiment combines the servo valve type timer piston 52 with the solenoid valve 185 which relieves the oil presure fed to the high pressure chamber 124, whereby about the same function and effect as in the first embodiment can be obtained.

A fourth embodiment which is a modification of the timer device disclosed in the first embodiment will be described below with reference to FIGS. 34 to 39. Substantially same portions as in the first embodiment are indicated by the same reference numerals and detailed explanations thereon will be omitted.

In a regeneration timing control device for a diesel particulate oxidizer according to the fourth embodiment of the invention, as shown in FIGS. 34 to 39, a VE type timer having a load sensing timer mechanism is provided with a conventional timer piston 52, and a hydraulic passage 123 for communication between high and low pressure chambers 124 and 125 of the timer piston 52 is provided, with a timing control valve TCV as an opening/closing valve mounted in the hydraulic passage 123.

Figure 36:
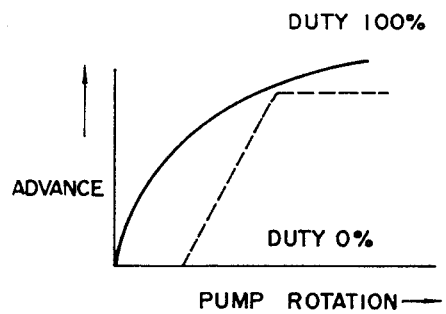

A solenoid 126a of the timing control valve TCV is wired to ECU 9, and its valve portion 126 is opened and closed by duty control, whereby such duty ratio 100-0(%) characteristic as shown in solid line in FIG. 36 can be obtained, which is a wider characteristic than the characteristic in the first embodiment (see the broken line in FIG. 36). Further, it is possible to obtain any advance other than high advance, middle advance and low advance (full retard) according to the engine speed (number of pump revolutions).

Figure 37:
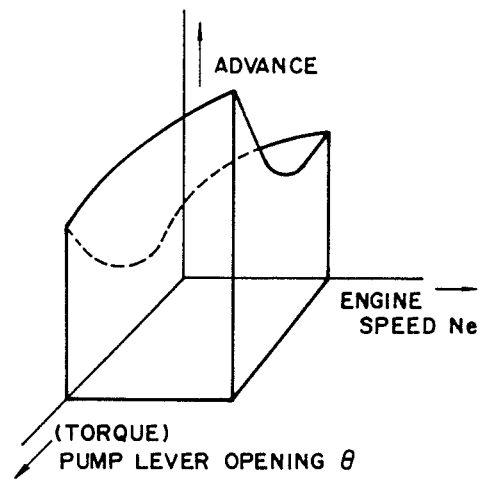
Figure 38:
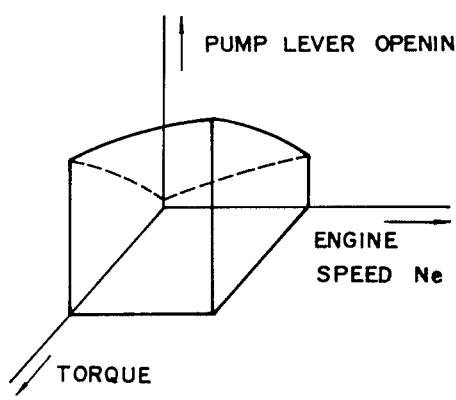

Since a torque sensor is not used in the embodiments of the invention, an amount of advance is determined by the engine speed Ne and the pump lever opening $\theta$, as shown in FIG. 37. More specifically, since the engine speed Ne and the pump lever opening $\theta$ are in such relation to torque as shown in FIG. 38, the amount of angle which should be determined by torque and the engine speed Ne is determined by replacing torque with the pump lever opening $\theta$.

Figure 39:
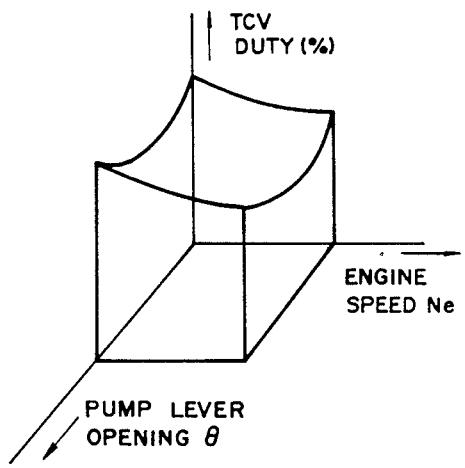
Figure 40:
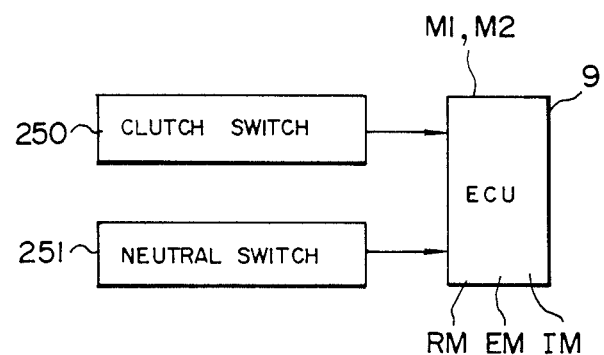
FIGS. 40 and 41 are a block diagram showing a completely automatic forced regeneration means and how to make control, respectively, in a DPO regeneration system according to a fifth embodiment of the present invention.

The duty ratio of the timing control valve TCV is determined by the engine speed Ne and the pump lever opening $\theta$, as shown in FIG. 39.

Figure 34:
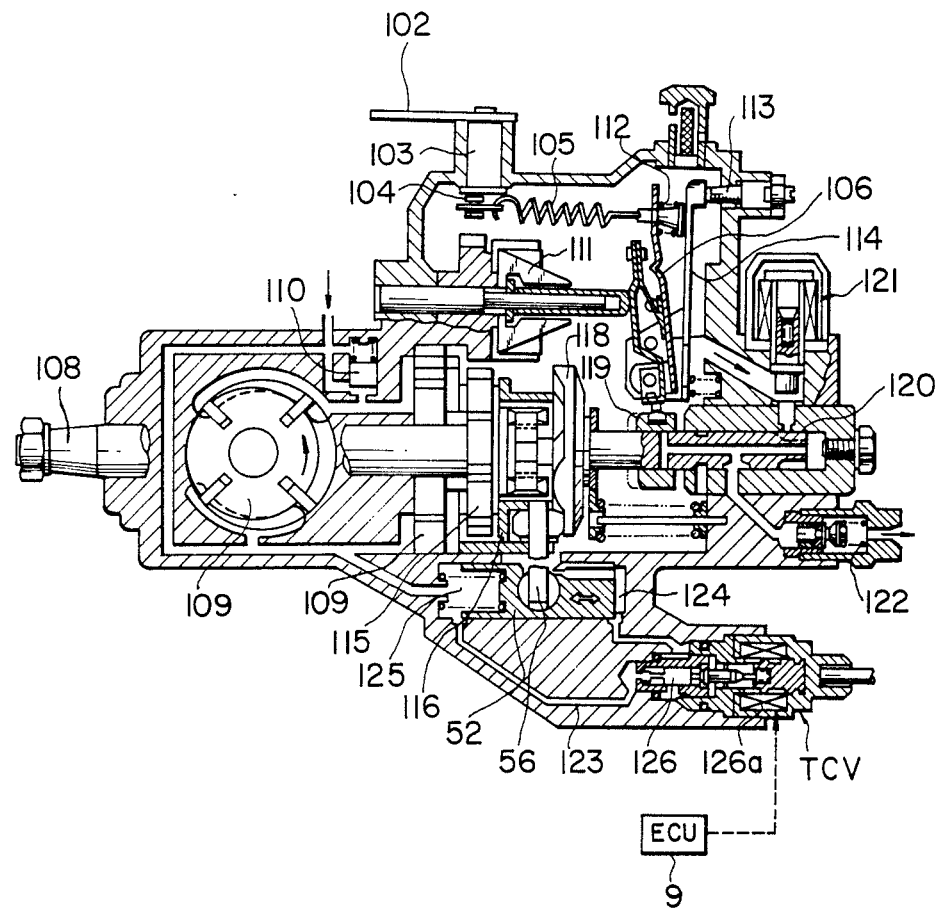

In FIG. 34, the reference numeral 102 denotes a control lever; 103 a control lever shaft; 104 a shackle; 105 a governor spring; 106 a tension lever; 108 a drive shaft; 109 a feed pump; 110 a regulating valve; 111 a flyweight; 112 an idling spring; 113 a full load adjusting screw; 114 a collector lever; 15 a sensing gear plate; 116 a driving disc; 118 a cam disc; 119 a control sleeve; 120 a plunger; 121 a magnet valve; and 122 a delivery valve.

Figure 35:
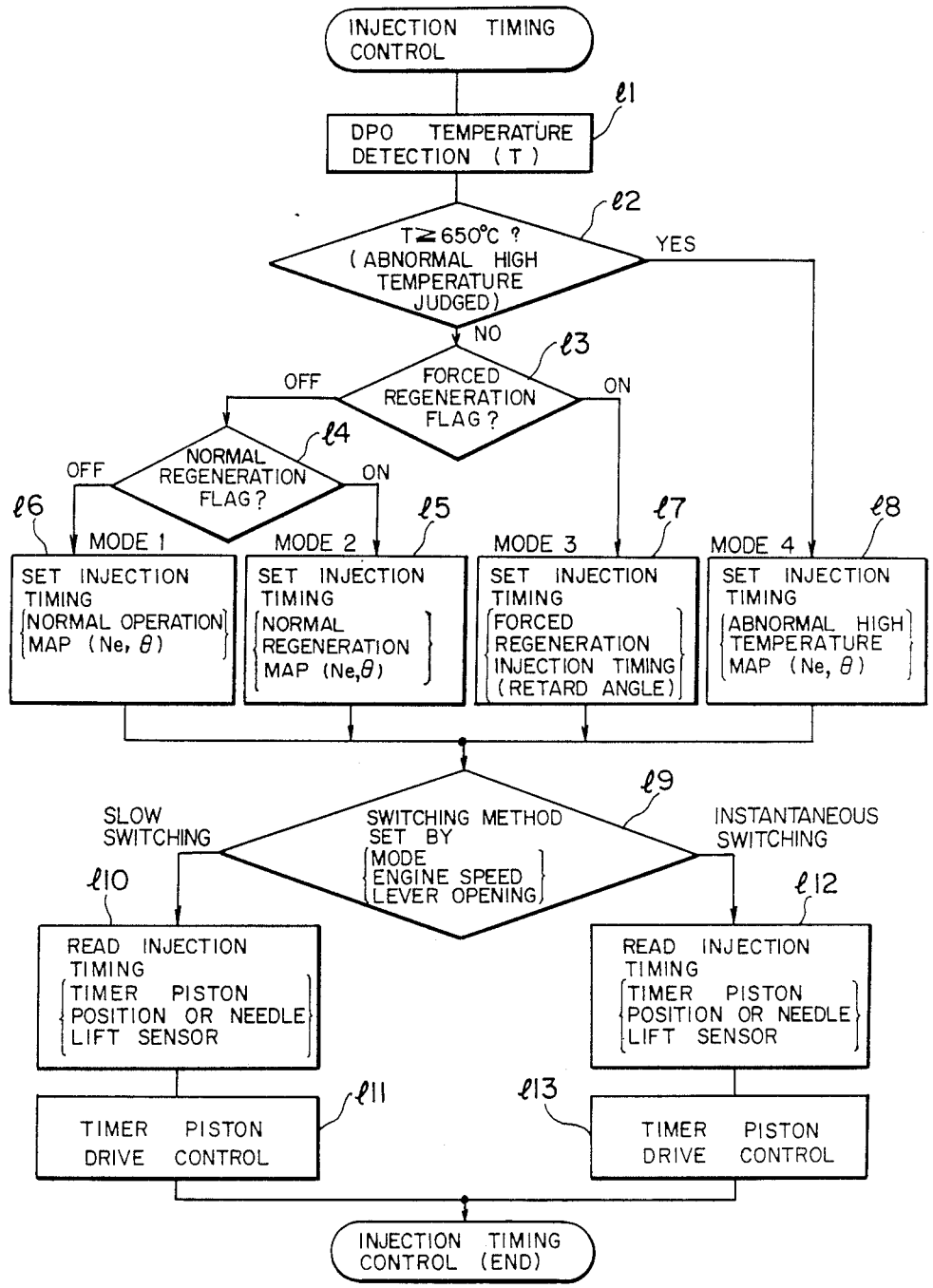

Other constructional points are the same as in the first embodiment. In this fourth embodiment, the processing flow for fuel injection timing control is as shown in FIG. 35, in which the DPO 5 temperature T, namely, DPO inlet temperature Tin, DPO internal temperature Tf or DPO outlet temperature To, is detected (Step 11), and if the temperature T is not lower than 650° C., it is judged that the temperature is abnormally high (Step 12). Then, the processing passes through YES route and the injection timing is set to one which is determined by the engine speed Ne and the pump lever opening $\theta$ in accordance with an abnormal high temperature map (Ne, $\theta$) (Mode 4, Step 18). In the interior of the abnormal high temperature map is set an advanced fuel injection timing in comarison with a normal operation map.

If the temperature T is lower than 650° C., then when Forced Regeneration Flag and Normal Regeneration Flag are OFF (Steps 13 and 14), the injection timing is set to one which is determined by the engine speed Ne and the pump lever opening $\theta$ in accordance with the normal operation map (Ne, $\theta$) (Mode 1, Step 16).

When Forced Regeneration Flag is OFF and Normal Regeneration Flag is ON, the injection timing is set to one which is determined by the engine speed Ne and the pump lever opening $\theta$ (Model 2, Step 15).

When Forced Regeneration Flag is ON, the injection timing is set to a certain full retard which is a preset forced regeneration injection timing (Mode 3, Step 17).

In order that these set fuel injection timings may be attained, a decision is made as to whether the switching is to be slow or instantaneous according to mode, engine speed Ne and pump lever opening $\theta$ (Table 1, Step 19).

In the case where it is judged that a slow switching is to be made, the present injection timing is detected by the injection pump lever opening sensor 19 and the timer piston position or the needle lift sensor position is read (Step 110), and the timer piston 52 is driven while considering the difference between the actual injection timing and a target injection timing, etc. (Step 111).

Also in the case where it is judged that the switching is to be instantaneous switching, the timer piston position or the needle lift sensor positoin is read (Step 12), and the timer piston 52 is driven so as to attain the target injection timing (Step 13).

Other functions and effects in this embodiment are about the same as in the first embodiment.

Further embodiments of the forced regeneration system will be described below as fifth and sixth embodiments with reference to FIGS. 40 to 44. Since basic constructions of the fifth and sixth embodiments are about the same as the first embodiment, different points from the first embodiment will be explained and substantially same portions as in the first embodiment will be indicated by the same reference numerals and explanations thereon omitted.

In the construction of the fifth embodiment, in addition to those input to and output from the ECU 9 disclosed in FIG. 14, there are input signals from a neutral switch 251 which turns ON when the transmission is in a neutral condition and turns OFF in other conditions, and from a clutch switch 250 which turns ON in an engaged state of the clutch and turns OFF in other conditoins.

The ECU 9, provided with CPU and input-output interface or memories such as RAM and ROM (including map), has the functions of regeneration control menas RM which controls the operation of the fuel injection timing control means 13; EGR quantity control means EM which controls the operation of the EGR valve 30; intake throttle control means IM which controls the operation of the intake throttle valve 21; first control means M1 which receives a signal from the DPO 5 regeneration timing detection means 100 and provides to the warning lamp 127 a signal for indication that the DPO 5 should be regenerated, when the quantity of particulate collected in the DPO 5 exceeds a predetermined value (e.g. 80 g); and second control means M2 which, upon receipt of a signal from the DPO 5 regeneration timing detection means 100 and when the quantity of particulates collected in DPO 5 is above a predetermined value (e.g. 80 g) and when the diesel engine E is in a predetermined state of operation (e.g. idling state), outputs a fuel injection timing retard signal to the fuel injection timing control means (retard device) 18, outputs a high speed idling signal to the idle-up actuator controlling solenoid 47a, outputs to the EGR valve controlling solenoids 35a and 36a signals for driving the EGR valve 30 to the open side and outputs to the intake throttle vavle 21 to the closing side.

Judgment as to whether particulates have been collected in the DPO 5 in a quantity not smaller than the predetermined quantity is made using data on pressure loss between up- and downstream sides of the DPO 5 and pressure loss between up- and downstream sides of the muffler 6. There may be used data on an integrated value of the engine speed or an integrated value of the product of the engine speed Ne and the lever opening θ.

Figure 41A:
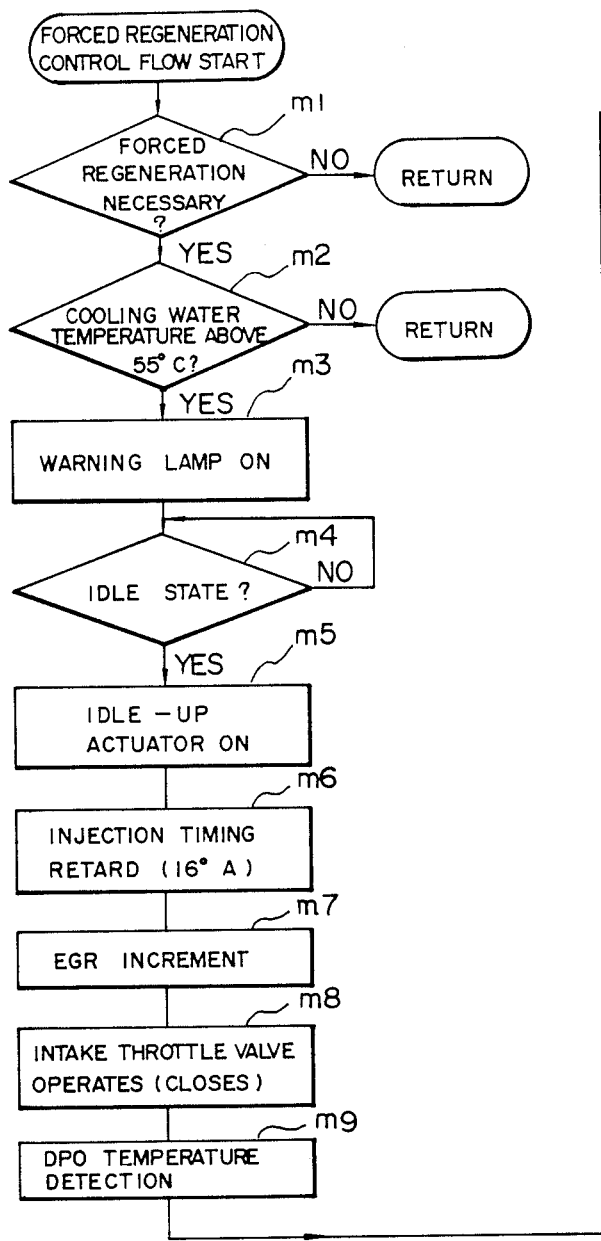
Figure 41B:
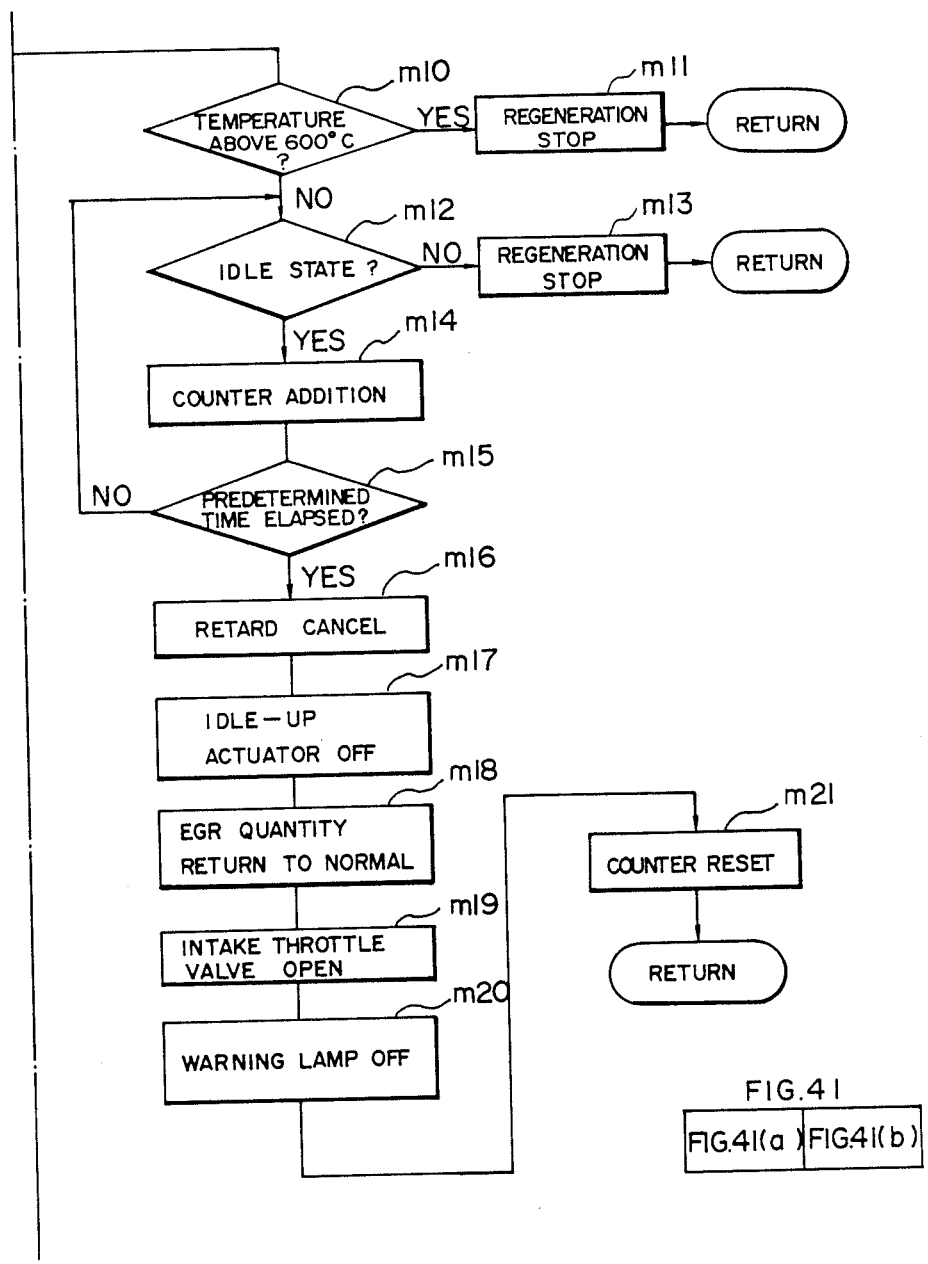

The processing flow of this system will be explained below with reference to FIG. 41.

First, in Step m1 it is judged whether forced regeneration is necessary or not. If the answer is affirmative, judgement is made in Step m2 as to whether the cooling water temperature is above a predetermined value (e.g. 55° C.) or not, and if YES, the warning lamp 127 is turned ON (Step m3). This processing is executed mainly by the first control means M1. With the warning lamp 127 turned ON, the passenger becomes aware that a forced regeneration is necessary. In regenerating DPO 5, it is preferable that the diesel engine E be brought into an idle condition. If the passenger brings the diesel engine E into an idle state by, for example, stopping the vehicle, the processing takes YES route in Step m4.

In the case where the engine is not in an idle state [including the case where the clutch is ON or in an engaged state (the clutch switch 250 is ON) and the case where the transmission is not neutral (the neutral switch 251 is OFF)], the processing of m4 is repeated.

If the answer is YES in Step m4, as mentioned above, the idle-up actuator 46 is turned On in steps m5, m6, m7 and m8 to bring the engine into a high-speed idle condition with the engine speed increased to say 3,000 rpm, the injection timing is retarded 16° A., the EGR 30 is driven to the open side to increase the EGR quantity, and the intake throttle valve 21 is driven to the closing side. Such control is effected mainly by the second control means M2.

As a result, usually the particulates which have been collected in the DPO 5 begin to burn, and DPO inlet temperature Tin, DPO internal temperature Tf and DPO outlet temperature To increase as shown in FIG. 19. Therefore, the DPO temperatures Tin, To and Tf are detected in the following step m9, and it is judged in Step m10 whether the DPO temperature is not lower than a predetermined value (e.g. 600° C.). If the DPO temperature is not lower than 600° C., regeneration stop mode is taken in Step m11 because it is likely that the DPO 5 will melt and damage or crack.

On the other hand, when the DPO temperature is lower than 600° C., it is judged again in Step m11 whether the engine is in an idle state or not, and if the result is YES, the counter addition is started in Step m14, and it is judged in Step m15 whether a predetermined time (e.g. 2 minutes or so) has elapsed or not. While the predetermined time has not elapsed, the processings of Steps m12 and m14 are repeated. At this time, if the engine is no longer in the idle state (including the case where the clutch pedal is operated and the case where shift change is performed), regeneration stop mode is taken immediately in Step m13.

After the lapse of the predetermined time, the DPO regenerating operation is cancelled in Steps m16, m17, m18 and m19 by cancelling the injection timing retard, turning OFF the idle-up actuator 46, returning the EGR quantity to normal and opening the intake throttle valve 21. Thereafter, the warning lamp 127 is turned OFF in Step m20 and the counter is reset in Step m21.

Return is made when forced regeneration is not necessary and also when the cooling water temperature is lowe than 55° C. In this case, there is not performed a forced regeneration of the DPO 5.

Thus, the regeneration of DPO 5 is performed automatically under predetermined conditoins, it is possible to avoid an overloading condtion of the particulates and hence fully prevent reduction of the engine performance and damage of the DPO 5.

Figure 42:
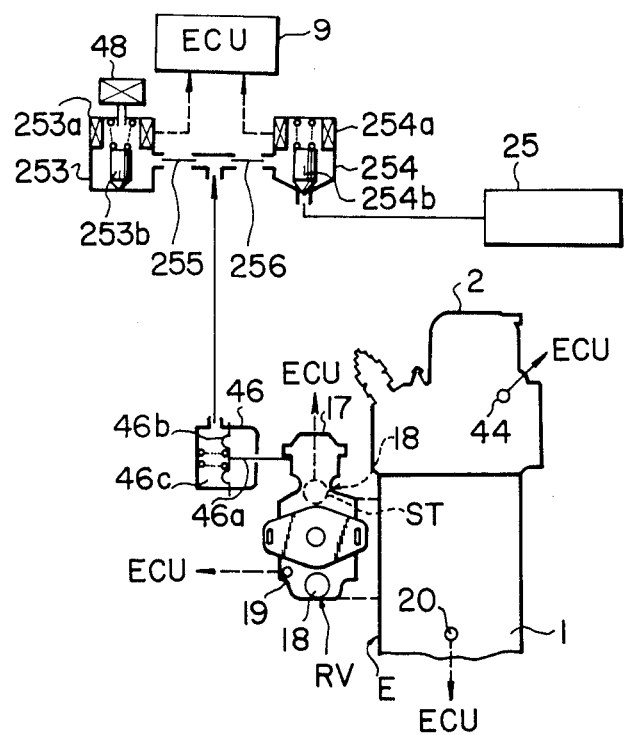
FIGS. 42 to 44 are block diagrams of principal portions and a flowchart showing how to control, respectively, of a semi-automatic type forced regeneration means in a DPO regeneration system according to a sixth embodiment of the present invention.
Figure 43:
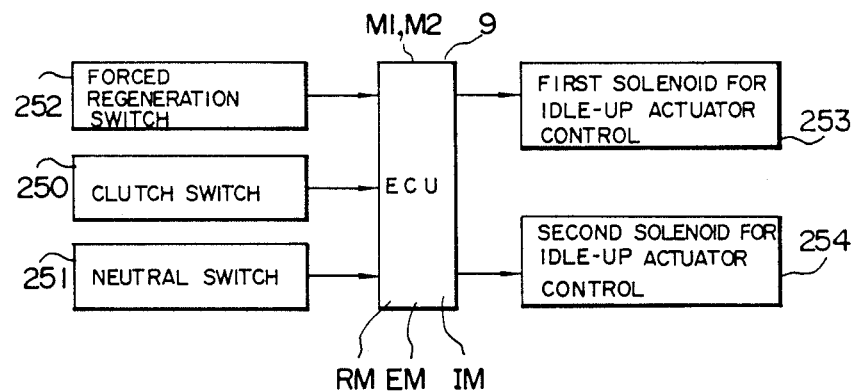
Figure 44A:
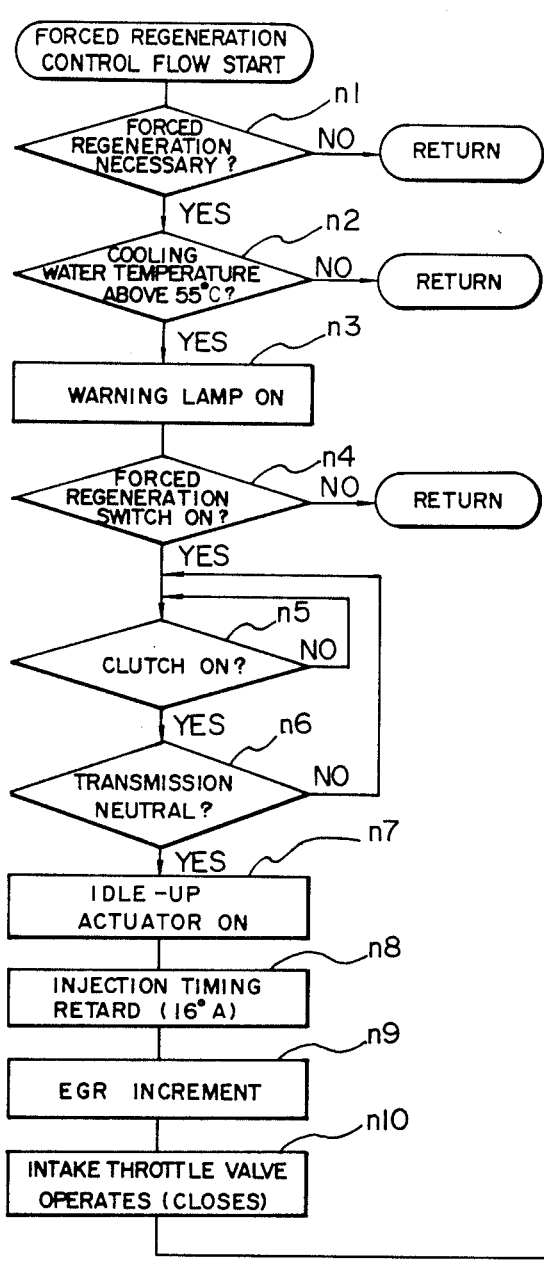

The sixth embodiment will now be described, which is a modification of the idle-up mechanism in FIG. 1 of the first embodiment into such idle-up mechanism as shown in FIG. 42. Its block diagram corresponds to the block diagram of FIG. 14 of the first embodiment except that input and output portions and internal mechanism are added to the ECU 9 shown in FIG. 43. And its processing flow is as shown in FIG. 44.

In this sixth embodiment, in the event of clogging of the DPO 5, this is indicated to the passenger, and if the passenger desires regeneration of the DPO 5, the DPO can be regenerated forcibly under predetermined engine operating condtions. While the device of the fifth embodiment is a completely automatic type, the device of this embodiment is a semi-automatic type. For this reason, provided within the vehicle room is a manual type forced regeneration switch 252 which when closed by the passenger outputs a signal indicative of desire for regeneration of the DPO.

To the ECU 9 are fed detected signals from sensors 10, 14–16, 19, 20, 38, 39, 42 and 44 and switches 250 and 251, signal from clock 43 and also signal from the forced regeneration switch 252. With these signals received, the ECU 9 performs processings as will be described later and outputs control signals sutable for those processings to the exhaust gas introducing solenoids 78a and 79a, fuel injection timing control means 18, intake throttle valve opening solenoid 27a, intake throttle valve closing solenoid 28a, EGR valve closing solenoid 35a, EGR valve opening solenoid 36a, intake pressure sensor controlling solenoid 37a, idle-up actuator controlling first and second solenoids 253a and 254a (as will be described later) and warning lamp 127.

The ECU 9, provided with CPU and input-output interface or memories such as RAM and ROM (including map), has the functions of regeneration control means RM for controlling the operation of the fuel injection timing control means 18; EGR quantity control means EM for controlling the operation of the EGR valve 30; intake throttle quantity control means 1M for controlling the operation of the intake throttle valve 21; first control means M1 which receives a signal from the regeneration timing detection means 100 and provides to the warning lamp 127 a signal for indication to the effect that the DPO 5 should be regenerated, when the quantity of particulates collected in the DPO 5 exceeds a predetermined value (e.g. 80 g); and second control means M2 which receives signals from the regeneration timing detection means 100 and the forced regeneration switch 252, and when the diesel engine E is in a predetermined state of operation (e.g. idle state) and when there is input from the forced regeneration switch 252 a signal indicative of desire for regeneration of the DPO, outputs a fuel injection timing retard signal to the retard device (fuel injection timing control means) 18, outputs high-speed idling signals to idle-up actuator controlling solenoids 253a and 254a, outputs to the EGR valve controlling solenoids 35a and 36a a signal for driving the EGR valve 30 to the open side and outputs to the intake throttle valve controlling solenoids 27a and 28a a signal for driving the intake throttle valve 21 to the closing side.

To the pressure chamber 46c partitioned by diaphragm 46b of the pressure responsive device 46 are connected an atmosphere passage 255 for introduction of atmospheric pressure Vat through air filter 48 and a vacuum passage 256 for introduction of vacuum pressure Vvac from vacuum pump 25. In the passages 255 and 256 are mounted magnet valves 253 and 254, respectively. When duty control signals are fed from ECU 9 to the idle-up actuator controlling first and second solenoids 253a and 254a of the magnet valves 253 and 254, the respective valve portions 253b and 254b are attracted, whereby the pressure (negative pressure) fed to the pressure chamber 46c of the pressure responsive device 46 is adjusted and the rod 46a is drawn in to control the idle-up condition (high-speed idle condition).

The processing flow of this device will now be explained with reference to FIG. 44. First, judgment is made in Step n1 as to whether forced regeneration is necessary or not. If the result is YES, it is judged in Step n2 whether the cooling water temperature is not lower than a predetermined value (e.g. 55° C.) and if the result is YES, the warning lamp 127 is turned ON. This processing is effected mainly by the first control means M1.

With the warning lamp 127 turned ON, the passenger becomes aware that forced regeneration is necessary. In regenerating the DPO 5, it is preferable that the diesel engine E be brought into an idle condition. In this case, if the passenger brings the diesel engine E into an idle condition by, for example, stopping the vehicle and turns ON the forces regeneration switch 252 in the vehicle room, a DPO regeneration desire signal is provided from the forced regeneration switch 252. Consequently, the processing takes YES route in the following step n4.

Then, in Step n5, judgement is made whether the clutch in ON or in an engaged state (the clutch switch 250 is ON), and in Step n6 it is judged whether the transmission is neutral (the neutral switch 251 is ON) or not. If the result is YES in both Steps n5 and n6, the idle-up actuator 46 is turned ON in steps n7, n8, n9 and n10, the engine is brought into a high-speed idle state with the engine speed increased to say 3,000 rpm, the injection timing is retarded 16° A, the EGR valve 30 is driven to the open side to increase the EGR quantity, and the intake throttle valve 21 is driven to the closing side. Such control is effected mainly by the second control means M2.

As a result, usually the particulates collected in the DPO 5 begin to burn, and DPO inlet temperature Tin, DPO internal temperature Tf and DPO outlet temperature To increase as shown in FIG. 19 like the previous embodiment, so the DPO temperature is detected in the next Step n11, and it is judged in Step n12 whether the DPO temperature is not lower than a predetermined value (e.g. 600° C.). If the DPO temperature is not lower than 600° C., regeneration stop mode is taken in Step n13 because it is likely that the DPO 5 will melt and damage crack.

On the other hand, if the DPO temperature is lower than 600° C., it is judged again in Steps n14 and n15 whether the clutch is ON or not and whether the transmission is neutral or not. And if the results in both Steps n14 and n15 are YES, the counter addition is started in Step n16, and judgment is made in Step n17 whether a predetermined time (e.g. 2 minutes or so) has elapsed or not. While the predetermined time has not elapsed, the processings of Steps n14, n15, n16 and n17 are repeated. In this case, if the clutch pedal is operated or a shift change is made, regeneration stop mode is taken immediately in Steps n18 and n19.

After the lapse of the predetermined time, the injection timing retard is cancelled, the idle-up actuator 46 is turned OFF, the EGR quantity is returned to normal and the intake throttle valve 21 is opened in Steps n20, n21, n22 and n23 to cancel the DPO regenerating operation. Thereafter, the warning lamp 127 is turned OFF in Step n24, and the counter is reset in Step n25.

Return is made when forced regeneration is not necessary, when the cooling water temperature is lower than 55° C. and when the passenger does not want forced regeneration. In this case, there is not performed a forced regeneration of the DPO 5.

Thus, by setting conditions which ensure regeneration of the DPO 5 and by respecting the passenger's intention, it is possible to avoid an overloading condition of the particulates and hence fully prevent reduction of the engine performance and damage of the DPO 5.

As indicator means, there may be used character or void display in addition to the use of an indicator lamp. And as the clock 43 there may be used the clock contained in ECU 9.

Figure 45:
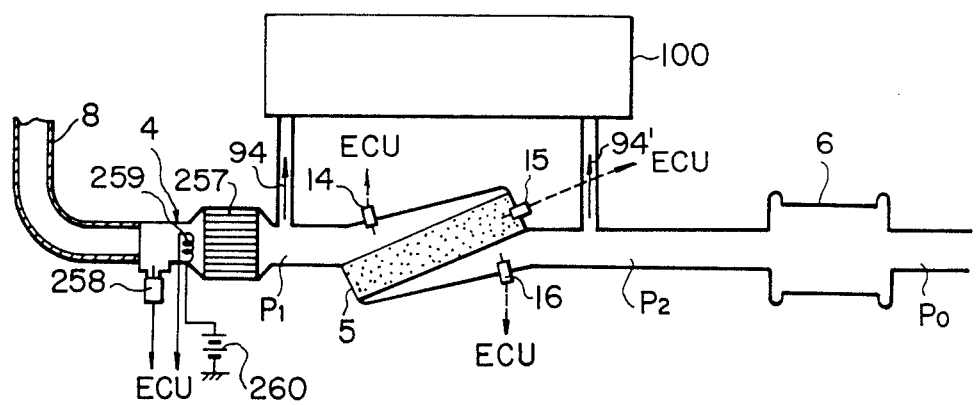

A still further embodiment (seventh embodiment) will be explained below, which is a modification of the exhaust sytem in FIG. 1 of the first embodiment into the one shown in FIG. 45. Its block diagram corresponds to that of FIG. 14 except that the two output portions shown in FIG. 46 are added thereto. Further, the portion of forced regeneration processing G in the flowchart of FIG. 25 of the forced regeneration system of the first embodiment is modified as shown in FIG. 47. As to the portions of the same structure as in the first embodiment, explanation will be omitted.

A warm-up catalytic converter (hereinafter referred to sometimes as "W/UCC") 257 as a novle metal (platinum, rhodium, palladium) oxidation catalyst is disposed in a position upstream of the DPO 5 in the exhaust passage 4 and downstream of the turbine of the turbocharger 7. As the warm-up catalytic converter 257 there is used a conventional gasoline engine catalytic converter.

Moreover, in a position usptream of the warm-up catalytic converter 257 in the exhaust passage 4 and downstream of the turbine of the turbocharger 7 there is mounted an electric heater (including a glow plug) which is supplied with voltage from a battery 260. And an injector 258 is attached to a side wall portion of the exhaust passage 4 upstream of the electric heater 259. With a control signal from the ECU 9, a fuel injection valve controlling solenoid 258a operates to inject fuel to the exhaust passage 4. With the injector 258 and the electric heater 259, atomized fuel is fed to the exhaust passage 4 in a position near the upstream side of the W/UCC 257. The injector 258 may be disposed on the upstream side of the turbine of the turbocharger 7.

The following description is now provided about the operation of this embodiment, particularly about the processing flow for forced regeneration control.

According to the processing flow for forced regeneration control, as shown in FIGS. 25 and 47, when Forced Regeneration Flag turns ON (Step g1), the warning lamp 127 is turned ON (Step g2), and if the engine is in an idle state, for example, during stop of the vehicle (Step g5), a forced regeneration processing is performed (Block G').

If the engine is in an idle condition even when the forced regeneration switch Sw turns ON (Step g3), the processing from Block G' is started. In Block G', with a control signal fed from ECU 9 to the solenoid 47a, there is performed an atomized fuel supply control by means of the injector 258 and the electric heater 259 (Step g6'), further fuel injection timing control and intake throttle control are performed (Steps g7 and g8), and integrating of regeneration time is made (Step g9). The integrating of operation time is the same as that disclosed in the first embodiment.

In this embodiment, in the zone $D_1$ with low engine speed and the low speed and low load zone $D_5$ of the engine shown in FIG. 22 of the first embodiment, retard is made and at the same time fuel is injected from the injector 258, further exhaust gas after promotion of fuel atomization by the electric heater 259 is fed to the warm-up catalytic converter 257. As a result, the exhaust gas temperature is further increased in the converter 257 and the exhaust gas stream thus raised in temperature is fed to the DPO 5, thus affording an equivalent effect to an enhanced rising speed of the exhaust gas temperature caused by the retard control.

Moreover, usually the catalyst coated to the DPO 5 suppresses the formation of sulfate, so is low in activity to HC and CO. On the othe hand, since the warm-up catalytic converter 257 is high in activity to HC and CO, and so a greater effect is obtained.

The system may be constructed so that in the zone $D_1$ with low engine speed regeneration is not performed for the stabilization of idling. In this case, a high advance characteristic is normally obtained to inhibit the operation of the regeneration assisting mechanism.

According to this embodiment, therefore, it is possible to obtain the following effects.

(1) Regeneration of the DPO can be effected even in the case of a small exhaust gas flow at a low engine speed region or during idling, whereby the drivability can be ensured and the particulates can be self-burnt even with retard at a low speed and low load region of the engine.

(2) Since the novle metal oxidation catalyst is disposed on the upstream side of the DPO, it is possible to increase the exhaust gas temperature during regeneration, and the amount of aldehyde, etc. discharged at the time of retard is decreased to weaken the odor in the exhaust gas.

(3) Since the exhaust gas temperature during regeneration is raised, it is possible to effect regeneration without idle up during forced regeneration, whereby the increase of the engine noise can be suppressed.

In this seventh embodiment, the warm-up catalytic converter 257, electric heater 259 and injector 258 are used as auxiliary means for raising the exhaust gas temperature, but the effect of this embodiment can be attained also by providing any one of the warm-up catalytic converter 257, electric heater 259 and injector 258. Particularly, in the case where the warm-up catalytic converter 257 is disposed upstream of the DPO 5, it is possible to effect regeneration of the DPO 5 easily and the foregoing effects (1) to (3) can be attained, and it becomes unnecessary to supply fuel or dispose heater.

Figure 48:
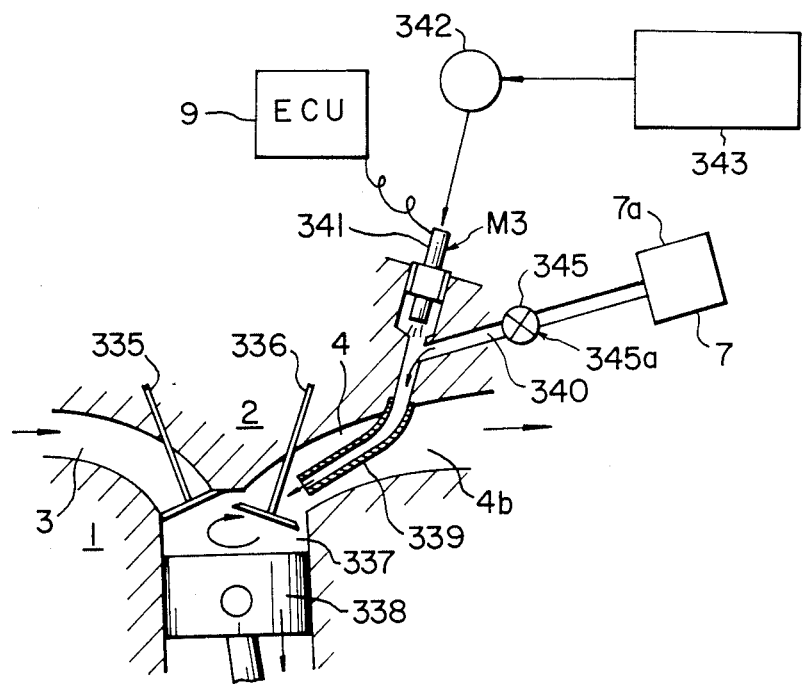
FIGS. 48 to 50 are a longitudinal sectional view of a principal portion, a partial flowchart and a flowchart showing how to control, respectively, of an exhaust system fuel feed mechanism in a DPO regeneration system according to an eighth embodiment of the present invention.
Figure 49:
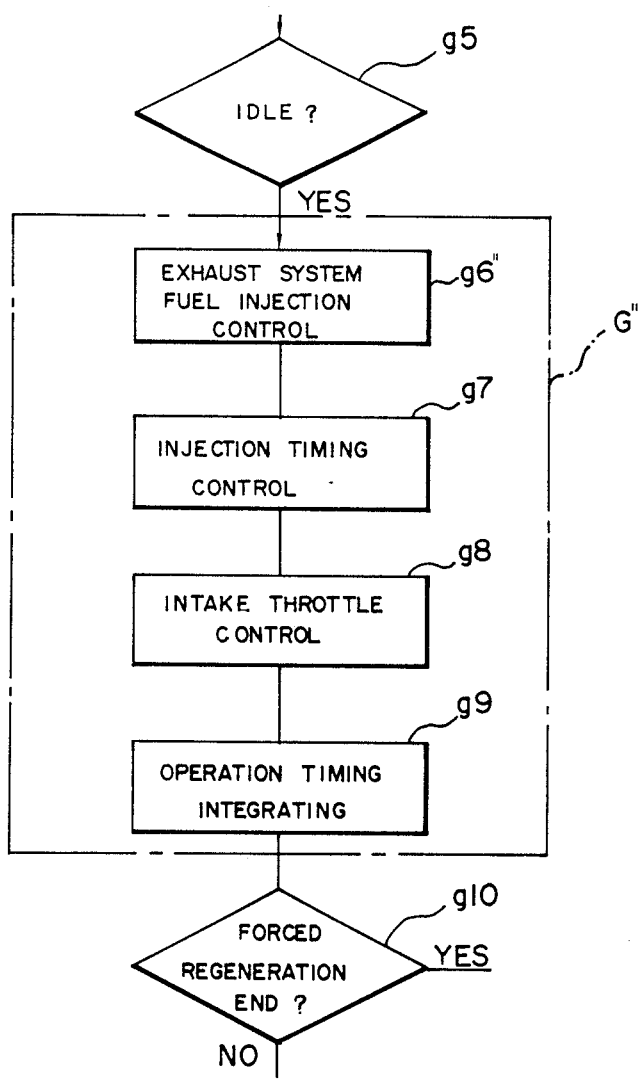
Figure 50:
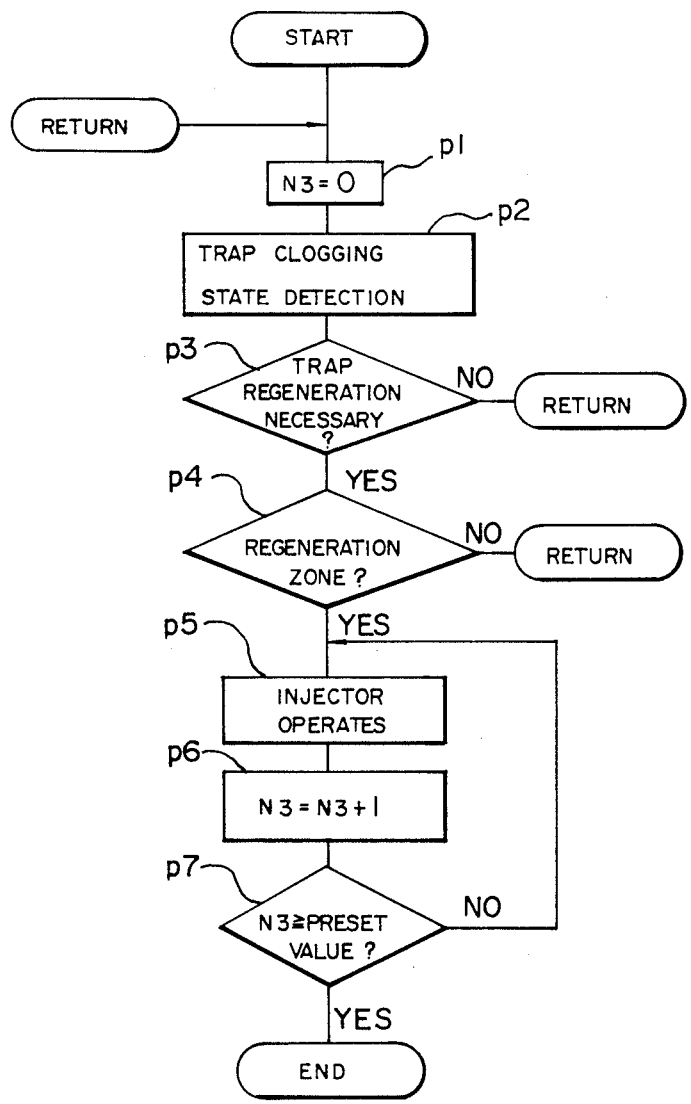

A further embodiment (eighth embodiment) which is constructed so that fuel is fed as shown in FIG. 48 to the exhaust system of the engine body in FIG. 1 of the first embodiment, and in which the portion of the forced regeneration processing G in the forced regeneration system flowchart of FIG. 25 of the first embodiment is modified to G'' shown in FIG. 49, and control is made in accordance with the fuel injection processing to the exhaust system disclosed in FIG. 50.

The eighth embodiment will be explained below with reference to mainly FIGS. 48 to 50.

To a main combustion chamber 337 of a diesel engine E are connected an intake passage 3 through an intake valve 335 and also an exhaust port 4b as an exhaust passage 4 through an exhaust valve 336.

Further, as shown in FIG. 48, an injection pipe 339 which constitutes an exhaust system fuel supply mechanism 3 is disposed, with its opening directed to the exhaust valve 336, in the exhaust passage 4 in a position close to the exhaust valve 336 which is a high temperature portion of the exhaust port 4b. To the injection pipe 339 are supplied atomized fuel injected from an electromagnetic injector 341 as a fuel injection valve and supercharged air from a compressor 7a of a turbocharger 7 through an opening/closing valve 345. With this supercharged air fed, the nozzle of the electromagnetic injector 341 is cooled.

The electromagnetic injector 341 is disposed away from the high temperature portion of the exhaust port 4b, and when it receives fuel (light oil) which has been pressurized by a fuel pump 342, the fuel injection quantity timing and its amount can be controlled with control signals provided from ECU 9.

The opening/closing valve 345 is normally closed and brings a supercharged air supply passage 340 into a state of communication when its solenoid 345a receives a control signal from ECU 9.

The reference numeral 343 denotes a fuel tank. The injection pipe 339 may be disposed in the exhaust manifold.

In the processing flow for forced regeneration control in this embodiment, as shown in FIGS. 25 and 49, when Forced Regeneration Flag turns ON (Step g1), the warning lamp 127 is turned on and off (Step g2), and if the engine is in an idle condition such as stop of the vehicle (Step g5), there is performed a forced regeneration processing (Block G"). Also when the forced regeneration switch Sw turns ON (Step g3), the processing from Block G" is started if the engine is in an idle condition.

In Block G", with control signals fed from ECU 9 to the injector 341 and the solenoid 345a of the opening/closing valve 345, there is performed the fuel injection control to the exhaust system (Step g6"), the fuel injection timing control and intake throttle control are made (Steps g7 and g8), and integrating of regeneration time is conducted (Step g9).

The processing flow for fuel injection control to the exhaust system is as shown in FIG. 50, in which after resetting of counter N3 (Step p1), the clogging state of DPO 5 is detected by detection means according to the pressure loss of DPO 5 (Step p2), then it is judged whether regeneration of the DPO 5 is necessary or not (Step p3), and if it is necessary to do so, the injector 341 is operated by a predetermined number of times (Steps p5–p7) at the regeneration zone (Step p4). The integrating of operation time is made in the same way as in the first embodiment.

If the forced regeneration switch is OFF (Step g4) or the engine is not in an idle condition, as shown in FIG. 25, the processing shifts to the processing flow for regeneration control, and if Forced Regeneration Flag and Regeneration Flag are OFF (Step g12), normal operation control is made.

In the zone $D_1$ with low engine speed and the low speed and low load zone $D_5$ of the engine shown in FIG. 22, the opening/closing valve 345 is opened by the exhaust system fuel supply mechanism M3 simultaneously with retard to supply the supercharged pressure from the compressor 7a of the turbocharger 7 to the supercharged air supply passage 340. At the same time, fuel is injected from the electromagentic injector 341 through the injection pipe 339 to the exhaust port 4b located near the exhaust valve 336. This fuel injection is performed in synchronism with the valve opening timing of the exhaust valve 336.

When the exhaust valve 336 is opened, part of the injected fuel flows back into the main combustion chamber 337, where it is heated and reacts into a highly active HC which is in a burning or easily burning state. As a result, the exhaust temperature rises and unburnt HC is fed to DPO 5, accelerating the catalytic reaction. With further increase of the exhaust temperature, the combustion of the particulates in the DPO 5 is accelerated. Thus, as a result of fuel injection to such high temperature portions as the exhaust port 4b and the exhaust manifold, the fuel reacts into a high activity HC.

The magnetic injector 341 is disposed away from the exhaust passage 4, its temperature is maintained within an allowable range. The operation timing of the electromagnetic injection 341 and the flow rate of fuel are adjusted suitably by the ECU (computer) 9 according to the loading condition of the engine E, engine speed, clogging state of DPO 5, the temperature of DPO 5 and that of exhaust gas.

Figure 51:
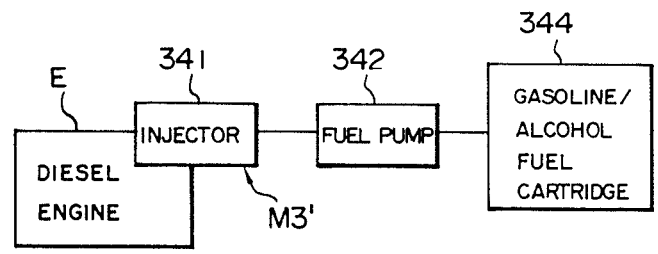
FIGS. 51 and 52 are block diagrams of an exhaust system fuel supply mechanism in the DPO regeneration system of the eighth embodiment of the present invention.
Figure 52:
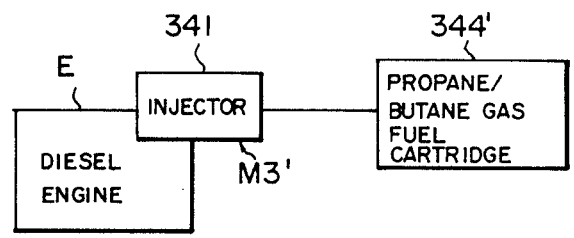

As a modification of the eighth embodiment, there may be used, as the fuel in an exhaust system fuel supply mechanism M3', different liquid fuels such as gasoline and alcohol as shown in FIG. 51, or different gaseous fuels such as propane and butane as shown in FIG. 52. These different kinds of fuels are contained in special fuel cartridges 344 and 344' and supplied to the exhaust passage 4 near the exhaust valve 336 of the diesel engine E through the injector 341 at the time of regeneration or forced regeneration of DPO 5. Other constructional points are the same as in the eighth embodiment.

According to the construction of the eighth embodiment, the following effects are obtained in addition to the effect (1) described in the seventh embodiment.

(1) During regeneration, fuel is fed to such high temperature portions as the exhaust port or exhaust manifold, so it is transmitted to DPO in a state susceptible to reaction. Consequently, it becomes easier for the DPO to undergo regeneration and the regeneration assisting time is shortened, whereby the amount of aldehyde, etc. discharged from the engine decreases, weakening the offensive odor in the exhaust gas.

(2) Since the exhaust gas temperature can be increased instantaneously during regeneration, it is possible to effect regeneration without idle up, whereby the increase of the engine noise can be suppressed and the regeneration can be performed in a wide operation region of the engine.

Further, in the above modification of the eighth embodiment, the catalytic reaction can be done at lower temperatures than in the use of gas oil.

A ninth embodiment of the present invention will be described below, in which the construction of the regeneration timing detection means 100 shown in FIGS. 1 and 2 and that of the pipe 95 shown in FIG. 3(a) in the first embodiment are modified into 100' and pipe 95' respectively shown in FIG. 53. Substantially same portions as in the first embodiment will be indicated by the same reference numerals and explanations thereon omitted.

A magnet valve 76' is mounted in exhaust pressure detecting pipes 94 and 94'. The magnetic valve 76', which is constituted as a rotary valve, normally maintains communication between pipes 94a and 94b and between pipes 94'a and 94'b as shown in FIG. 53, ready to detect the exhaust pressure (see the mark FD in FIG. 53; this state will be hereinafter referred to as "OFF state").

When a control signal is applied from ECU 9 to a solenoid 76'a of the magnet valve 76', the magnet valve 76' is attracted to an exhaust deposit intake system, causing communication between the pipe 94b and an attraction pipe 95' and between the pipe 94'b and the attraction pipe 95', (this state will hereinafter be referred to as "ON state"). The attraction pipe 95' is connected to the intake passage 3 downstream of an intake throttle valve 21.

The magnet valve 76' as an attraction control valve and the attraction pipe 95' constitute a purge mechanism PM. During operation of the purge mechanism PM, the valve 76' assumes such an attracted state as shown in FIG. 54 and electromagnetic change-over valves 77–79 become open, so that soot and water are purged to the intake passage 3 from filter 85 and wire mesh 84 of a filter device 49a and filter 85 and wire mesh 84 of a filter device 49b [see FIG. 3(a)].

During operation of the purge mechanism PM, the intake throttle valve 21 is throttled and the atmosphere (attracted air) from a filter 80 is attracted by the attraction of the diesel engine E, whereby the exhaust deposit is purged to the intake passage 3.

In the purge mechanism PM, a control signal is provided from ECU 9 in accordance with the following conditions, for example:

(I) Always except the time when exhaust pressure is detected.
(II) Periodically:
 (1) just after start of the engine
 (2) at every detection of exhaust pressure (for example, before and after the detection)
 (3) at every certain time or at every certain distance
(III) When engine operating conditions are established:
 (1) at the time of idle
 (2) at the time of deceleration In this embodiment, moreover, the exhaust deposits in the filter devices 49a and 49b or the electromagnetic change-over valve 77 and filter 80 can be purged simultaneously by opening (turning ON) the solenoids 76a, 77a, 78a and 79a at a time (see the mark FP in FIG. 53). Also, by opening (turning ON) the solenoids 76a, 77a and 78a or the solenoid 76a, 77a and 79a alternately, it is possible to purge the exhaust deposits in the filter device 49a or 49b or the electronic change-over valve 77 and filter 80.

According to this embodiment there can be obtained the same effects as in the first embodiment. In addition, purging can be done to a satisfactory extent because the exhaust deposit can be removed by attraction to the intake system using a clean air introduced through the filter 80, and as a result, the following effects are attained.

(1) Exhaust deposits such as water and soot in the exhaust pressure detecting pipe can be removed by circulation to the exhaust passage.

(2) In a cold place, the water which has been collected in a slack portion of the exhaust pressure detecting pipe, the filter device mounted in the pipe, etc., can be prevented by the above (1) from freezing and damaging the filter device and the exhaust pressure sensor. Further, it is possible to prevent pipes from being clogged with ice, etc.

(3) The detection accuracy of the exhaust pressure sensor is improved because soot can be removed by the above (1).

Another (tenth embodiment) embodiment of the purge system mounted to the regeneration timing detection means 100 in the first embodiment will be described below with reference to FIGS. 55 and 56. In this embodiment, the exhaust deposits between the exhaust system and the filter devices 49a, 49b and those adhered to the filter portion can be purged by utilization of a pressure difference between pressures $P_1$ and $P_2$ respectively upstream and downstream of DIP 5.

Figure 55:
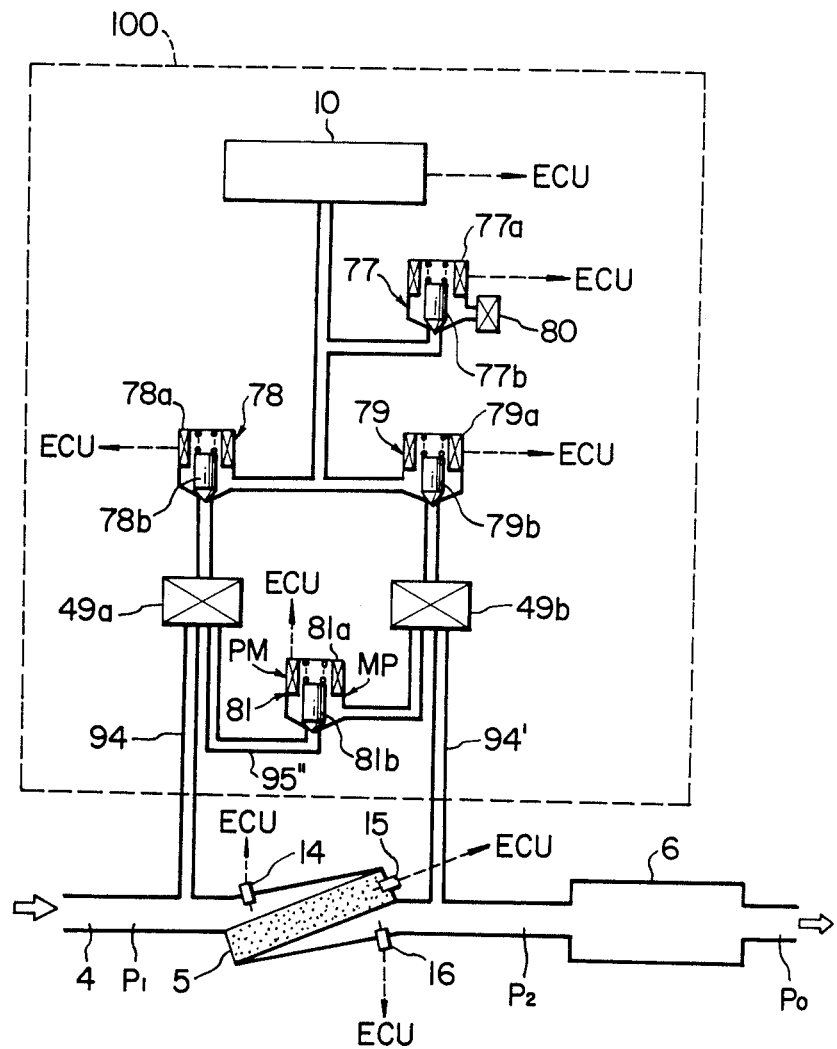
FIGS. 55 and 56 are a construction diagram showing a regeneration timing detection means with purge mechanism and a longitudinal sectional view of a filter device, respectively, in a DPO regeneration system according to a tenth embodiment of the present invention.
Figure 56:
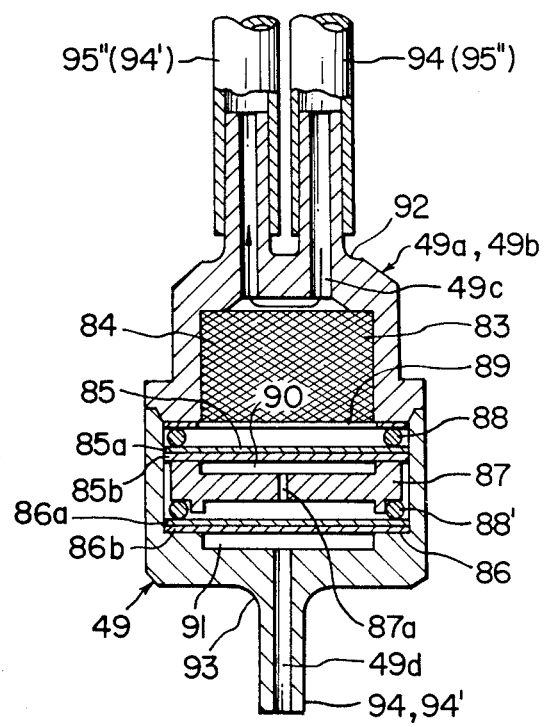
Figure 57:
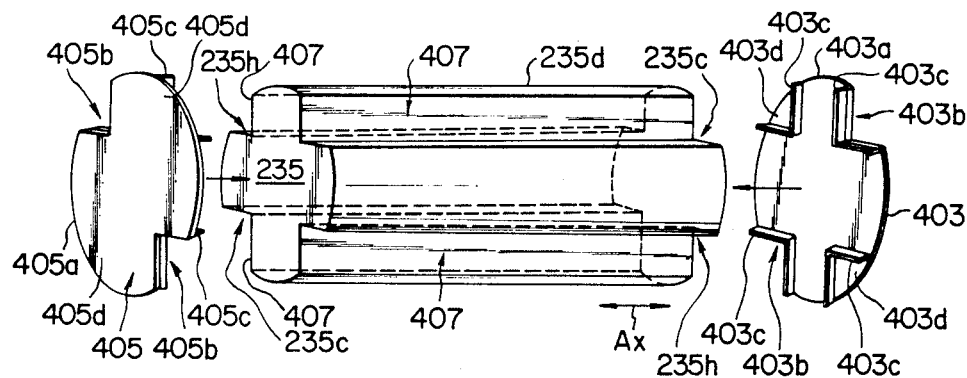
Figure 58:
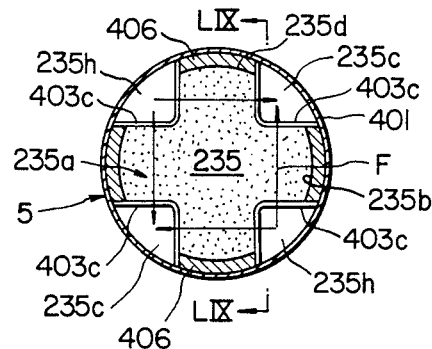
Figure 59:
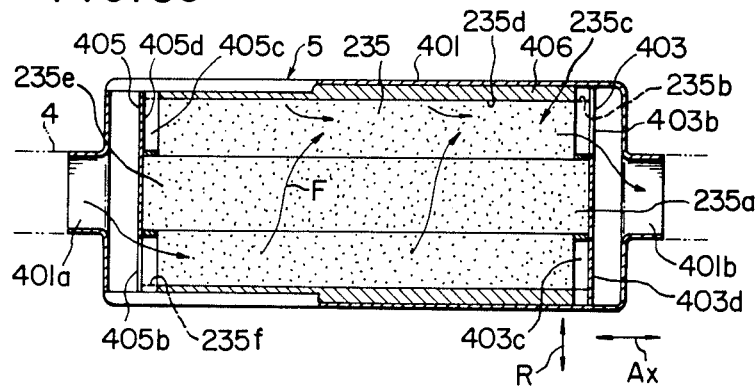

As shown in FIGS. 55 and 56, filter devices 49a and 49b are interconnected through a compressed air supply pipe 95" provided centrally with an electromagnetic change-over valve 81 as a compressed air supply control means MP of purge mechanism PM.

In about the same manner as in the ninth embodiment, upon detection of the purge operation timing condition I-(1)-(3) in the ninth embodiment at ECU 9 which constitutes a purge mechanism control section, a control signal is provided to the electromagnetic change-over valve 81, causing the valve 81 to open, whereby the compressed air (exhaust gas) from engine E is fed successively to exhaust passage 4 upstream of DPO 5, exhaust pressure detecting pipe 94, filter device 49a, compressed air supply pipe 95", filter device 49b, exhaust pressure detecting pipe 94' and exhaust passage 4 downstream of DPO 5, whereby the wter stagnant in slack portions of the pipes 94, 95" and 94', the water collected in a damping volumes 83 of the filter devices 49a and 49b and the soot collected in filter portions 85a are discharged to he muffler 6.

The exhaust pressure sensor 10 and the filter devices 49a and 49b including water trap may be disposed within the engine room to heat the exhaust pressure detection line, whereby the water in the exhaust pressure detection line is evaporated and discharged to the atmosphere from the electromagnetic change-over valve 77 at the time of detection of atmospheric pressure.

In this tenth embodiment there are obtained about the same effects as in the ninth embodiment.

Another embodiment (eleventh embodiment) of the ceramic foam 235 comprising a trap carrier of DPO 5 will be described below in which the ceramic foam shape is different from that shown in the first embodiment. Substantially same portions as in the first embodiment will be indicated by the same reference numerals and explanations thereon omitted.

The filter structure in the eleventh embodiment is as shown in FIGS. 57 to 60, in which the exhaust pipe 4 of the diesel engine is expanded to form a cylindrical casing 401. Within the casing 401 is disposed through guide members 403 and 405 a down flow type ceramic foam 235 for collecting the particulates contained in the exhaust gas. The ceramic foam 235 is formed cylindrical and in its outer peripheral portion 235d are formed plural (four in this embodiment) slits 407 from an inlet end portion to outlet end portion of the ceramic foam.

The outlet-side guide member 403 is formed in a disc shape to partition the casing 401, and its end portion 403a is welded to the inner wall of the casing 401. In the outlet-side guide member 403 are formed plural (two in this embodiment) openings 403b which communicate with an exhaust gas outlet passage 235c, whereby the exhaust gas outlet passage 235c and an outlet portion 401b of the casing 401 are brought into communication with each other.

Further, the outlet guide member 403 has a wall portion 403d which cuts off the communication between an exhaust gas inlet passage 235h and the outlet portion 401b.

The outlet-side guide member 403 is adapted to receive axially (Ax) an end face of a cross-shaped downstream-side end portion 235a of the ceramic foam 235, and a support plates 403c erected on the outlet-side guide member 403 are adapted to receive circumferentially the surfaces of the slits 407 at an end portion of the ceramic foam 235. Further, the inner peripheral wall of the casing 401 is adapted to receive radially (R) an outlet-side outer peripheral surface 235b of the ceramic foam 235 through a thermoexpansible ceramic fiber (thermoexpansible seal member) 406.

The inlet-side guide member 405 is formed in a disc shape to partition the casing 401, with its end portion 405a welded to the inner wall of the casing 401, and it is formed with plural (two in this embodiment) openings 405b which communicates with the exhaust gas inlet passage 235h of the ceramic foam 235, whereby the exhaust gas inlet passage 235h and an inlet portion 401a of the casing 401 are brought into communication with each other.

Further, the inlet side guide member 405 has a wall portion 405d which cuts off the communication between the exhaust gas outlet passage 235c and the inlet portion 401a.

The inlet-side guide member 405 is adapted to receive axially (Ax) a cross-shaped upstream-side end portion 235e of the ceramic foam 235, and support plates 405c erected on the inlet-side guide member 405 are adapted to receive circumferentially the surfaces of the slits at an end portion of the ceramic foam 235. Further, the inner peripheral wall of the casing 401 is adapted to receive radially (R) an inlet-side outer peripheral surface 235f of the ceramic foam 235 through an annular thermoexpansible ceramic fiber (thermoexpansible seal member) 406.

As the thermoexpansible ceramic fiber there may be used, for example, a mat comprising a thermoinflating agent (vermiculite), ceramic fiber and an organic binder, the mat having a thermoexpansibility, elasticity, heat resistance, durability and heat insulating property.

The end portion 403a of the outlet-side guide member 403 or the end portion 405a of the inlet-side guide member 405 may be formed so as to be in contact slidably with the inner wall of the casing 401. In this case, there is used a spring which is in contact with the casing 401 and the outlet-side guide member 403 or inlet-side guide member 405. This spring urges the outlet-side guide member 403 or the inlet-side guide member 405 toward the ceramic foam 235.

With the above construction of the diesel particulate oxidizer system of the eleventh embodiment, the exhaust gas from the diesel engine E passes through the inlet portion 401a and then through the opening 405b of the inlet-side guide member 405 into the exhaust gas inlet passage 235h, forming a flow F from the outer peripheral surface 235d of the ceramic foam 236 toward the exhaust gas outlet passage 235c, then flows out from the opening 403b of the outlet-side guide member 403 to the outlet portion 401b, and thus passes through the ceramic foam 235. In this flow of exhaust gas, the particulates contained therein are collected in the ceramic foam 235 and purified exhaust gas is released to the atmosphere through a discharge port.

Even if the casing 401 and the ceramic foam 235 rise in temperature to a high level during regeneration of DPO 5, axial (Ax) and radial (R) gaps are not formed between the downstream side end portion 235a of the ceramic foam 235 and the thermoexpansible ceramic fiber 406 because the thermal expansion coefficient of the thermoexpansible ceramic fiber 406 is larger than that of ceramic (smaller than the thermal expansion coefficient of metal). Likewise, the formation of axial (Ax) and radial (R) gaps between the upstream side end portion 23e of the ceramic foam 235 and the thermoexpansible ceramic fiber 406 is prevented.

Besides, since the thermoexpansible ceramic fiber 406 has elasticity and mounted in a compressed state, the formation of gap can be prevented more certainly.

Moreover, the stress on the ceramic foam 235 is dispersed uniformly and the strength of the entire filter device against vibrations in all directions including vertical and transverse directions [especially axial (Ax) and radial (R) directions] is enhanced.

Figure 60A:
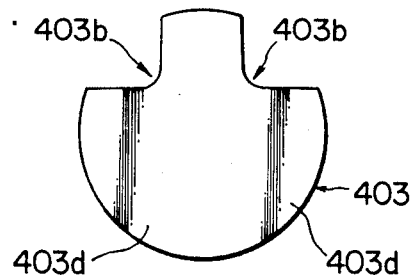
FIGS. 60(a) and (b) are front views showing modifications of a guide member used therein.
Figure 60B:
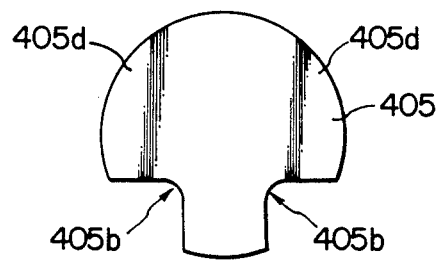

Further, the exhaust inlet passage 235h and the exhaust outlet passage 235c are determined by the combination of the shape of the ceramic slit 407 with the outlet and inlet side guide members 403 and 405, and as shown in FIGS. 60(a) and (b), the opening 403b of the outlet-side guide member 403 and the opening 5b of the inlet-side guide member 405 may be formed adjacent to each other.

Thus, according to the structure of the DPO 5 of this embodiment, the ceramic foam 235 can be held in the casing surely without occurrence of a stress concentration in the ceramic foam 235, and the exhaust gas sealability can be improved. Moreover, the effective surface area of the filter can be enlarged.

Figure 61:
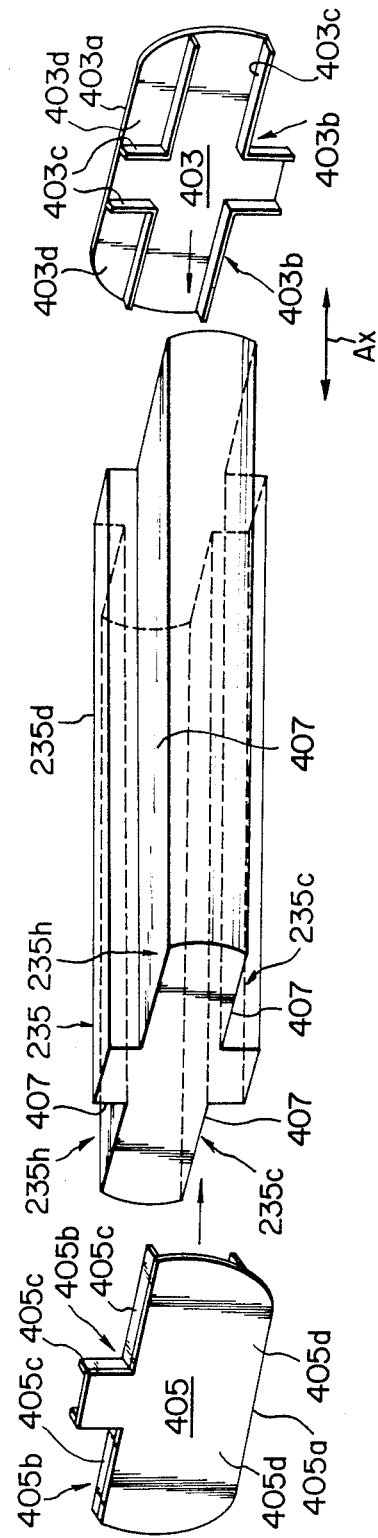
Figure 62:
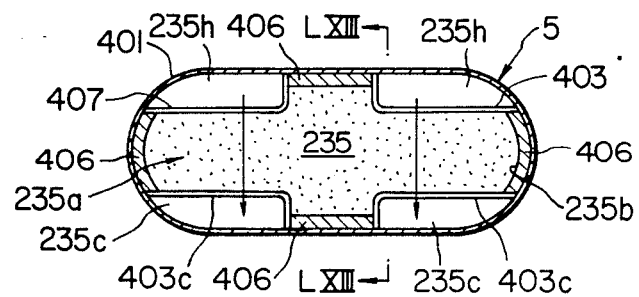
Figure 63:
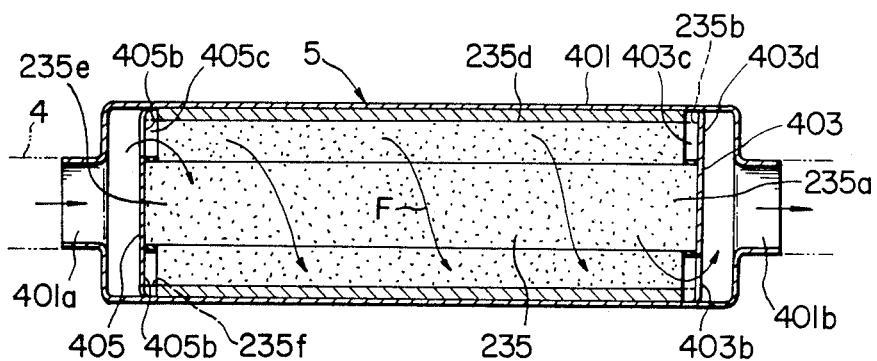

A modification of the eleventh embodiment is illustrated in FIGS. 61 to 63, in which the longitudinal section of the casing 401 of the ceramic foam 235 is in the form of an ellipse as shown in FIG. 62, and the arrangement of the exhaust gas inlet and outlet passages 235h and 235c of the ceramic foam 235 is different from that in the eleventh embodiment. But, the function and effect are about the same as in the eleventh embodiment. Therefore, corresponding portions to those of the eleventh embodiment are indicated by the same reference numerals and explanations thereof are here omitted.

What is claimed is:

1. In a diesel engine having an exhaust system, a fuel injection pump and a fuel control means for controlling the injection volume or injection timing of said fuel injection pump, a diesel particulate oxidizer regeneration system including:

a diesel particulate oxidizer disposed in said exhaust system of the diesel engine and having a trap carrier for collecting unburnt fine particles contained in exhaust gas, said trap carrier supporting an oxidation catalyst;

a regeneration means for burning the unburnt fine particles collected in said diesel particulate oxidizer;

a regeneration timing control means for detecting the quantity of the unburnt fine particles deposited in said diesel particulate oxidizer and providing a signal to said regeneration means for operating the latter when the detected value is above a predetermined value; and a regeneration end control means for detecting that the quantity of the unburnt fine particles collected and deposited in the diesel particulate oxidizer has become less than the predetermined value after combustion of unburned fine particles, and producing a signal for stopping the operation of said regeneration means, said regeneration end control means comprising a clock, a temperature sensor for detecting at least one of upstream side, internal and downstream side temperatures of said diesel particulate oxidizer; a computing means for taking the product of an addition coefficient responsive to a temperature signal from said temperature sensor and a time width of a clock signal from said clock and calculating a cumulative value of said product; and an operation end detecting means for providing to said regeneration timing control means a signal for termination of the operation of said regeneration means when said cumulative value calculated by said computing means exceeds a predetermined value.

* * * * *

UNITED STATES PATENT AND TRADEMARK OFFICE
CERTIFICATE OF CORRECTION

PATENT NO. : 4,835,964
DATED : June 6, 1989
INVENTOR(S) : KUME et al.

It is certified that error appears in the above-identified patent and that said Letters Patent is hereby corrected as shown below:

In column 1 of the Title Page kindly correct item 30 to read

-- 30  Foreign Application Priority Data

| | | | |
|---|---|---|---|
| March 31, 1984 | JP | Japan ------ | 59-64144 |
| March 31, 1984 | JP | Japan ------ | 59-64145 |
| April 9, 1984 | JP | Japan ------ | 59-70521 |
| April 24, 1984 | JP | Japan ------ | 59-82434 |
| April 26, 1984 | JP | Japan ------ | 59-84295 |
| August 13, 1984 | JP | Japan ------ | 59-170285 |
| October 3, 1984 | JP | Japan ------ | 59-150001 |
| October 12, 1984 | JP | Japan ------ | 59-213969 |
| October 12, 1984 | JP | Japan ------ | 59-213972 |
| November 8, 1984 | JP | Japan ------ | 59-235394 |
| November 9, 1984 | JP | Japan ------ | 59-236345 -- |

Signed and Sealed this

Fourth Day of September, 1990

*Attest:*

HARRY F. MANBECK, JR.

*Attesting Officer*     *Commissioner of Patents and Trademarks*